(12) United States Patent
Gonzalez

(10) Patent No.: US 11,937,657 B2
(45) Date of Patent: *Mar. 26, 2024

(54) CONSPICUITY DEVICES

(71) Applicant: CSC Group LLC, Waldwick, NJ (US)

(72) Inventor: Joseph A. Gonzalez, Waldwick, NJ (US)

(73) Assignee: CSC Group LLC, Waldwick, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/168,117

(22) Filed: Feb. 13, 2023

(65) Prior Publication Data

US 2023/0292871 A1  Sep. 21, 2023

Related U.S. Application Data

(63) Continuation of application No. 17/542,347, filed on Dec. 3, 2021, now abandoned, which is a continuation
(Continued)

(51) Int. Cl.
| | | |
|---|---|---|
| A42B 3/04 | (2006.01) | |
| A41D 13/01 | (2006.01) | |
| A45C 13/30 | (2006.01) | |
| A45C 15/06 | (2006.01) | |
| A45F 3/02 | (2006.01) | |

(Continued)

(52) U.S. Cl.
CPC .............. *A42B 3/044* (2013.01); *A41D 13/01* (2013.01); *A42B 3/0453* (2013.01); *A45C 13/30* (2013.01); *A45C 15/06* (2013.01); *A45F 3/02* (2013.01); *A45F 3/04* (2013.01); *A45F 3/14* (2013.01); *A45F 5/02* (2013.01); *A45F 5/021* (2013.01);

(Continued)

(58) Field of Classification Search
CPC ....... A42B 3/044; A42B 3/0453; A43B 3/001; H01L 33/08; B63C 11/26; F21Y 2103/00; B60Q 1/305; B60Q 2900/30
See application file for complete search history.

(56) References Cited

U.S. PATENT DOCUMENTS 2,698,944 A * 1/1955 Ramsby ................. A41D 15/00
2/48
2,817,698 A   12/1957 Schneiderman
(Continued)

FOREIGN PATENT DOCUMENTS

EP    0669008 B1   11/1998
WO   01/13351 A1   2/2001
(Continued)

OTHER PUBLICATIONS

Supplementary European Search Report and the European Search Opinion, in corresponding EP application No. 07717913.3, dated Mar. 5, 2012.
(Continued)

*Primary Examiner* — Mirza F Alam
(74) *Attorney, Agent, or Firm* — DeWitt LLP; Brian R. Pollack, Esq.

(57) ABSTRACT

The disclosure provides conspicuity devices and methods. A first embodiment includes a glove with at least one elongate lighting device adapted and configured to admit light having an advantageous spectral energy distribution. Additional articles of clothing are provided herein for enhanced conspicuity, such as for emergency workers and athletes.

4 Claims, 76 Drawing Sheets

Related U.S. Application Data of application No. 16/909,117, filed on Jun. 23, 2020, now abandoned, which is a continuation of application No. 16/216,763, filed on Dec. 11, 2018, now Pat. No. 10,687,575, which is a continuation of application No. 15/712,426, filed on Sep. 22, 2017, now Pat. No. 10,149,508, which is a continuation-in-part of application No. 15/160,929, filed on May 20, 2016, now abandoned, and a continuation-in-part of application No. 14/691,193, filed on Apr. 20, 2015, now Pat. No. 9,775,391, which is a continuation-in-part of application No. 13/350,139, filed on Jan. 13, 2012, now Pat. No. 9,080,764, which is a continuation-in-part of application No. 12/413,561, filed on Mar. 29, 2009, now abandoned, and a continuation-in-part of application No. 12/106,301, filed on Apr. 20, 2008, now Pat. No. 8,186,021, said application No. 12/413,561 is a continuation-in-part of application No. 11/836,885, filed on Aug. 10, 2007, now abandoned, said application No. 12/106,301 is a continuation-in-part of application No. PCT/US2007/000653, filed on Jan. 20, 2007.

(60) Provisional application No. 62/192,926, filed on Jul. 15, 2015, provisional application No. 62/164,339, filed on May 20, 2015, provisional application No. 61/983,429, filed on Apr. 23, 2014, provisional application No. 60/975,140, filed on Sep. 25, 2007, provisional application No. 60/972,227, filed on Sep. 13, 2007, provisional application No. 60/947,801, filed on Jul. 3, 2007, provisional application No. 60/925,175, filed on Apr. 19, 2007, provisional application No. 60/795,332, filed on Apr. 26, 2006, provisional application No. 60/772,073, filed on Feb. 10, 2006, provisional application No. 60/757,623, filed on Jan. 10, 2006.

(51) Int. Cl.
  *A45F 3/04* (2006.01)
  *A45F 3/14* (2006.01)
  *A45F 5/02* (2006.01)
  *F21V 33/00* (2006.01)
  *A45F 5/00* (2006.01)
  *F21Y 103/10* (2016.01)
  *F21Y 103/20* (2016.01)
  *F21Y 115/10* (2016.01)

(52) U.S. Cl.
  CPC .... *F21V 33/0008* (2013.01); *A45F 2003/142* (2013.01); *A45F 2005/002* (2013.01); *A45F 2005/008* (2013.01); *A45F 2200/0566* (2013.01); *A45F 2200/0575* (2013.01); *B60Q 2400/10* (2013.01); *F21V 33/0064* (2013.01); *F21V 33/008* (2013.01); *F21Y 2103/10* (2016.08); *F21Y 2103/20* (2016.08); *F21Y 2115/10* (2016.08)

(56) References Cited

U.S. PATENT DOCUMENTS

| | | |
|---|---|---|
| 3,886,804 A | 6/1975 | Winfield, Jr. |
| 3,953,037 A | 4/1976 | Winfield, Jr. |
| 3,986,881 A | 10/1976 | Oberley |
| 4,164,596 A | 8/1979 | Meister |
| 4,393,911 A | 7/1983 | Winfield |
| D281,475 S | 11/1985 | Braunschweig et al. |
| 4,563,047 A | 1/1986 | Braunschweig et al. |
| 4,578,617 A | 3/1986 | Kerr, III et al. |
| D287,479 S | 12/1986 | Winfield |
| D288,427 S | 2/1987 | Winfield |
| 4,662,419 A | 5/1987 | Winfield |
| 4,718,126 A | 1/1988 | Slay |
| 4,788,629 A | 11/1988 | Handy et al. |
| 4,806,908 A | 2/1989 | Krupnik |
| 4,857,416 A | 8/1989 | Kreiling et al. |
| 4,877,167 A | 10/1989 | McNemar |
| 4,902,567 A | 2/1990 | Eilersen et al. |
| 4,927,038 A | 5/1990 | Roebuck |
| 5,051,654 A | 9/1991 | Nativi et al. |
| 5,102,024 A | 4/1992 | Boersma et al. |
| 5,243,457 A | 9/1993 | Spencer |
| 5,300,783 A | 4/1994 | Spencer et al. |
| 5,308,101 A | 5/1994 | Monty |
| 5,315,491 A | 5/1994 | Spencer et al. |
| 5,317,497 A | 5/1994 | Belek |
| 5,327,587 A | 7/1994 | Hurwitz |
| 5,361,017 A | 11/1994 | Krause |
| 5,412,544 A | 5/1995 | Derrick et al. |
| 5,426,792 A | 6/1995 | Murasko |
| 5,469,342 A | 11/1995 | Chien et al. |
| 5,511,837 A | 4/1996 | Dempsey et al. |
| 5,559,680 A | 9/1996 | Tabanera |
| 5,563,472 A | 10/1996 | Cassidy |
| 5,564,128 A | 10/1996 | Richardson |
| 5,570,946 A | 11/1996 | Chien et al. |
| 5,583,394 A | 12/1996 | Burbank et al. |
| 5,608,919 A | 3/1997 | Case |
| 5,661,374 A | 8/1997 | Cassidy et al. |
| 5,754,445 A | 5/1998 | Jouper et al. |
| 5,757,125 A | 5/1998 | Furlong et al. |
| 5,810,467 A | 9/1998 | Hurwitz |
| 6,007,219 A | 12/1999 | O'Meara |
| 6,046,513 A | 4/2000 | Jouper et al. |
| 6,066,830 A | 5/2000 | Cline et al. |
| 6,159,878 A | 12/2000 | Marsh |
| 6,163,247 A | 12/2000 | O'Meara |
| 6,198,226 B1 | 3/2001 | Koskuba, Jr. |
| 6,249,913 B1 | 6/2001 | Galipeau et al. |
| 6,280,057 B1 | 8/2001 | O'Meara |
| 6,295,007 B1 | 9/2001 | O'Meara |
| 6,307,207 B1 | 10/2001 | Burbank |
| 6,364,498 B1 | 4/2002 | Burbank |
| 6,569,786 B1 | 5/2003 | Marsh |
| 6,599,141 B2 | 7/2003 | Hambley et al. |
| 6,616,128 B2 | 9/2003 | Selzer |
| 6,777,953 B2 | 8/2004 | Blades |
| 6,876,203 B2 | 4/2005 | Blades |
| 6,882,158 B2 | 4/2005 | Blades |
| 6,883,931 B2 | 4/2005 | Tufte |
| 6,927,579 B2 | 8/2005 | Blades |
| 6,966,668 B2 | 11/2005 | Cugini et al. |
| 7,001,639 B2 | 2/2006 | Murasko et al. |
| 7,030,573 B2 | 4/2006 | Powell |
| 7,052,631 B2 | 5/2006 | Cranor |
| 7,064,526 B2 | 6/2006 | Patterson |
| 7,134,773 B2 | 11/2006 | Tufte |
| 7,273,297 B2 | 9/2007 | Cranor et al. |
| 7,388,311 B2 | 6/2008 | Bhargava |
| 7,425,079 B2 | 9/2008 | Bruce et al. |
| 7,753,542 B2 | 7/2010 | Bruce et al. |
| 8,136,959 B2 | 3/2012 | Ho |
| 8,408,732 B2 | 4/2013 | Yeh |
| 2002/0175831 A1* | 11/2002 | Bergan .................. G08G 1/081 340/908 |
| 2003/0208764 A1 | 11/2003 | Galipeau et al. |
| 2004/0021371 A1 | 2/2004 | Jouper |
| 2004/0042200 A1* | 3/2004 | Hurwitz .................. A43B 3/36 362/85 |
| 2004/0046502 A1 | 3/2004 | Chien |
| 2004/0240198 A1 | 12/2004 | Van Laar et al. |
| 2005/0039208 A1 | 2/2005 | Veeck et al. |
| 2005/0099799 A1 | 5/2005 | Cugini et al. |
| 2005/0162265 A1* | 7/2005 | Werner .................. B60Q 1/305 340/539.1 |
| 2006/0001007 A1 | 1/2006 | Fukui |
| 2006/0046093 A1 | 3/2006 | Landry et al. |

(56) References Cited

U.S. PATENT DOCUMENTS

| | | |
|---|---|---|
| 2006/0106503 A1 | 5/2006 | Lamb et al. |
| 2006/0250785 A1 | 11/2006 | Cugini et al. |
| 2007/0129087 A1* | 6/2007 | Bell .................. A62B 99/00 |
| | | 455/458 |
| 2008/0001583 A1 | 1/2008 | Brown et al. |
| 2009/0059568 A1* | 3/2009 | Kormos ............... A62B 33/00 |
| | | 362/103 |
| 2009/0141475 A1 | 6/2009 | Bruce et al. |
| 2010/0157584 A1 | 6/2010 | Ho |
| 2010/0288274 A1* | 11/2010 | Hudson ............... F17C 13/003 |
| | | 128/202.13 |
| 2011/0164406 A1 | 7/2011 | Chen |
| 2012/0002409 A1 | 1/2012 | Donauer |

FOREIGN PATENT DOCUMENTS

| | | |
|---|---|---|
| WO | 01/46615 A1 | 6/2001 |
| WO | 03/106588 A1 | 12/2003 |
| WO | 07/00653 A1 | 10/2008 |

OTHER PUBLICATIONS

International Search Report in related international application No. PCT/US07/00653, dated Oct. 3, 2008.
International Preliminary Report on Patentability and Written Opinion in related international application No. PCT/US07/00653, dated Oct. 3, 2008.
USPTO Non-Final Office Action in related U.S. Appl. No. 11/836,885, dated Apr. 23, 2008.
USPTO Non-Final Office Action in related U.S. Appl. No. 13/350,139, dated Dec. 19, 2013.
USPTO Final Office Action in related U.S. Appl. No. 12/106,301, dated Sep. 26, 2011.

* cited by examiner

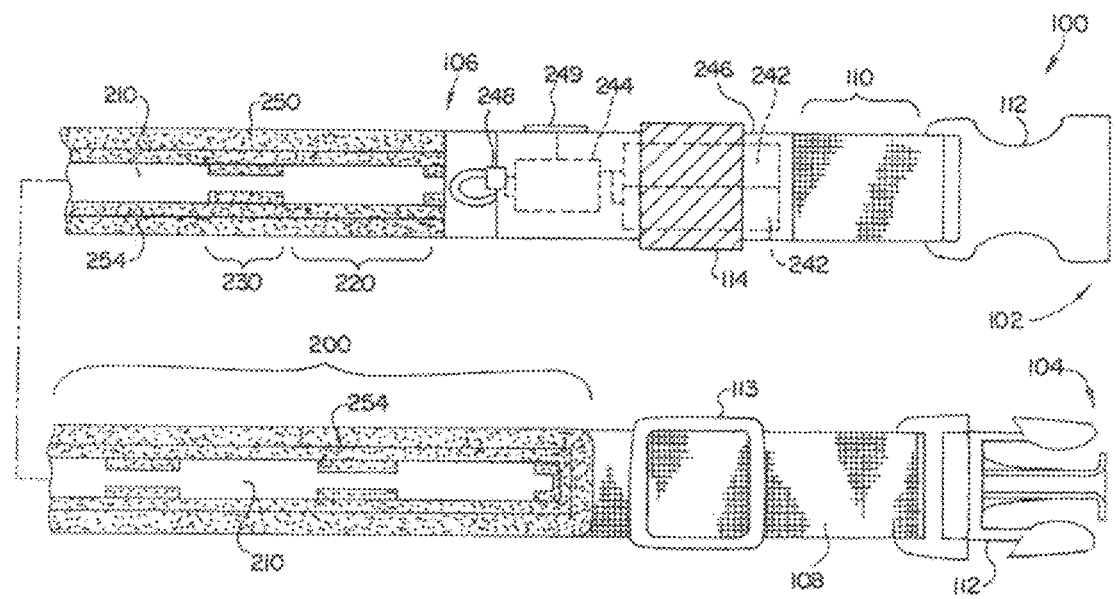
FIG. 1A
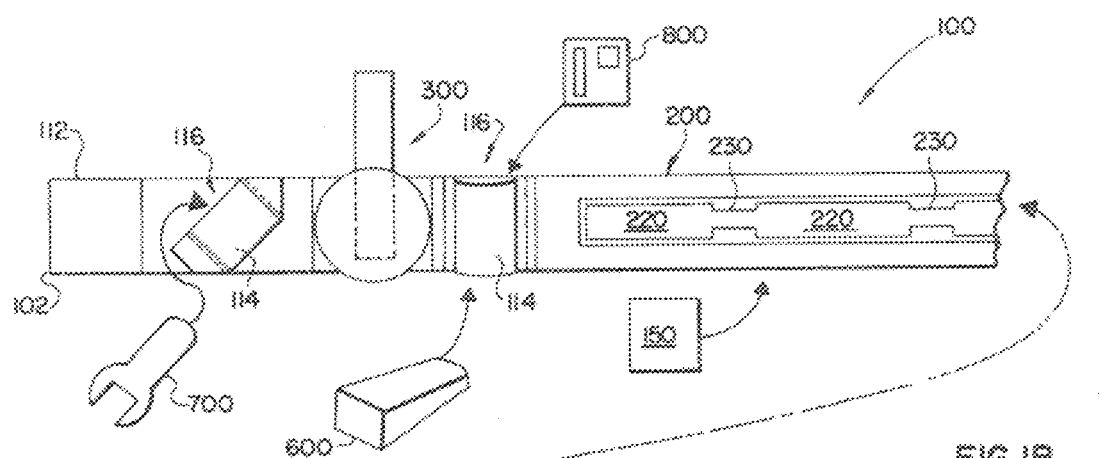
FIG. 1B
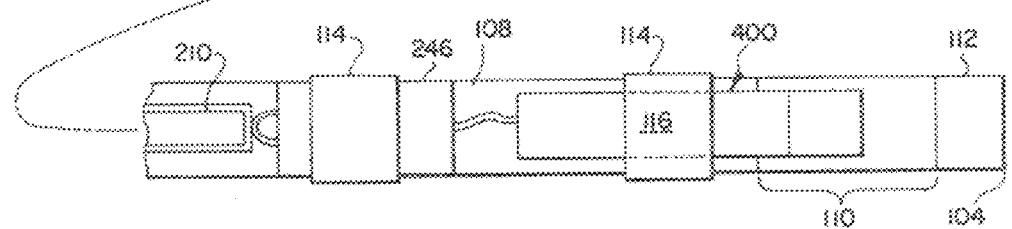

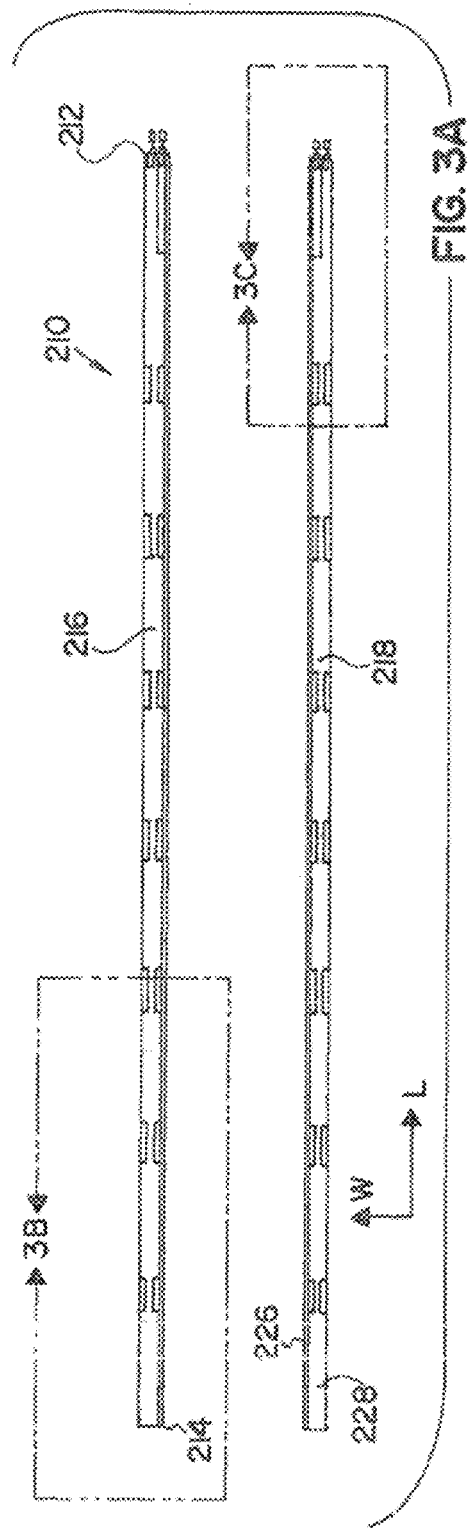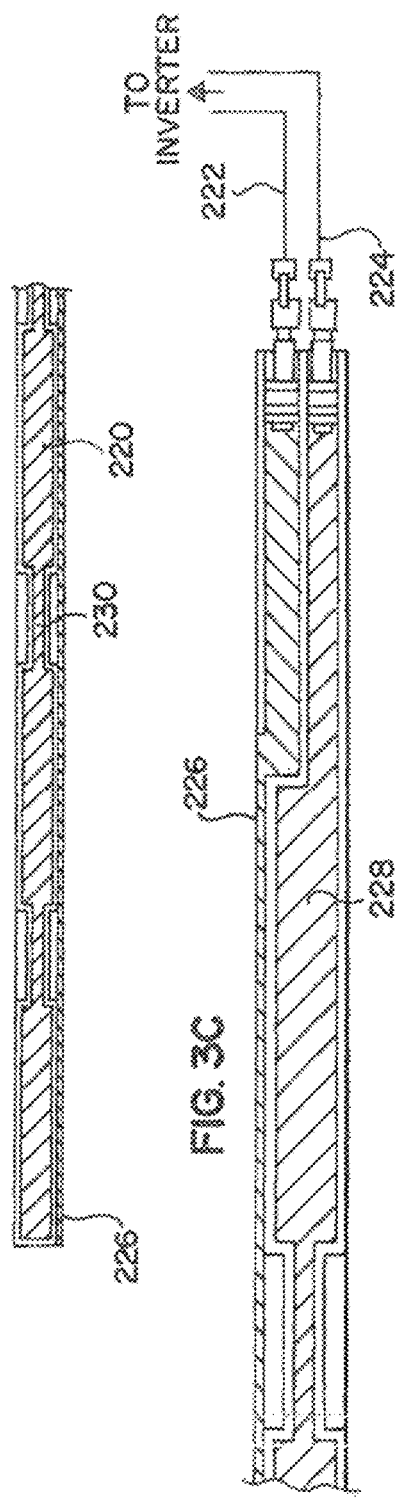

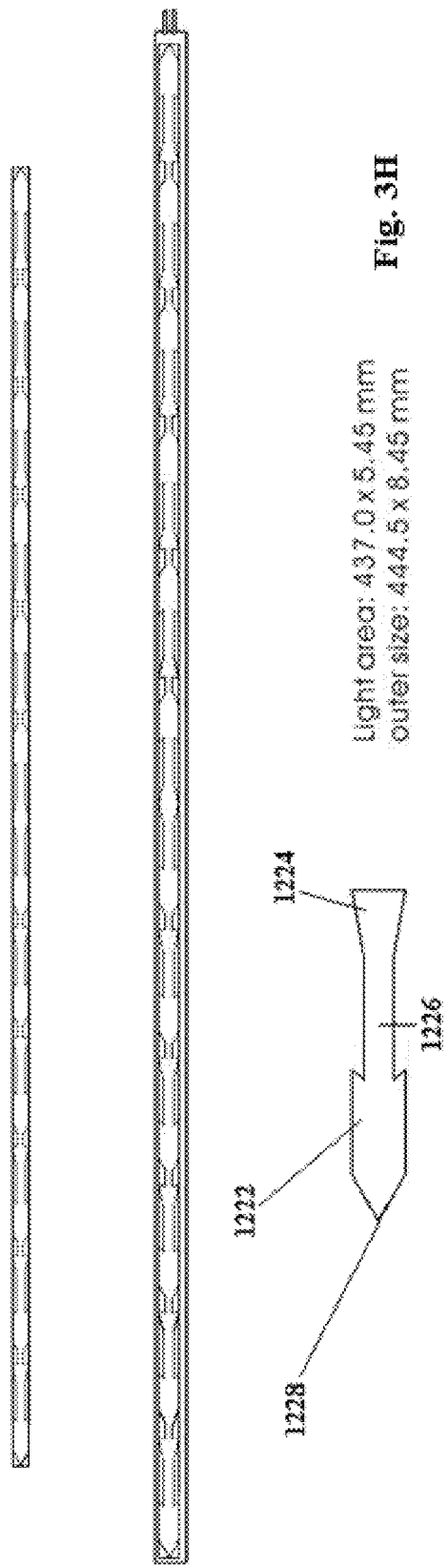

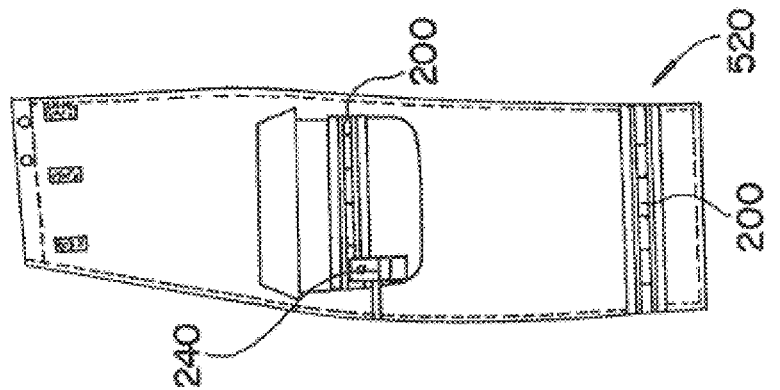
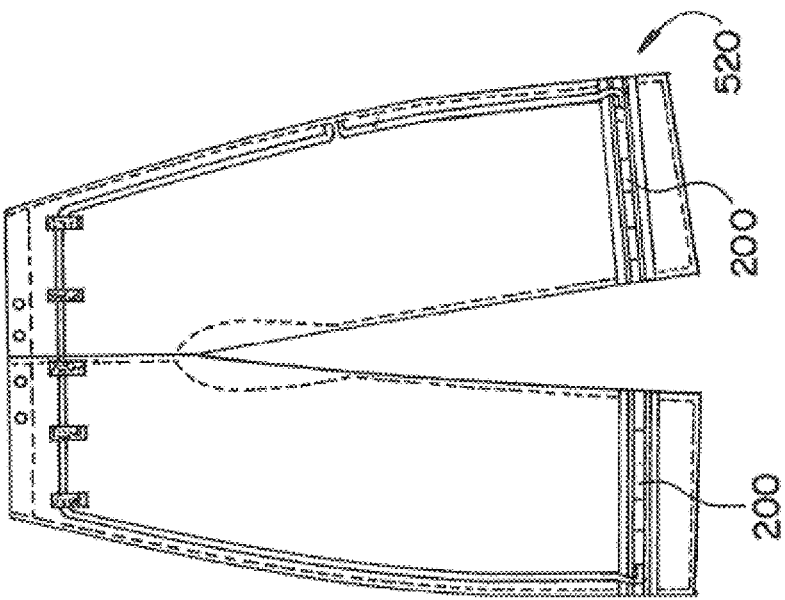
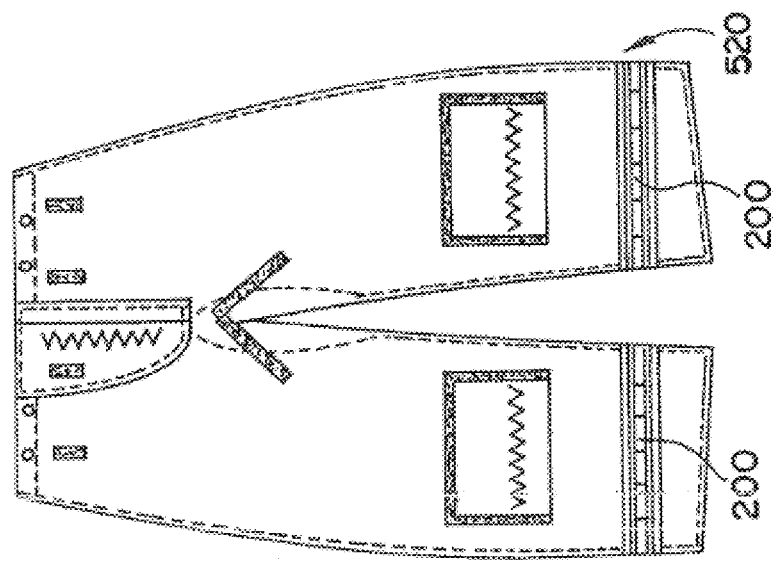

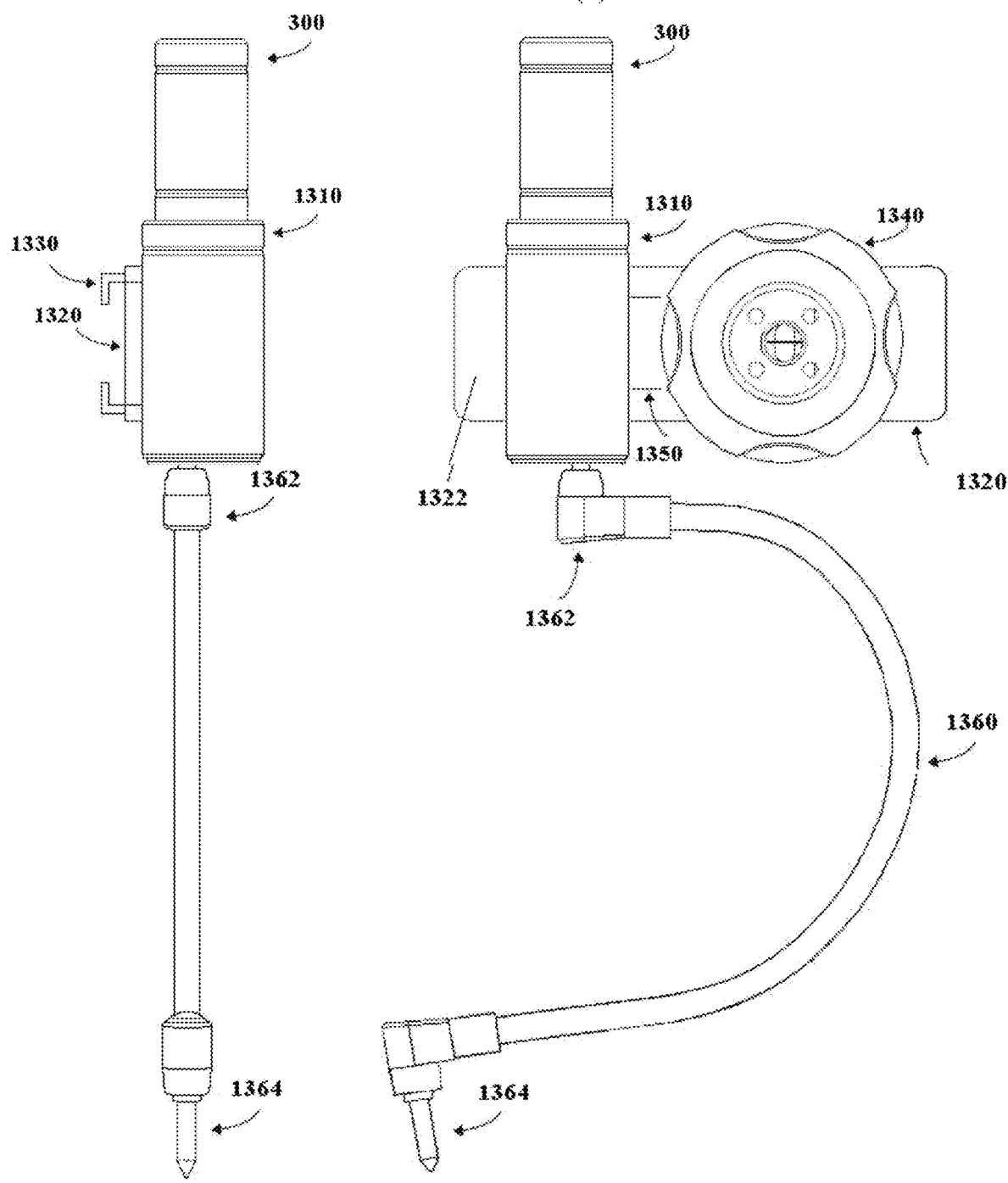

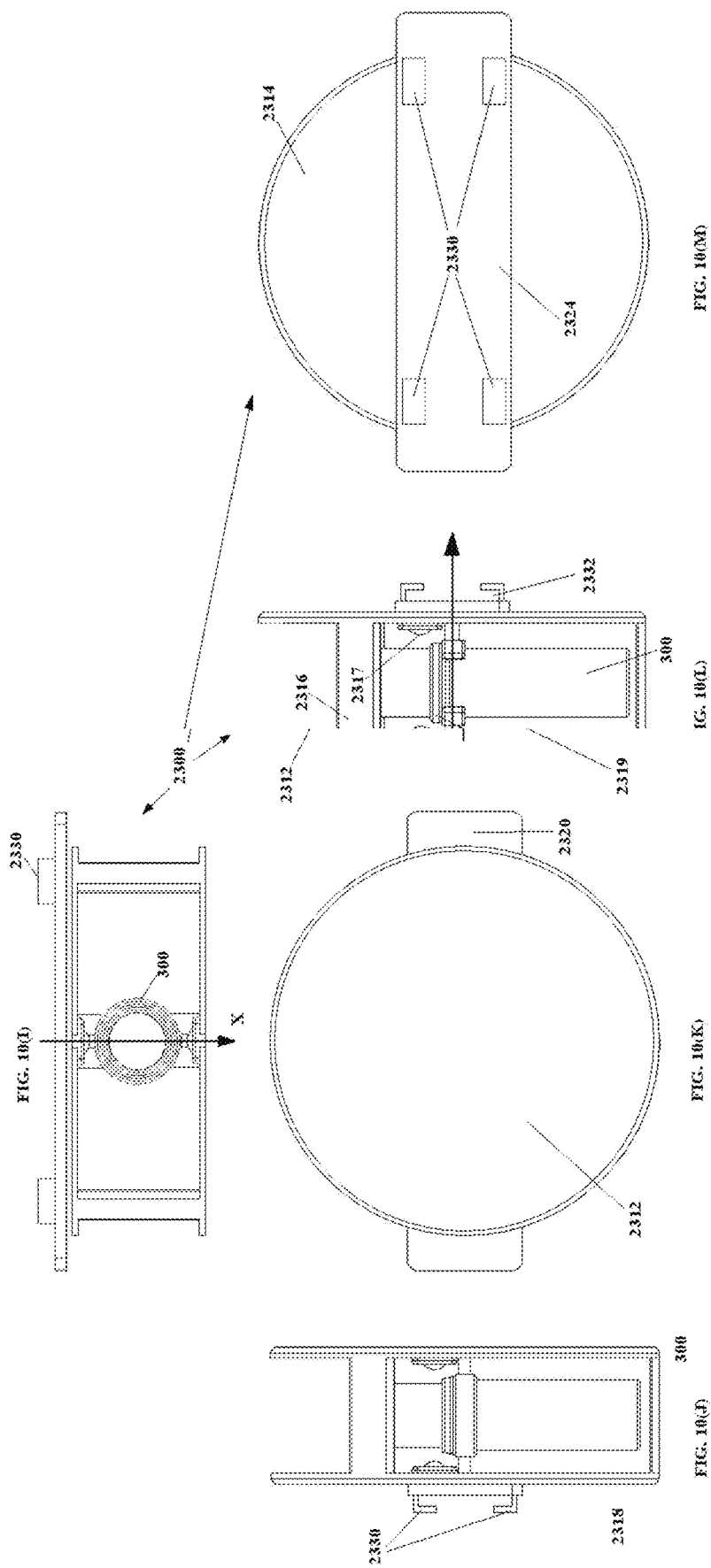

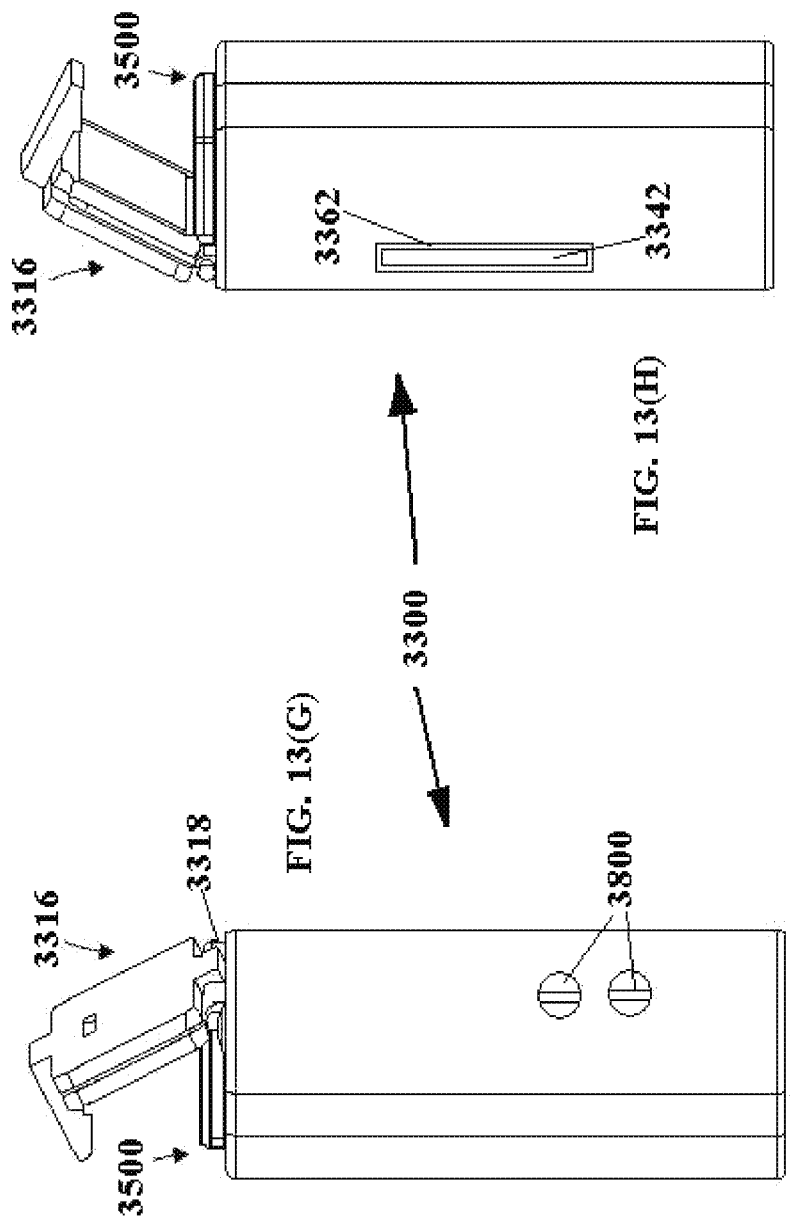

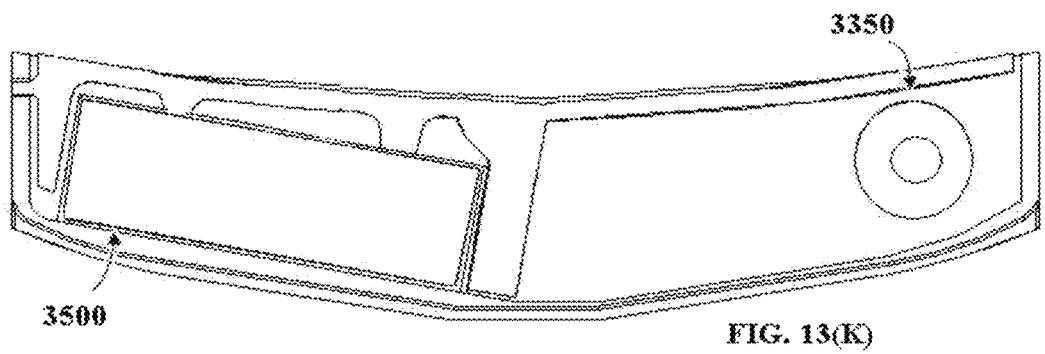
FIG. 13(K)
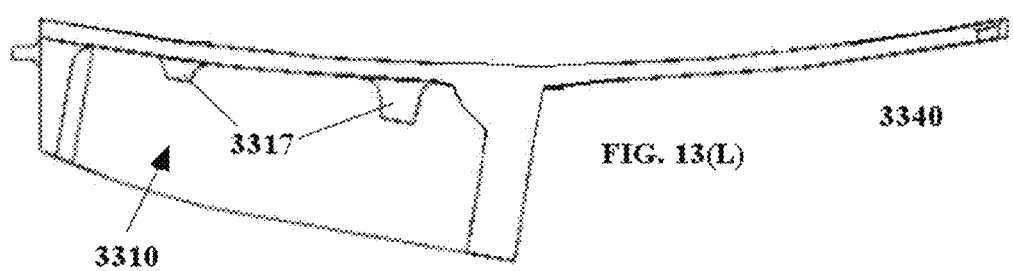
FIG. 13(L)
FIG. 13(M)
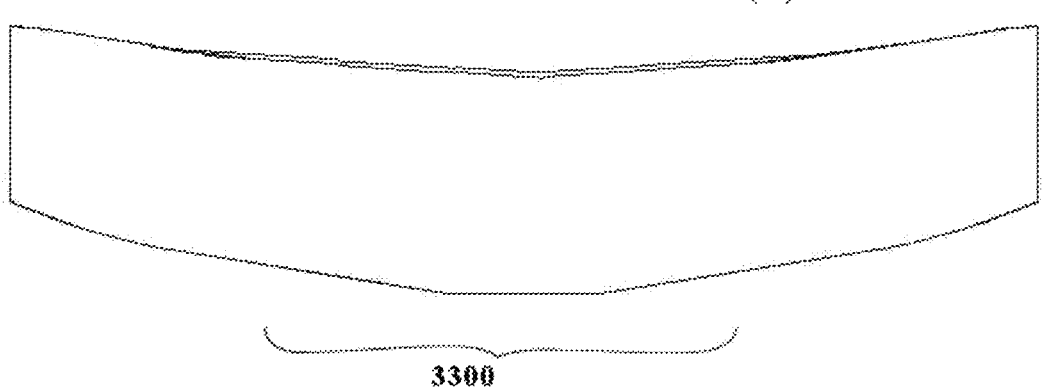

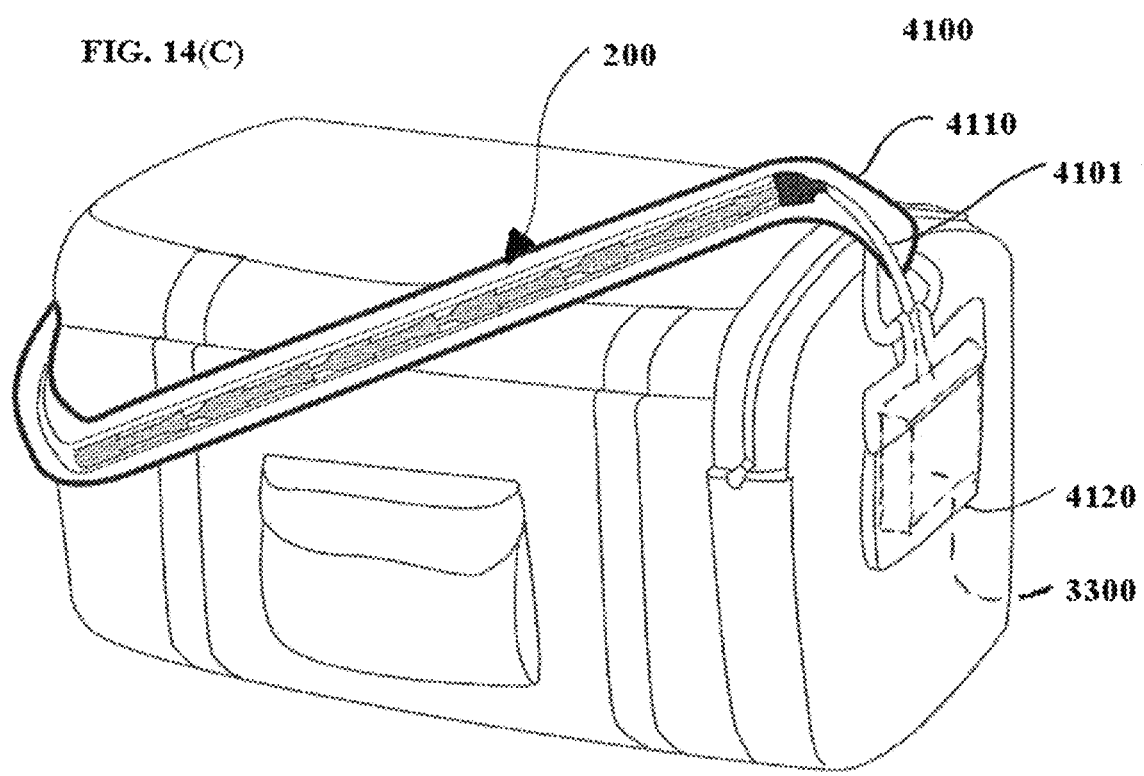

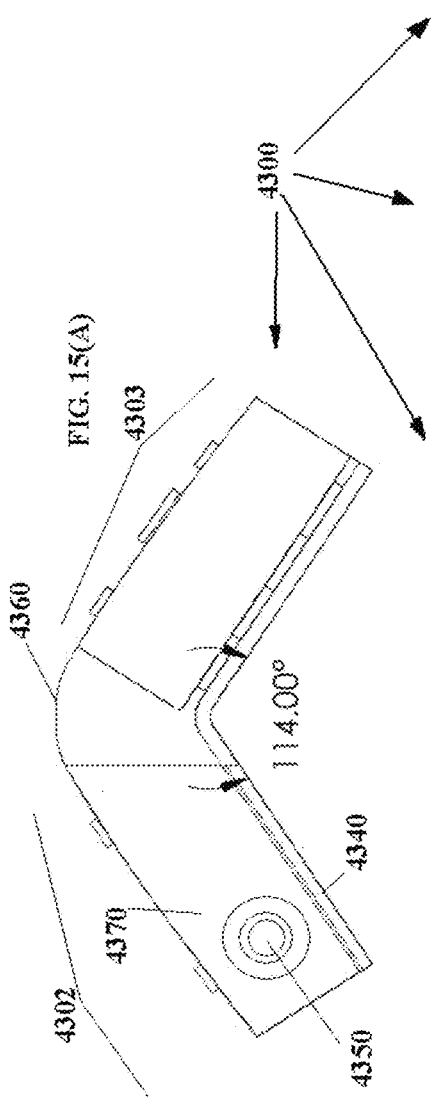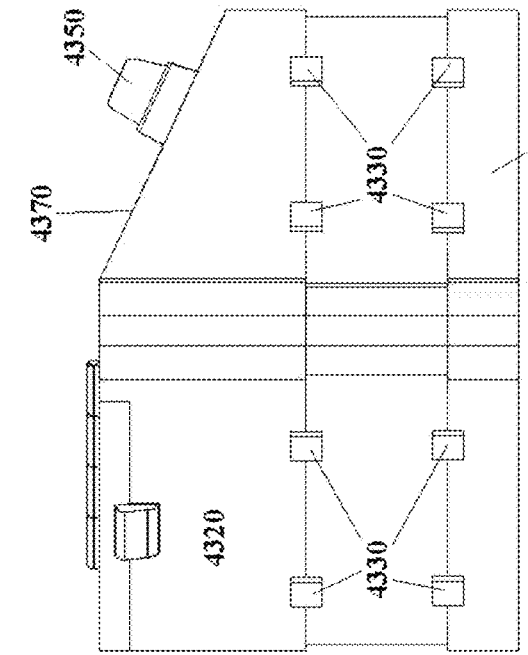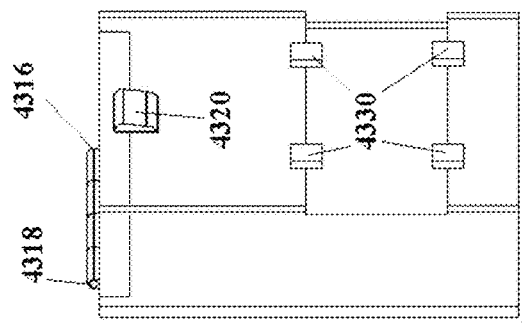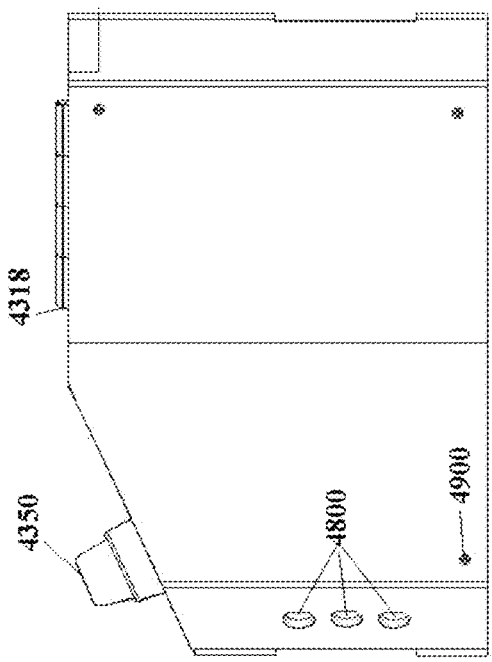
FIG. 15(A)
FIG. 15(B)
FIG. 15(C)
FIG. 15(D)

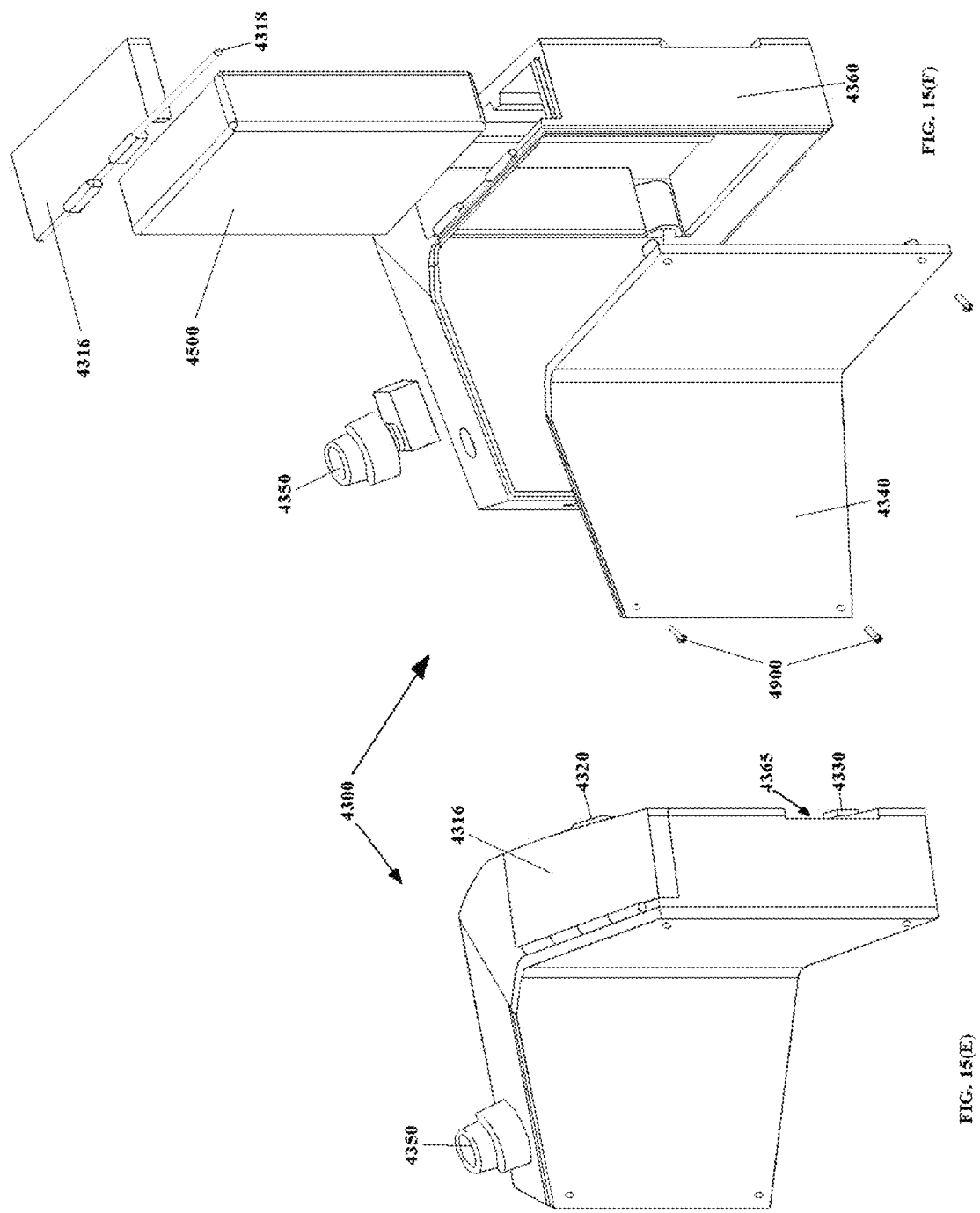

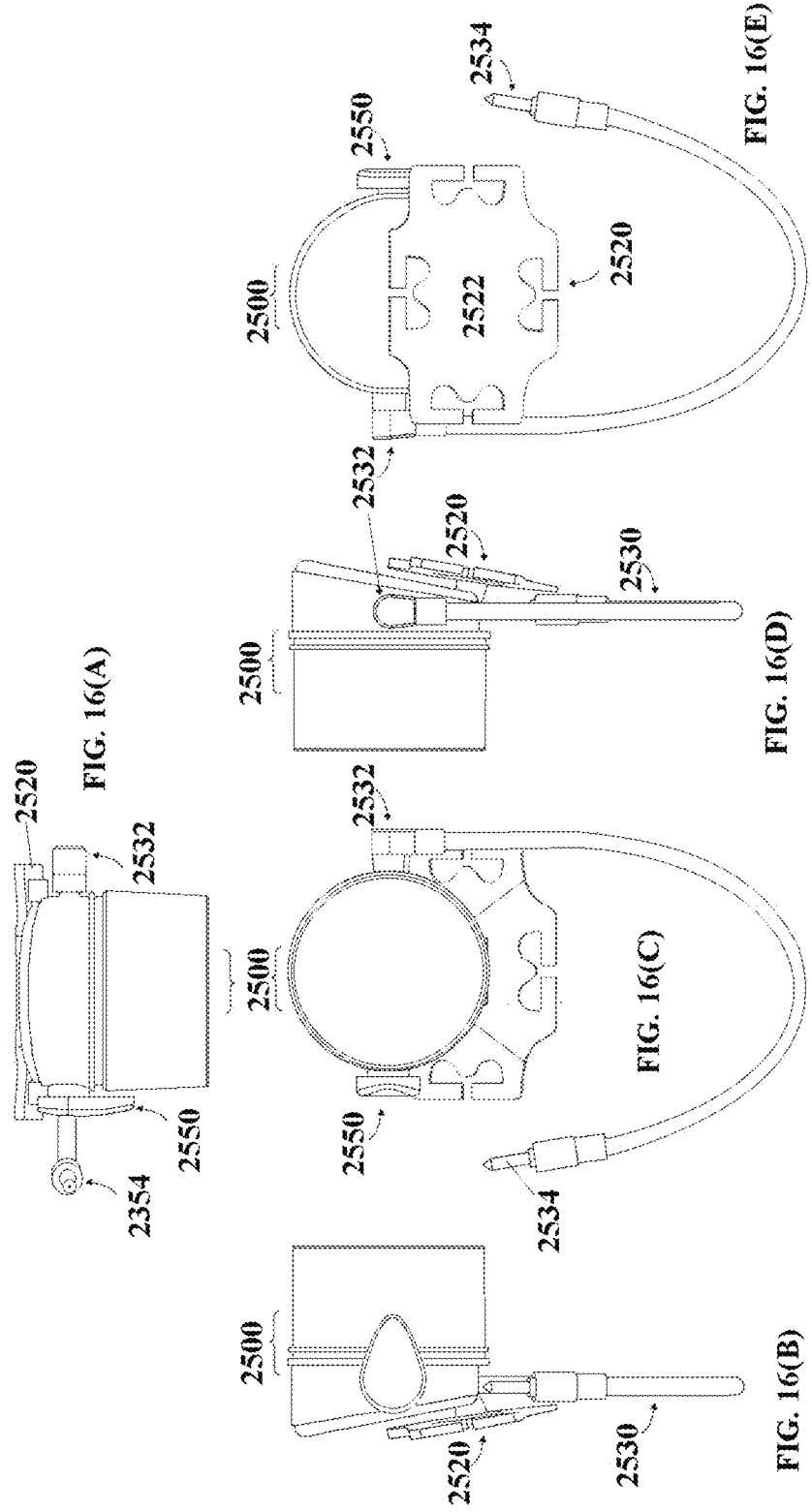

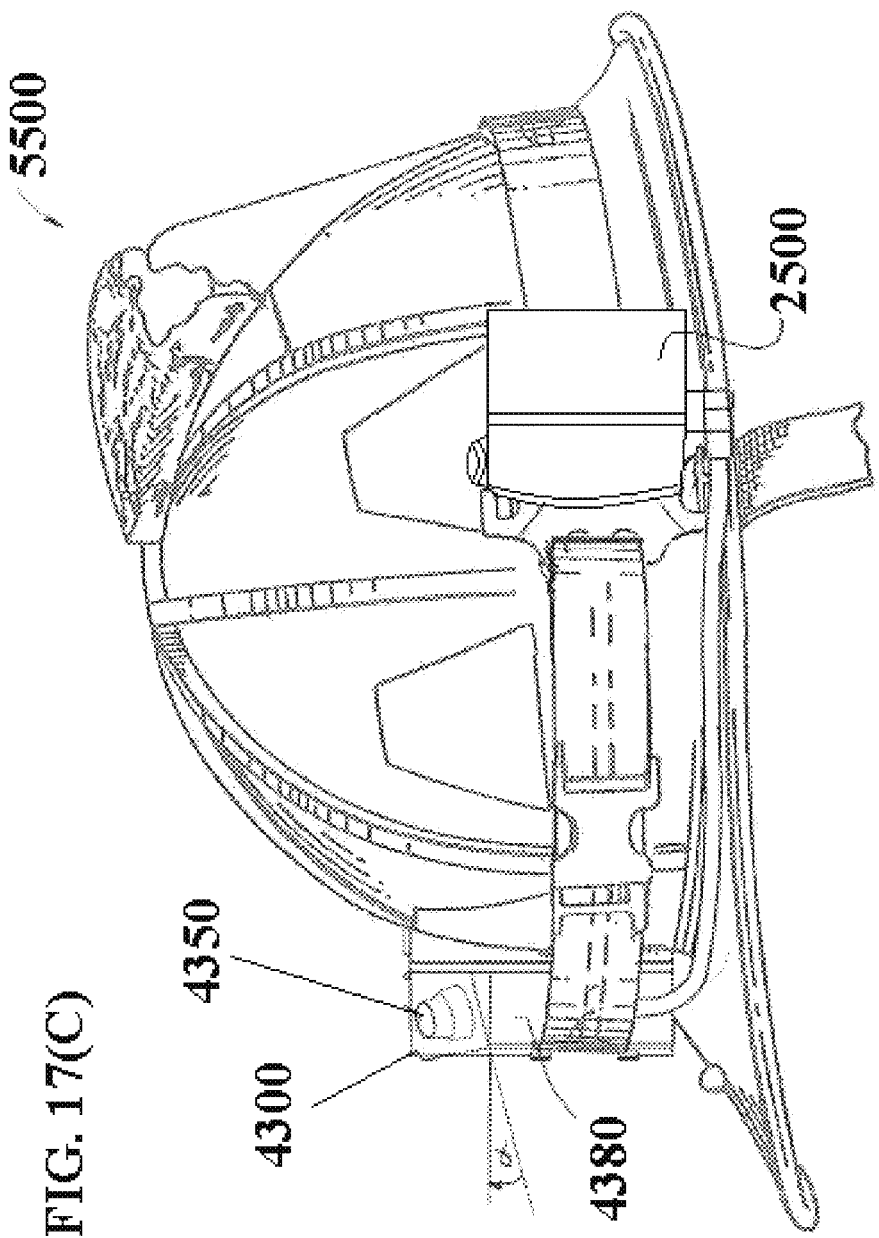

200

200

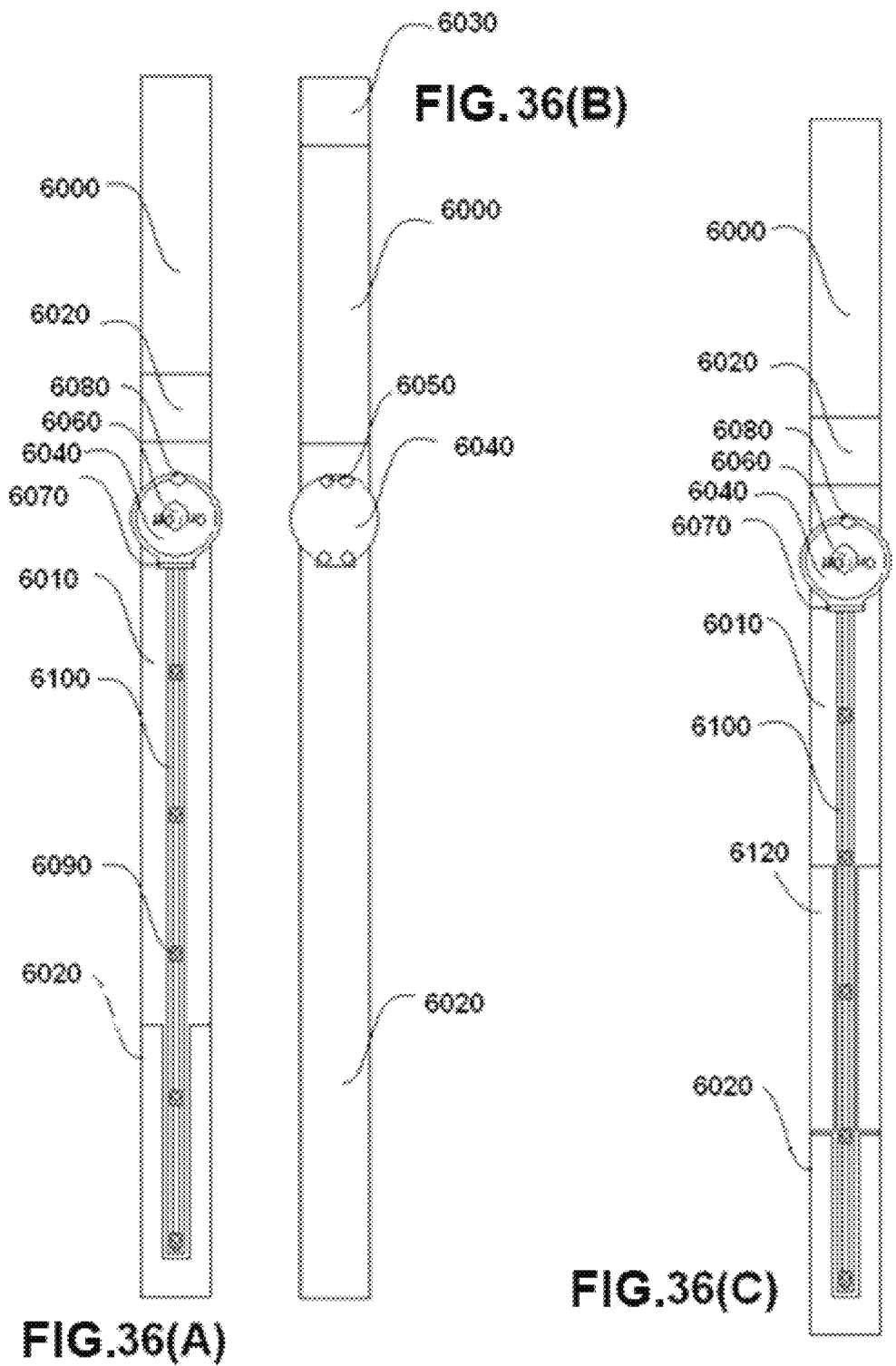

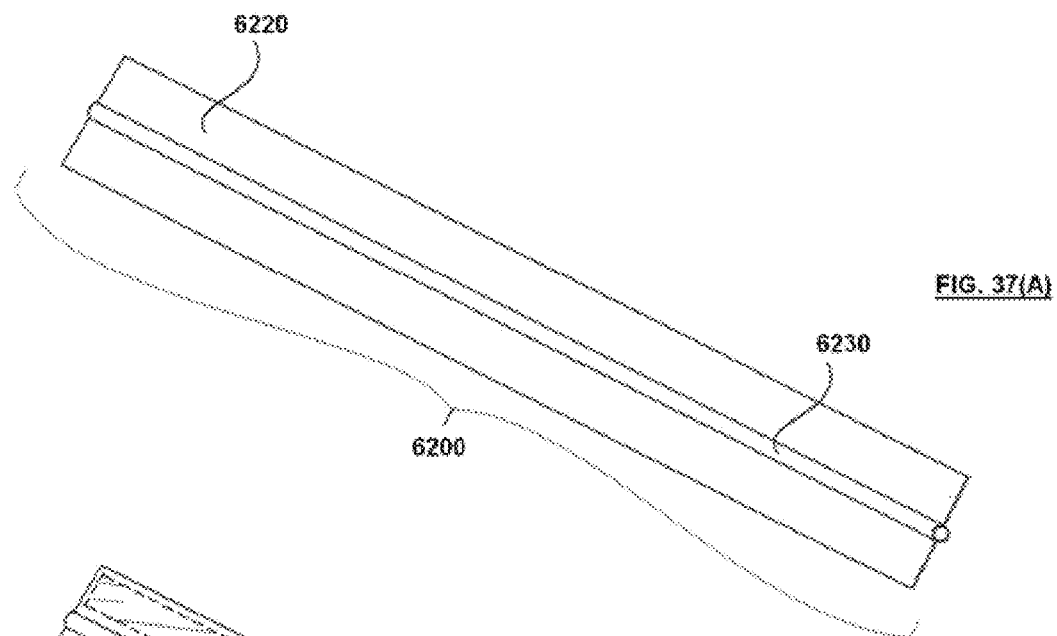
FIG. 37(A)
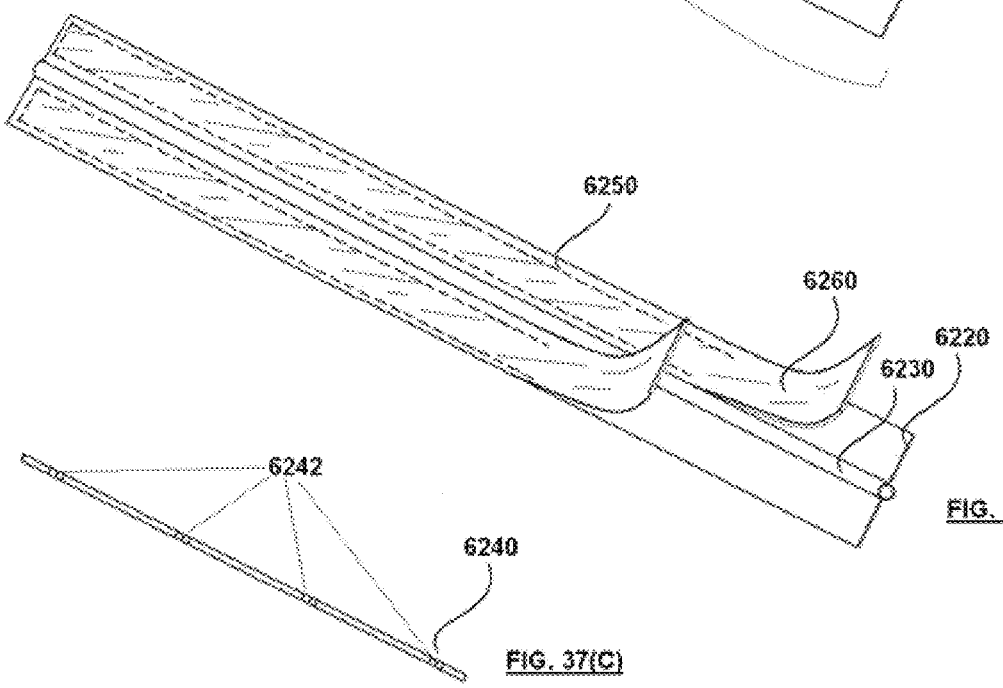
FIG. 37(B)
FIG. 37(C)
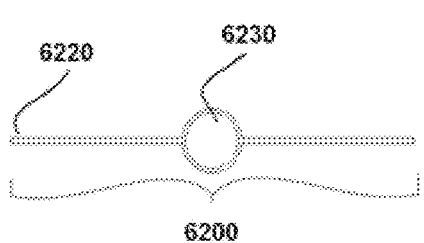
FIG. 37(D)
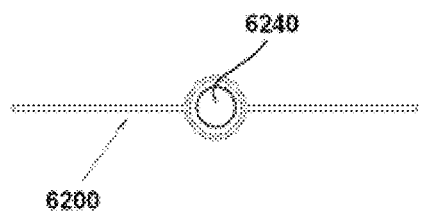
FIG. 37(E)

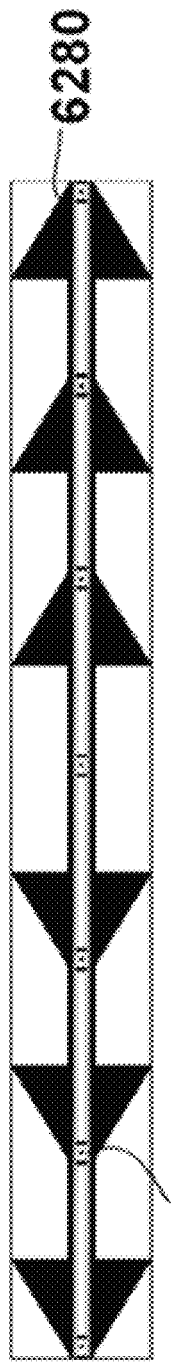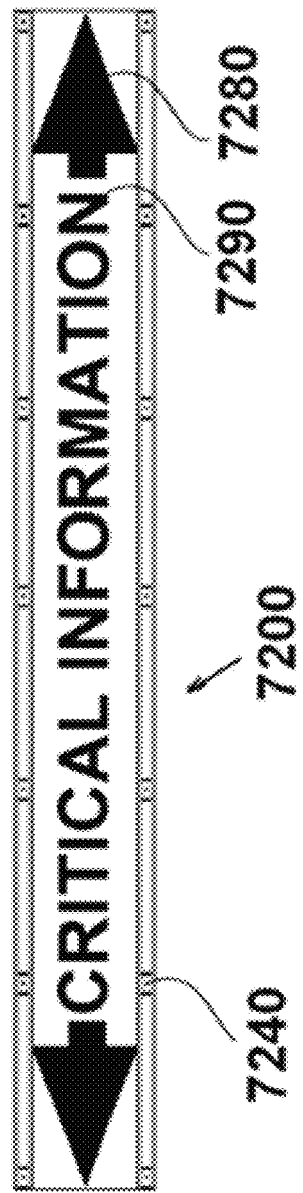
FIG. 39(A)
FIG. 39(B)

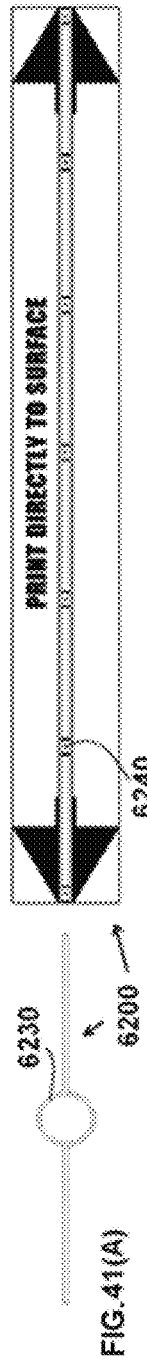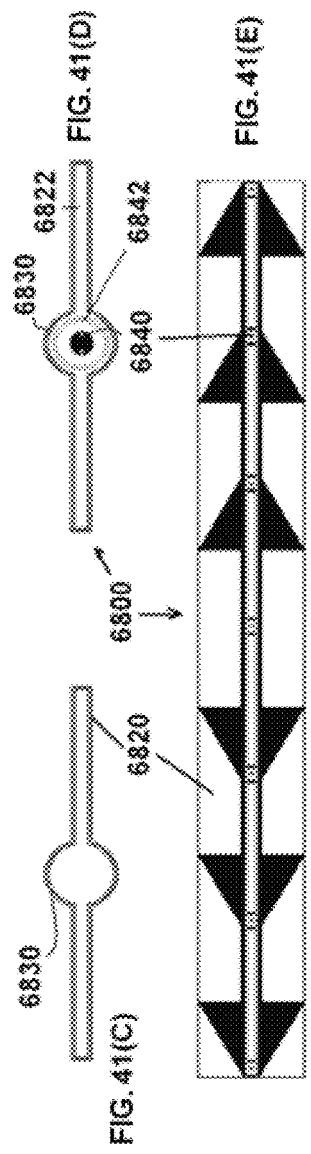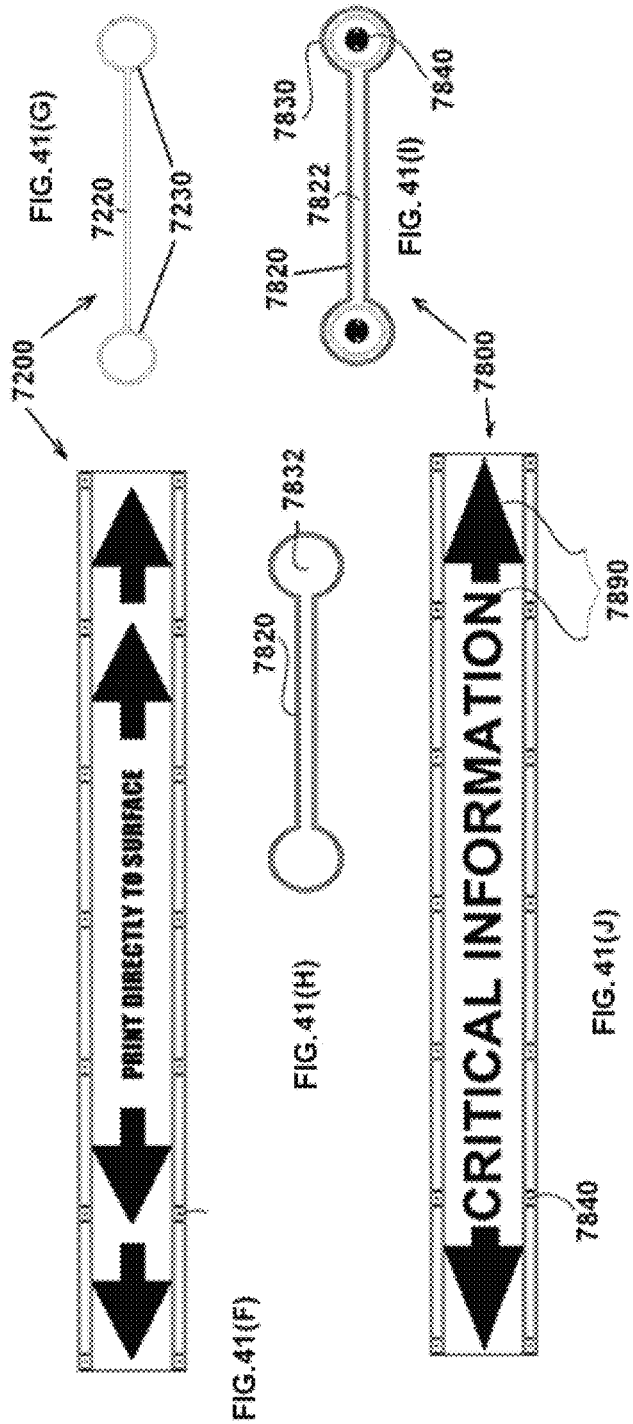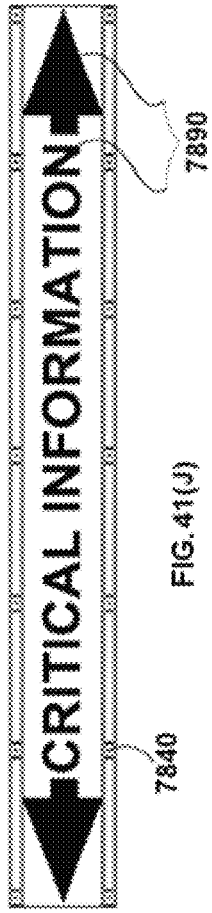

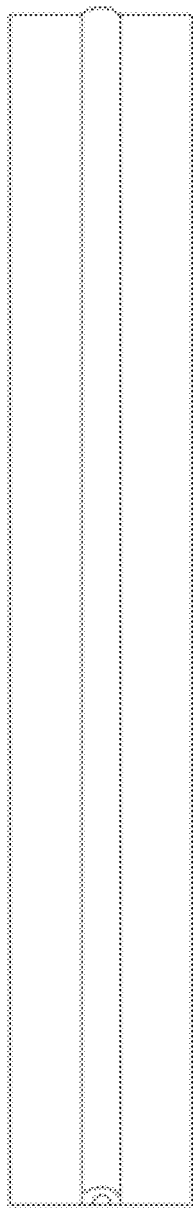
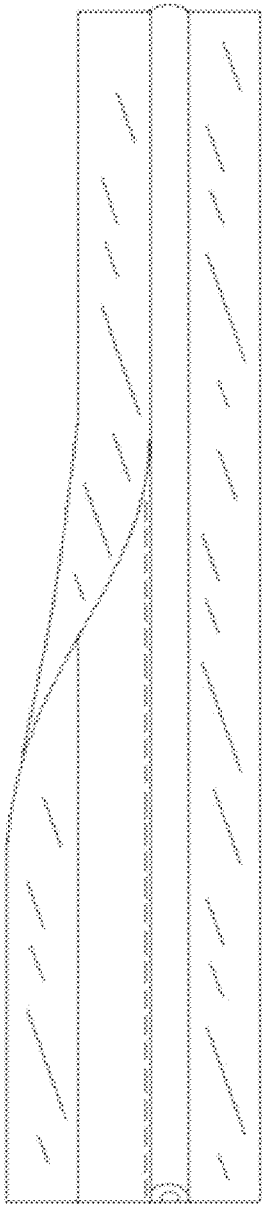
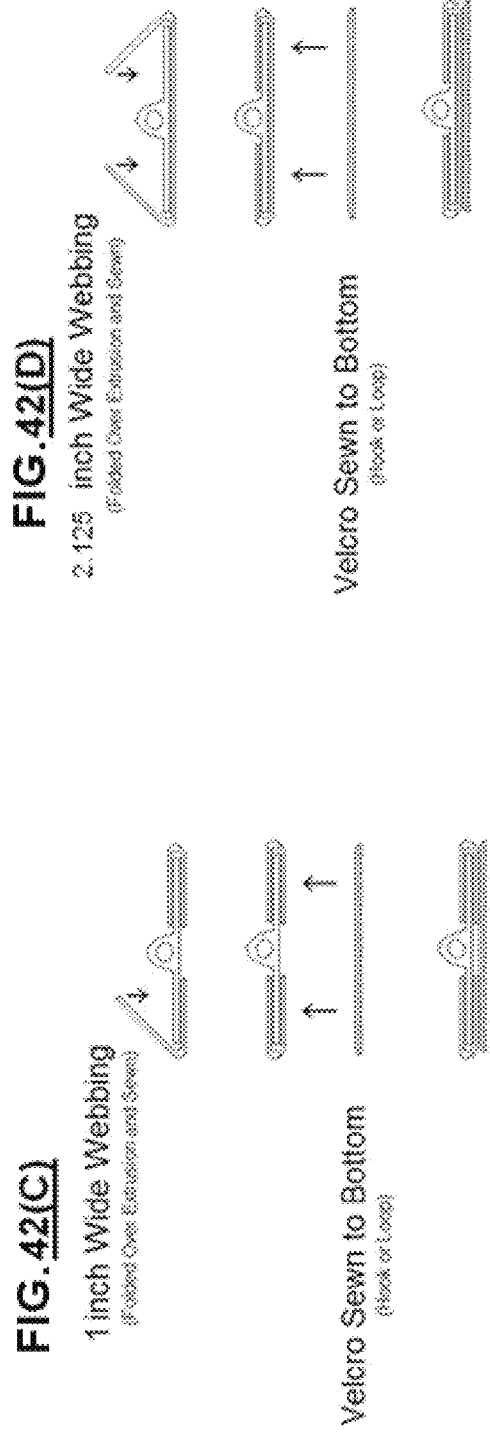
FIG. 42(A) Extrusion
FIG. 42(B) Extrusion With Sewn Webbing
FIG. 42(C) 1 inch Wide Webbing (Folded Over Extrusion and Sewn) — Velcro Sewn to Bottom (Hook or Loop)
FIG. 42(D) 2.125 inch Wide Webbing (Folded Over Extrusion and Sewn) — Velcro Sewn to Bottom (Hook or Loop)

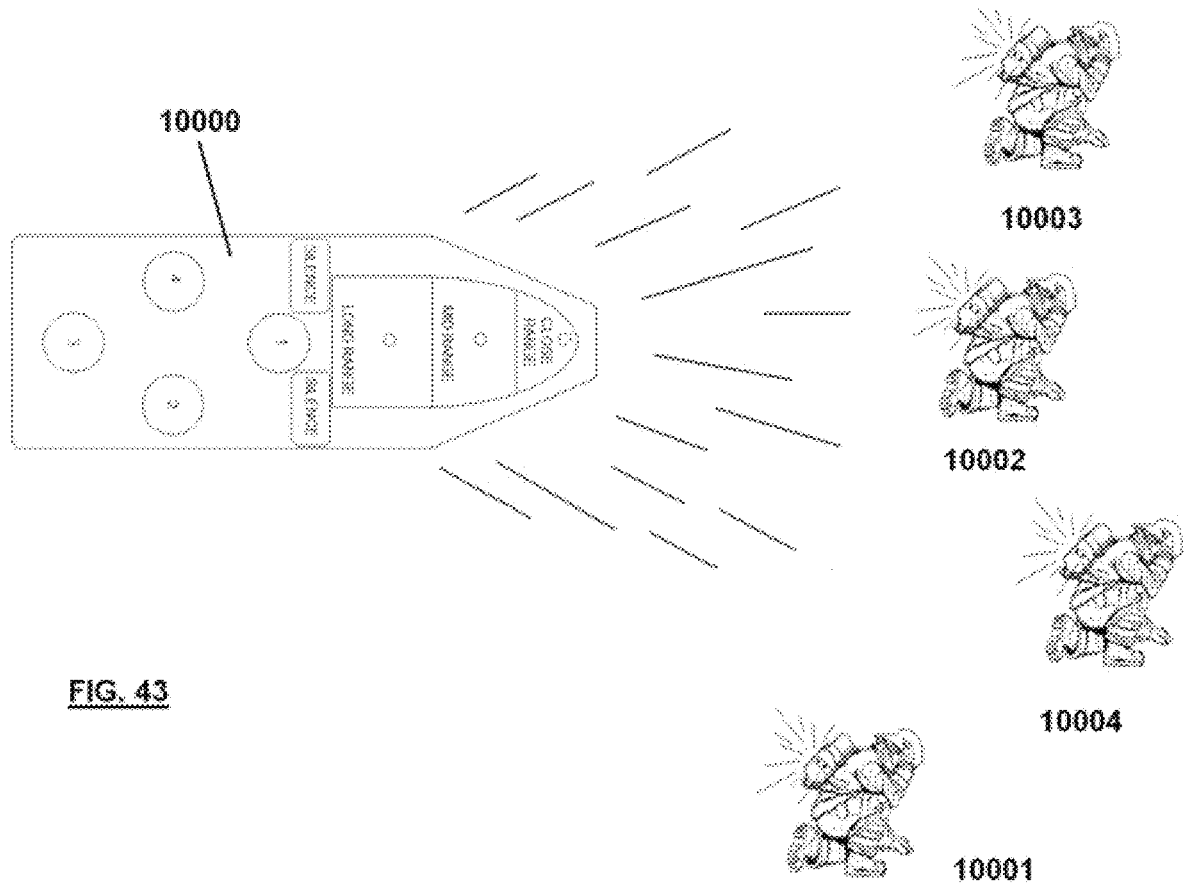
FIG. 43
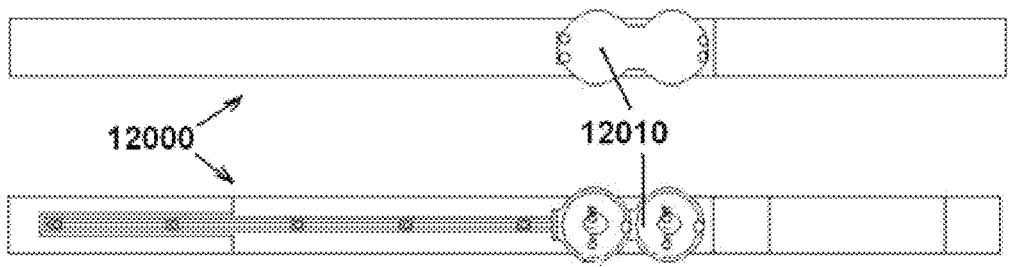
FIG. 44(A)
FIG. 44(B)

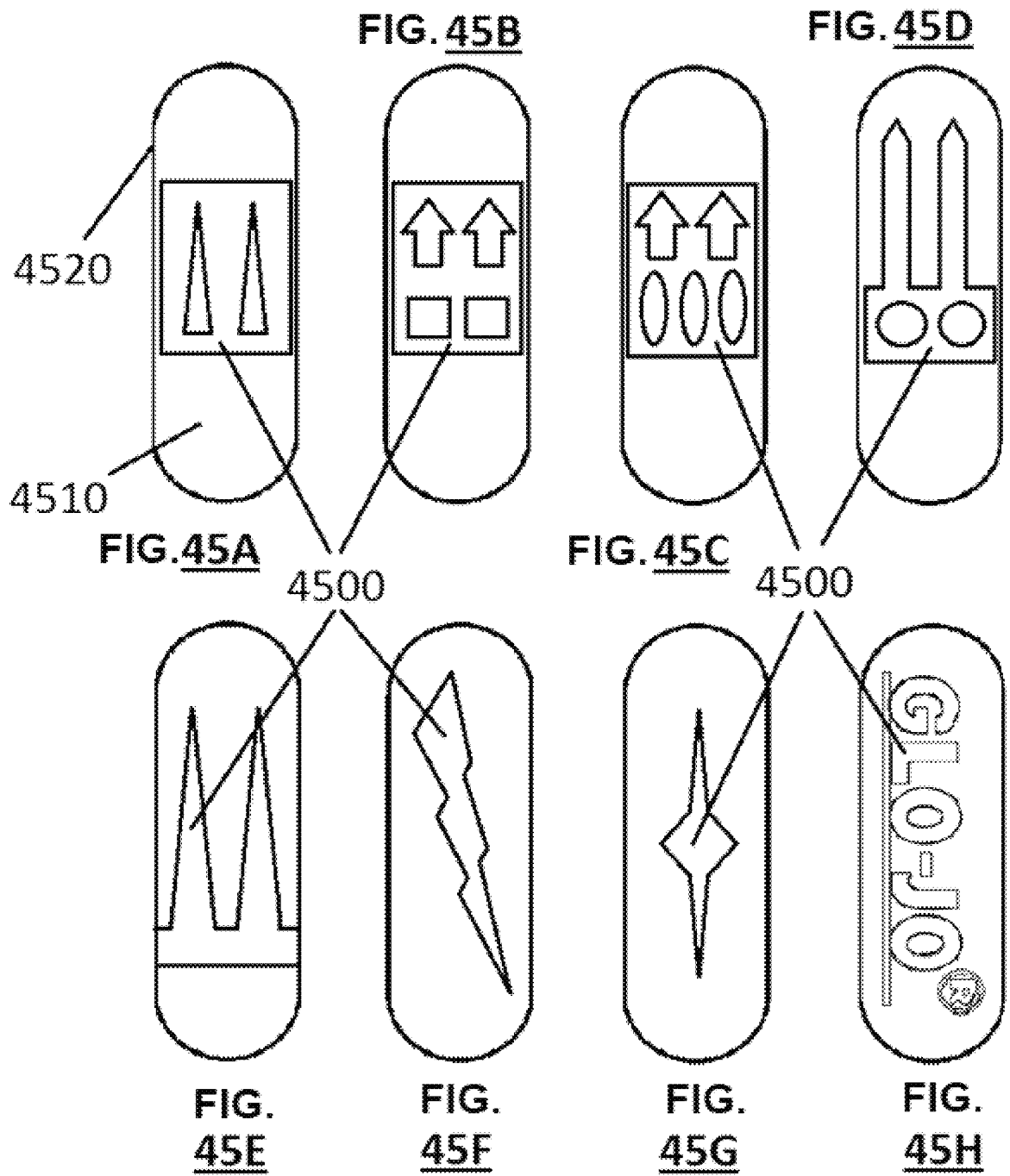

CONSPICUITY DEVICES

CROSS-REFERENCE TO RELATED APPLICATIONS

This application is a continuation of and claims the benefit of priority of U.S. patent application Ser. No. 16/909,117, filed Jun. 23, 2020, which in turn is a continuation of and claims the benefit of priority to U.S. patent application Ser. No. 16/216,763, filed Dec. 11, 2018 (U.S. Pat. No. 10,687,575), which is a continuation of and claims the benefit of priority of U.S. patent application Ser. No. 15/712,426 filed on Sep. 22, 2017 (U.S. Pat. No. 10,149,508), which in turn is a continuation-in-part of and claims the benefit of priority to U.S. patent application Ser. No. 14/691,193, filed Apr. 20, 2015 (U.S. Pat. No. 9,775,391), which in turn is a continuation-in-part of and claims the benefit of priority to U.S. patent application Ser. No. 13/350,139, filed Jan. 13, 2012, which in turn is a continuation-in-part of and claims the benefit of priority to U.S. patent application Ser. No. 12/106,301, filed Apr. 20, 2008, which in turn is a continuation-in part of and claims the benefit of priority to International Patent Application No. PCT/US07/00653, filed Jan. 10, 2007, which in turn claims the benefit of priority to U.S. Provisional Patent Application Ser. No. 60/757,623 filed Jan. 10, 2006, U.S. Provisional Patent Application Ser. No. 60/772,073 filed Feb. 10, 2006 and U.S. Provisional Patent Application Ser. No. 60/795,332 filed Apr. 26, 2006.

This application is a continuation of and claims the benefit of priority of U.S. patent application Ser. No. 16/909,117, filed Jun. 23, 2020, which in turn is a continuation of and claims the benefit of priority to U.S. patent application Ser. No. 16/216,763, filed Dec. 11, 2018 (U.S. Pat. No. 10,687,575), which is a continuation of and claims the benefit of priority of U.S. patent application Ser. No. 15/712,426 filed on Sep. 22, 2017 (U.S. Pat. No. 10,149,508), which in turn is a continuation of and claims the benefit of priority to U.S. patent application Ser. No. 14/691,193, filed Apr. 20, 2015 (U.S. Pat. No. 9,775,391), which in turn is a continuation-in-part of and claims the benefit of priority to U.S. patent application Ser. No. 13/350,139, filed Jan. 13, 2012, which in turn is a continuation-in-part of and claims the benefit of priority to U.S. patent application Ser. No. 12/413,561, filed Mar. 29, 2009, which in turn is a continuation-in-part of and claims the benefit of priority to U.S. patent application Ser. No. 11/836,885, filed Aug. 10, 2007.

This application is a continuation of and claims the benefit of priority of U.S. patent application Ser. No. 16/909,117, filed Jun. 23, 2020, which in turn is a continuation of and claims the benefit of priority to U.S. patent application Ser. No. 16/216,763, filed Dec. 11, 2018 (U.S. Pat. No. 10,687,575), which is a continuation of and claims the benefit of priority of U.S. patent application Ser. No. 15/712,426 filed on Sep. 22, 2017 (U.S. Pat. No. 10,149,508), which in turn is a continuation of and claims the benefit of priority to U.S. patent application Ser. No. 14/691,193, filed Apr. 20, 2015 (U.S. Pat. No. 9,775,391), which in turn claims the benefit of priority to U.S. Provisional Patent Application Ser. No. 61/983,429, filed Apr. 23, 2014.

This application is a continuation of and claims the benefit of priority of U.S. patent application Ser. No. 16/909,117, filed Jun. 23, 2020, which in turn is a continuation of and claims the benefit of priority to U.S. patent application Ser. No. 16/216,763, filed Dec. 11, 2018 (U.S. Pat. No. 10,687,575), which is a continuation of and claims the benefit of priority of U.S. patent application Ser. No. 15/712,426 filed on Sep. 22, 2017 (U.S. Pat. No. 10,149,508), which in turn is a continuation-in-part of and claims the benefit of priority to U.S. patent application Ser. No. 15/160,929, filed May 20, 2016, which in turn claims the benefit of priority to U.S. Provisional Patent Application Ser. No. 62/192,926, filed Jul. 15, 2015 and U.S. Provisional Patent Application Ser. No. 62/164,339, filed May 20, 2015. Each of the aforementioned patent applications is incorporated by reference herein in its entirety for any purpose whatsoever.

BACKGROUND

Field

The present disclosure relates to conspicuity devices and methods for providing ready identification of an object or individual. Particularly, the present disclosure is directed to conspicuity devices and methods that are capable for providing ready identification of an object or individual in an environment of reduced visibility such as darkness/and or smoke.

Description of Related Art

A variety of devices are generally known in the art for providing enhanced visibility of objects or individuals. Of such devices, many are directed to devices and systems for use in smoky and/or dark environments.

It can be appreciated that lighting devices on helmets, for example, have been in use for many years. Typically, such lighting devices are comprised of conventional flashlights and similar battery-operated warning devices that project light in a unidirectional beam. The main problem with such conventional devices include, for example, the size of the devices and cumbersome power supply attachments that frequently accompany them. Another significant problem with such conventional devices are that flashlights and light projecting devices tend to generate light only in the visible region, particularly white light. Such light typically reflected, for example, in smoky conditions and even absorbed by particles of haze and smoke.

Other passive devices have also been used, such as reflective materials and the like. Such passive devices are of limited utility, as they do not emit any light in low visibility conditions or complete darkness.

In short, while these devices may be suitable for the particular purpose to which they address, they are not as suitable for a device that will enable, for example, individuals wearing helmets working in various types of low visibility conditions, to be seen by others.

Furthermore, utility straps or tool bands for helmets and a variety of other similar devices have been used for years. Typically a helmet utility strap or helmet tool band is made of a flexible material that conforms to the outer shell of a helmet. The common design which is found, is a one piece circular band or strap which is made of a rubber or elastic material. However, such bands suffer from a number of deficiencies.

Significant problems with conventional utility straps or tool bands for helmets include their inability, for example: (1) to adjust to various types of helmets, (2) to open or close, (3) to mount on a helmet securely, (4) to provide for the safe keeping of tools, (5) to offer heat and flame resistance, and (6) to offer effective conspicuity in potential hazardous situations where low visibility prevents one from being seen.

As can be seen, there still remains a continued need in the art for improved devices and methods for enhancing visibility of individuals, such as emergency workers such as firemen. There also remains a need in the art for such devices that are inexpensive and easy to make. The present disclosure provides a solution for these and other problems, as described herein.

SUMMARY OF THE DISCLOSURE

The purpose and advantages of embodiments of the present disclosure will be set forth in and become apparent from the description that follows. Additional advantages of embodiments of the present disclosure will be realized and attained by the methods and systems particularly pointed out in the written description and claims hereof, as well as from the appended drawings.

To achieve these and other advantages and in accordance with the purpose of the disclosure, as embodied herein, in accordance with one aspect, the disclosure includes a tool band having a first end and a second end. The tool band further includes an elongate fire resistant webbing portion, a fire resistant elastic portion attached to the webbing portion, and a coupling portion adapted and configured to selectively attach the first end of the band to the second end of the band.

In accordance with further aspects of the disclosure, the webbing portion of the tool band may be made at least in part from aramid fibers. For example, the webbing portion may be made at least in part from KEVLAR material. If desired, the elastic portion may also be made at least in part from aramid fibers. For example, the elastic portion may be made at least in part from NOMEX material. One or more loops can be provided for the tool band that are attached to the webbing portion. The loop(s) are preferably adapted and configured to hold an object. The loops may be made from an elastic material, such as NOMEX material. Each of the loops define a passage therethrough. The passages may be generally transverse to the webbing portion of the tool band, parallel to the tool band or angled obliquely with respect to the tool band. The ends of the tool band may be attached to one another in a variety of manners, including hook and loop fasteners (e.g., Velcro® material), buckle mechanisms (e.g., Fastex buckles made from nylon), snaps, buttons, hooks and the like.

In accordance with a further aspect of the disclosure, the tool band can be further provided with a conspicuity device attached thereto. The conspicuity device can include passive retroreflective materials such as REFLEXITE® materials, materials commercially available from Corporation (Springfield, MA) or other suitable microprismatic materials, and/or retroreflective photoluminescent materials that glow in the dark when properly charged. If desired, the conspicuity device can additionally or alternatively include one or more lighting devices. For example, suitable lighting devices can include one or more electroluminescent elements, one ore more lasers and one or more work lights. The electroluminescent lamp may be affixed to the webbing and be adapted and configured to emit light. Preferably, the lamp has at least one elongate electroluminescent element defining a longitudinal axis and a transverse axis, the electroluminescent element having a plurality of relatively wide emitting segments disposed along the longitudinal axis connected to each other by a relatively narrow emitting segment. Any suitable laser can also be provided in the tool band, for example, for pointing at objects and/or for acting as a location indicator of the wearer.

The tool band preferably is also provided with a power source attached to the band. The power source is preferably adapted and configured to power one or more of the lighting devices. The work light can be any one of a suitable number of different devices. In accordance with a preferred embodiment, the work light is an LED lamp. Even more preferably, the LED lamp has a light output between about 500 and about 1500 candlepower, preferably about 1000 candlepower. The work light can be a removable flashlight that may be rechargeable, or may be integrally formed with the tool band, and be amiably mounted, as desired.

The disclosure further provides a tool band having a first end and a second end. The tool band includes an elongate webbing portion that may be fire resistant, an elastic portion that may be fire resistant attached to the webbing portion, a coupling portion adapted and configured to selectively attach the first end of the band to the second end of the band, and an elongate lighting device attached to the tool band having a first end and a second end, the elongate lighting device defining a longitudinal axis bound by the first end and second end and a transverse axis, wherein the elongate lighting device defines a plurality of spaced relatively bright emitting segments separated by relatively dimmer emitting segments.

In accordance with a further aspect, the webbing portion and the elastic portion can be made at least in part from aramid fibers. The tool band can further include at least one elastic loop attached to the webbing portion, the loop including aramid fibers, and being adapted and configured to hold an object, wherein the loop defines a passage therethrough that is generally transverse to the webbing portion of the tool band. The elongate lighting device is preferably adapted and configured to emit light in a spectrum having a peak at about 500 nm. The lighting device preferably emits light in a spectrum that substantially coincides with the sensitivity of the human eye in dark conditions. The lighting device can include an electroluminescent lamp. The electroluminescent lamp can be defined by a plurality of arrow-like shapes. The tool band can further include a power source further including an electrical inverter interposed in an operable electrical circuit between a battery and the electroluminescent lamp. The inverter is preferably adapted and configured to output an electrical signal at a frequency of about 3000 Hz to power the electroluminescent lamp. The electroluminescent lamp is preferably adapted and configured to have a peak emission at about 504 nm when driven by a 400 Hz electrical signal at 110 Vrms. The tool band is preferably flexible, elongate, and is adapted and configured to be attached to a plurality of objects.

In accordance with a further aspect, the tool band can further include an elongate fire-resistant encasement adapted and configured to house the elongate lighting device, wherein the encasement includes a plurality of layers of material bonded together to define a compartment between the layers adapted and configured to receive the elongate lighting device. A first layer can include a retroreflective polymeric material including a plurality of microprismatic reflective elements. The encasement can include photoluminescent material, such as strontium aluminate. The first layer can have a retroreflective value of about 650 cd/lux/m$^2$ (cpl) when measured in accordance with NFPA 1971, 2000 edition. The elongate lighting device is preferably adapted and configured to emit sufficient light to permit visibility of the device from a distance of about five feet in an environment rendered opaque by smoke.

If desired, the elongate lighting device can include a plurality of spaced LED elements disposed inside of a polymeric tubular member. The tubular member is preferably translucent or transparent, and conducts light along its length and through its side wall so as to define areas of brightness proximate the LEDs, and dimmer areas between the LEDs, as would be visible to an observer of the band in operation, thus resulting in an elongate lighting device having a plurality of spaced relatively bright emitting segments separated by relatively dimmer emitting segments. The tubular member is preferably attached to and comprises a portion of the encasement. If desired, the polymeric tubular member can be tinted so that a preselected spectral distribution of light generated by the LEDs passes through the tubular member. The preselected spectral distribution preferably has a peak between 480 nm and 520 nm.

In further accordance with the disclosure, the tool band can have one or more suitable tools mounted therein. Such tools can include, for example, one or more door wedges, lighting mechanisms, and wrenches, among others. If desired, a communication device, such as a radio or portable telephone can also be mounted in or integrated with the tool band.

The disclosure also provides a conspicuity device. The device includes an electroluminescent lamp adapted and configured to emit light, the lamp having at least one elongate electroluminescent element defining a longitudinal axis and a transverse axis, the electroluminescent element having a plurality of relatively wide emitting segments disposed along the longitudinal axis connected to each other by a relatively narrow emitting segment.

In further accordance with the disclosure, the elongate element can be continuous or interrupted and formed from one or more pieces of material. In accordance with one embodiment of the disclosure, the relatively narrow emitting segment may have a width along the transverse axis that is less than the width along the transverse axis of at least one of the relatively wide emitting segments. The plurality of relatively wide emitting segments may have an average width along the transverse axis between about three quarters of an inch and about one eighth of an inch. More preferably, the plurality of relatively wide emitting segments may have an average width along the transverse axis between about one half of an inch and about one quarter of an inch. Even more preferably, the plurality of relatively wide emitting segments have an average width along the transverse axis of about one quarter of an inch.

In accordance with a further aspect of the disclosure, the relatively narrow emitting segment may have an average width along the transverse axis that is between about three quarters and about one quarter the width of an adjacent relatively wide emitting segment. If desired, the relatively narrow emitting segment may have an average width along the transverse axis that is about half the width of an adjacent relatively wide emitting segment.

By way of further example, the relatively narrow emitting segment may have a length along the longitudinal axis that is less than the length along the longitudinal axis of at least one of the relatively wide emitting segments. If desired, the plurality of relatively wide emitting segments have an average length along the longitudinal axis between about three inches and about one half of an inch. More preferably, the plurality of relatively wide emitting segments may have an average length along the longitudinal axis between about two inches and about one inch. Most preferably, the plurality of relatively wide emitting segments have an average length along the longitudinal axis of about one and one half inches.

In accordance with still another aspect of the disclosure, the relatively narrow emitting segment can have an average length along the longitudinal axis that is between about three quarters and about one quarter the length of an adjacent relatively wide emitting segment. More preferably, the relatively narrow emitting segment has an average length along the longitudinal axis that is about one third the length of an adjacent relatively wide emitting segment.

In accordance with still a further aspect of the disclosure, the device preferably further includes a plurality of electrical conductors operably coupled to the electroluminescent element. Additionally, the device also may include a power source operably coupled to the electroluminescent element by way of the plurality of electrical conductors. The power source preferably includes at least one battery operably coupled to the electrical conductors. If desired, the battery may be rechargeable and/or removable from the device. In accordance with one embodiment of the disclosure, the device can emit light for more than about eight hours before the battery requires charging or replacement. In accordance with another embodiment, the device can emit light for more than about ten hours during an operating mode that provides constant illumination. In accordance with still another embodiment of the disclosure, the device can emit light for more than about forty hours during an operating mode that provides intermittent illumination.

In accordance with another aspect of the disclosure, the power source can further include an electrical inverter interposed in a circuit between the battery and the electroluminescent element. Preferably, the power source is operably coupled to at least one of the electrical conductors by a switch. The switch can be adapted and configured to permit selection of at least one operating mode of the device. For example, by using the switch, various operating modes such as constant and intermittent operation can be selected.

In yet further accordance with the disclosure, the device may include an encasement adapted and configured to house the electroluminescent element. In accordance with one embodiment, the encasement includes a plurality of layers of material bonded together to define a compartment between the layers adapted and configured to receive the electroluminescent element. The compartment may be defined by a seal about its periphery. The seal may include at least one of a heat seal, a solvent weld, an ultrasonic weld, stitching and an adhesive seal, among others. At least one layer of the encasement includes polymeric material. Preferably, all layers of the encasement include some amount of polymeric material. Preferably, the polymeric material is fire resistant.

A number of suitable polymeric materials can be used, including various vinyl materials.

The encasement preferably includes a polymeric base layer upon which the electroluminescent element is positioned. A clear lens layer is then affixed to the base layer, trapping the electroluminescent element between the two layers. The lens layer is preferably formed from a vinyl material. Even more preferably, the vinyl lens layer is heat resistant, and permits passage of visible light and ultraviolet light therethrough.

In accordance with a further aspect of the disclosure, the polymeric base layer preferably includes retroreflective material. For example, the base polymeric base layer may include a plurality of microprism reflective elements integrally bonded to the polymeric material. In accordance with one embodiment, the polymeric base layer has a retroreflective value in excess of 350 cd/lux/m$^2$ (cpl) when measured in accordance with NFPA 1971, 2000 edition. Preferably, the layer has a retroreflective value of about 650 cd/lux/m$^2$ (cpl). The polymeric base layer may also be bonded to a fabric-reinforced polymeric backing material. For example, the polymeric base layer can be formed from REFLEXITE® material, such as described in U.S. Pat. Nos. 4,801,193, 4,244,683, 4,243,618, 4,202,600, 4,555,161, 5,171,624, 5,264,063 and 5,229,882. All of these patents are incorporated by reference herein in their entireties.

If desired, the polymeric base layer of the encasement may additionally or alternatively include photoluminescent retroreflective material. Such materials are described, for example, in U.S. Pat. Nos. 5,415,911, 6,159,878, 6,569,786, and 6,656,566. Each of these patents is incorporated by reference herein in its entirety. The photoluminescent retroreflective material is preferably charged by exposure to ultraviolet light. Preferably, the retroreflective photoluminescent material includes photoluminescent elements including strontium aluminate. Other materials, such as zinc sulfide photoluminescent elements may also be used. Comparatively speaking, strontium aluminate retroreflective material tends to have a higher brightness and longer afterglow, which may be desirable in certain applications. These photoluminescent crystals (e.g., strontium aluminate) may be are cast into a polymeric material such as a pliable PVC vinyl, and used in a manner similar to the REFLEXITE® material.

In further accordance with one embodiment of the conspicuity device provided by the disclosure, the electroluminescent lamp can be adapted and configured to emit a majority of photons in a wavelength range of about 500 nm. The spectral energy distribution of certain embodiments of the lamp demonstrate a peak distribution at about 500 nm, extremely close to the peak sensitivity of the human eye in darkness of about 507 nm. As such, these embodiments of the disclosure are particularly tuned for maximum performance in a dark and/or smoky environment. As such, while the electroluminescent lamp is adapted and configured to emit generally blue light, a significant amount of generally green wavelengths are also preferably present. Such emission can be ensured by selecting an appropriate frequency for powering the electroluminescent lamp, as described herein.

In further accordance with the disclosure, effective peak intensities for the lamp are between about 0.05 Candela and 0.15 Candela. In accordance with one example, the peak intensity for the lamp is about 0.13 Candela. Surprisingly, such a lamp is nonetheless highly visible in a dark, smoky environment. In accordance with a further aspect of the disclosure, the lamp is adapted and configured to emit sufficient light to permit visibility of the device from a distance of about three to six fee in a black smoky environment.

In still further accordance with the disclosure, the elongate electroluminescent element is a monolithic structure formed from a single sheet of electroluminescent material. In accordance with one aspect of the disclosure, the lamp can be adapted and configured to operate in a first operating mode wherein the lamp is on constantly and a second operating mode wherein the lamp blinks. If desired, the lamp can be adapted and configured to transmit a distress signal in the second operating mode.

In accordance with still a further aspect of the disclosure, an article of clothing, such as a helmet, jacket, pair of trousers and/or footwear is provided. Accordingly, a helmet may be provided including a generally rigid protective shell, and an electroluminescent conspicuity device as described herein. In accordance with one embodiment of the disclosure, the conspicuity device is disposed about less than the entire periphery of the helmet. For example, the conspicuity device may be disposed about more than about 40% and less than about 90% of the periphery of the helmet. Preferably, the conspicuity device is not disposed proximate the front of the helmet in order to reduce exposure of the conspicuity device to heat of a fire in use. Accordingly, the helmet may be a firefighter's helmet.

The disclosure also provides a conspicuity device including a band adapted and configured to be mounted to an object and a laser beacon mounted on the band.

In further accordance with the disclosure, an electroluminescent lamp may be mounted on the band. The electroluminescent lamp may be similar to those described above, among others. A power source may also be mounted on the band for powering at least one of the lamp and the beacon. If desired, the conspicuity device may further include a LED work light mounted on the band. If desired, the power source may be adapted and configured to power at least one of the lamp, the beacon and the work light. By way of further example, if desired, the conspicuity device may further include a global positioning device.

In still further accordance with the disclosure, the laser beacon of the conspicuity device may be mounted in a loop attached to the band. If desired, the laser beacon may be rotatably mounted to the band. By way of further example, the laser beacon may be pivotally mounted and weighted (e.g., by a pendulum) to direct a beam vertically upward when in use to form a signal beacon. The laser can be adapted and configured to emit light in a variety of wavelengths. For example, the laser can emit, green, blue or violet lights, among others.

The beam of the laser beacon can have a variety of shapes. For example, the laser can emit a collimated beam of light or a diverging beam of light, as desired. The beam is preferably not too narrow. For example, in accordance with one embodiment, the laser is preferably adapted and configured to emit a beam having a diameter in excess of one centimeter at a point in the beam more than twenty feet from the laser.

In further accordance with the disclosure, the laser can include a laser generator adapted and configured to generate a substantially parallel beam, and a first lens downstream from the laser generator adapted and configured to cause the parallel beam to diverge as it passes through the first lens. If desired, the laser can further include a housing for holding the first lens and laser generator, and a second lens disposed in the path of the beam downstream from the first lens. The second lens is preferably adapted and configured to cause the diverging beam passing from the first lens to be substantially collimated. If desired, the distance along the beam path between the first lens and second lens can be adjusted to change the diameter of the beam passing from the second lens. For example, the distance between the lenses may be adjusted by rotating a portion of the housing. Accordingly, the diameter of the beam leaving the laser can be adjusted from a diameter of about one eighth of an inch to a diameter of about one half inch.

In still further accordance with the disclosure, the housing of the conspicuity device may define a compartment for receiving a battery for powering the laser. If desired, the laser may also be configured to operate in a plurality of operating modes. For example, the laser can be operated in a first operating mode wherein the laser is on constantly, and a second operating mode wherein the laser blinks. In accordance with one aspect of the disclosure, the laser is preferably adapted and configured to transmit a distress signal in the second operating mode.

The disclosure also provides a method for making a conspicuity device. The method includes providing an elongate electroluminescent element, and bonding a plurality of layers of material to each other to define an encasement having an elongate compartment for receiving the elongate electroluminescent element.

In further accordance with the disclosure, the plurality of layers of material can include a base layer onto which the electroluminescent element is placed, and a lens layer that is placed on top of the base layer and the electroluminescent element. The base layer can me made from any suitable material, including a retroreflective polymeric material that may be photoluminescent, as described herein. If desired, the encasement may then be attached to a piece of base material. The base material may include any combination of webbing and elastic material as described herein. Preferably, the base material is fire resistant. By way of further example, the base material can include any suitable article of clothing, such as a jacket, a shirt, a pair of trousers or shorts, footwear such as boots or sneakers and headgear such as helmets, hats or headbands or a sash, among others.

The disclosure also provides a method of providing improved conspicuity in an environment rendered opaque by smoke and/or darkness. The method includes providing an illuminative device to an object to be given conspicuity, and causing the illuminative device to emit light having a wavelength equal to or shorter than about 550 nm. More preferably, the illuminative device emits light having a wavelength equal to or shorter than about 510 nm. If desired, the light emitted by the illuminative device may have a wavelength equal to or shorter than about 475 nm. By way of further example, the light emitted by the illuminative device may have a wavelength equal to or shorter than about 445 nm or 400 nm. As the wavelength of the emitted light progresses below 500 nm, the devices may be more useful in applications where it is desired to view an object from a long distance away. If desired, the illuminative device may include a laser, a lamp having an electroluminescent element and/or an LED lamp, among others.

The disclosure also provides a flashlight. The flashlight includes a direct current power source, a lamp operably coupled to the power source, and an electrical inverter operably coupled to the power source for converting direct current to alternating current.

In further accordance with the disclosure, the flashlight of the disclosure may include an electrical port operably coupled to the electrical inverter for supplying alternating current to another device. The flashlight can include a variety of direct current power supplies, such as conventional and/or rechargeable batteries, and the like. If desired, the flashlight can also include an electrical generator that can generate electricity and store it in a battery during periods of extended use. The generator can be used to generate power, for example, by shaking the flashlight, by turning a generating crank, and the like. Suitable examples of generating schemes are described, for example, in U.S. Pat. Nos. 6,994,450, 6,914,340, 6,563,269 and 6,322,233. Each of these patents is incorporated by reference herein in its entirety. If desired, the flashlight can also include a DC power port for powering a DC accessory, such as a laser as described herein.

In accordance with another aspect of the disclosure, a conspicuity device is provided including an electroluminescent lamp, and a flashlight operably coupled to the electroluminescent lamp; wherein electrical power is drawn from the flashlight to power the electroluminescent lamp.

In further accordance with the disclosure, the conspicuity device can further include an inverter adapted and configured to convert direct current to alternating current for powering the electroluminescent lamp. If desired, the inverter may be integrally formed with the electroluminescent lamp. Alternatively, the inverter may be integrally formed with the flashlight.

In accordance with still another aspect, the disclosure provides a lighting device including a light source having a spectral energy distribution that is specifically adapted and configured to substantially overlap the spectral sensitivity of the human eye in one or more viewing conditions.

In further accordance with the disclosure, the spectral energy distribution of the light source may be specifically adapted and configured to substantially overlap the spectral sensitivity of the human eye in photopic, mesopic and/or scotopic conditions. The overlap of the spectral distribution of the light source and the sensitivity of the human eye can be less than or equal to about 100%, about 95%, about 90%, about 85%, and so on in any suitable increments (e.g., of 1% or 5% for example) until the overlap ceases to have a performance advantage by virtue of the overlap. For example, there may only be a 20% overlap, but the 20% overlap may lie in a region of particular sensitivity of the human eye. For example, in darkness conditions, the human eye is most sensitive to light having a wavelength of about 507 nm. As such, a light having even a small portion of its spectral distribution (e.g., about 10%) at or near 507 nm may demonstrate significant visibility.

In further accordance with the disclosure, the lighting device may include an active lighting device and/or a passive lighting device. For example, if the lighting device is active, it may be selected from the group including (i) a running light for a car, (ii) an illuminated sign, (iii) an illuminated warning signal (iii) an interior building light, (iv) a street light, (v) a reading light, (vi) a flashlight (vii) a light emitting diode and (viii) electroluminescent material, among others. If the lighting device is passive, the device may include photoluminescent material and/or retroreflective material. If it is passive, the lighting device may selected from the group including (i) a surface of a motor vehicle, (ii) a road sign, (iii) a fence (iii) an interior surface of a building and (iv) paint, among others.

In further accordance with the disclosure, a method of constructing a lighting device is provided. The method includes providing an electroluminescent lamp, and selecting a power source for powering the electroluminescent lamp having a frequency and voltage output that will cause the electroluminescent lamp to have a spectral energy distribution that is specifically adapted and configured to substantially overlap the spectral sensitivity of the human eye.

In further accordance with the disclosure, the voltage and frequency of the power source may be selected such that the spectral energy distribution of the electroluminescent lamp is specifically adapted and configured to substantially overlap the spectral sensitivity of the human eye in photopic, mesopic and/or scotopic conditions.

It is to be understood that both the foregoing general description and the following detailed description are exemplary and are intended to provide further explanation of the claimed embodiments.

The accompanying drawings, which are incorporated in and constitute part of this specification, are included to illustrate and provide a further understanding of the methods and systems of the disclosure. Together with the description, the drawings serve to explain the principles of embodiments of the present disclosure.

BRIEF DESCRIPTION OF THE DRAWINGS

FIGS. 1(A)-1(B) are partial views of a representative embodiment of a conspicuity device provided in accordance with the present disclosure.

FIGS. 3(A)-3(H) is a plan view of an exemplary embodiment of an electroluminescent element made in accordance with the present disclosure.

FIGS. 7(A)-7(E) and FIGS. 8(A)-8(F) depict articles of clothing embodying technology provided in accordance with the present disclosure.

FIGS. 13(A)-13(M) depict various views of a modular power source provided in accordance with the disclosure.

FIG. 14(C) depicts a container such as a bag made in accordance with the disclosure.

FIGS. 15(A)-15(I) depict various views of another embodiment of a modular power source made in accordance with the disclosure.

FIGS. 16(A)-16(E) depict views of another embodiment of a work light made in accordance with the disclosure.

FIGS. 17(A)-17(D) depict a helmet including devices made in accordance with the disclosure.

FIGS. 36(A)-36(C) illustrate various views of a further embodiment of a conspicuity device made in accordance with the disclosure.

FIGS. 37(A)-37(E) illustrate further aspects of conspicuity devices made in accordance with the disclosure.

FIGS. 39(A)-39(B) illustrate further aspects of conspicuity devices made in accordance with the disclosure.

FIGS. 41(A)-41(J) illustrate further aspects of conspicuity devices made in accordance with the disclosure.

FIGS. 42(A)-42(D) illustrate further aspects of conspicuity devices made in accordance with the disclosure.

FIG. 43 illustrates further aspects of conspicuity devices made in accordance with the disclosure.

FIGS. 44(A)-44(B) illustrate further aspects of conspicuity devices made in accordance with the disclosure.

FIGS. 45(A)-45(H) illustrate further aspects of conspicuity devices made in accordance with the disclosure.

DETAILED DESCRIPTION OF THE PREFERRED EMBODIMENTS

Figure 2:
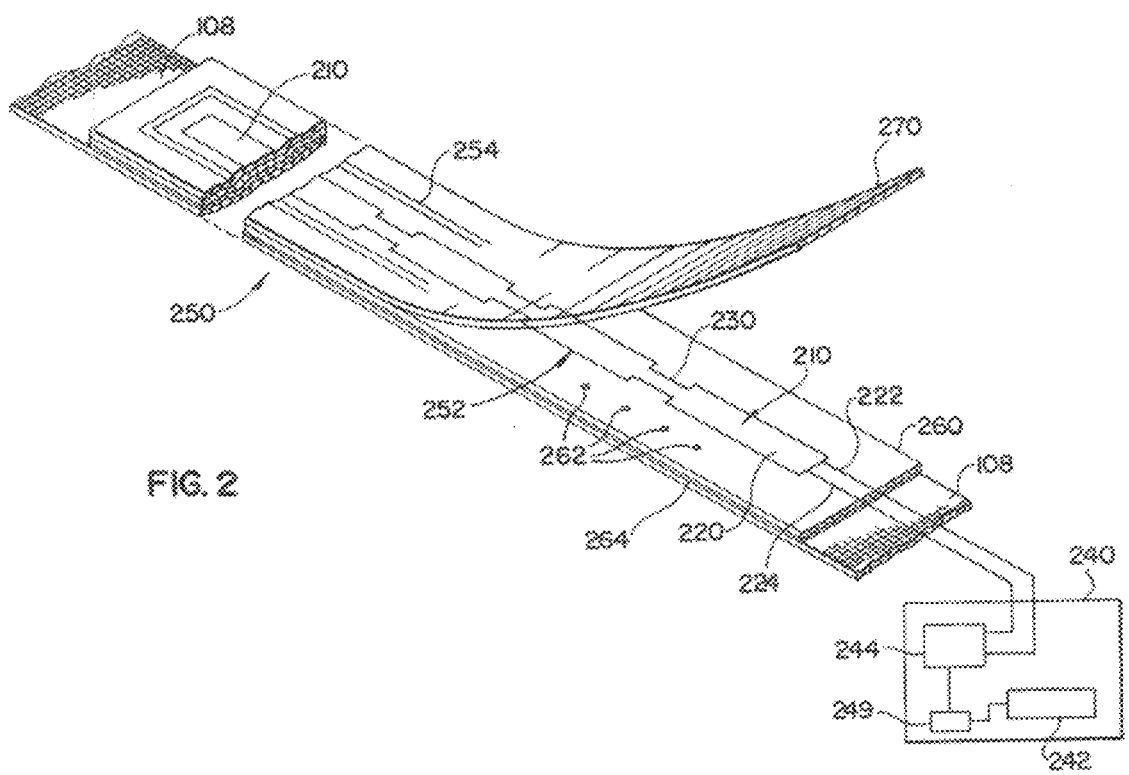
FIG. 2 is an exploded view of an encasement made to house a conspicuity device made in accordance with the present disclosure.
Figure 3D:
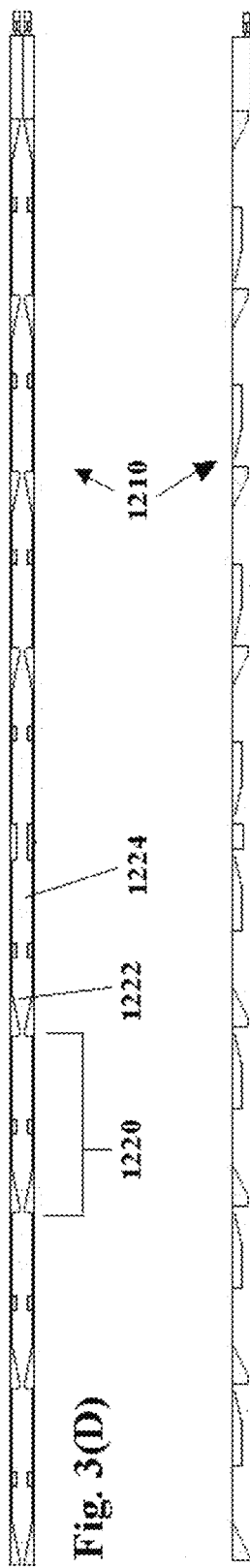
Figure 3E:
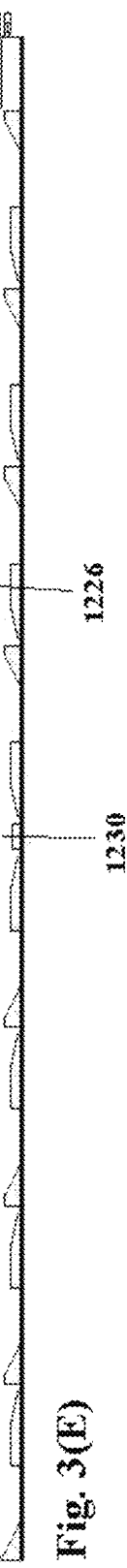
Figure 3F:
Figure 3G:
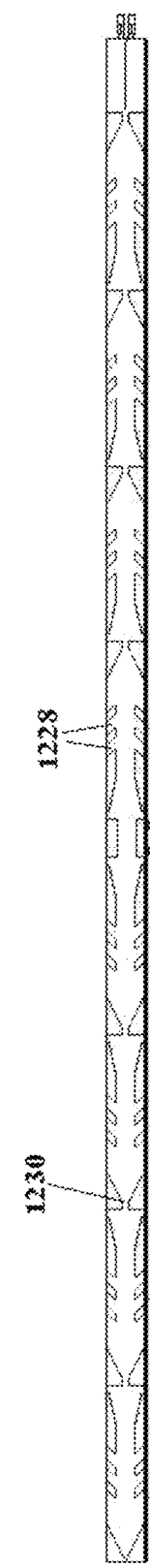

Reference will now be made in detail to the present preferred embodiments of the disclosure, examples of which are illustrated in the accompanying drawings. The methods and corresponding steps of the disclosure will be described in conjunction with the detailed description of the system.

The devices and methods presented herein may be used for myriad purposes. Generally, the devices described herein may be used for providing enhanced visibility in photopic, mesopic and/or scotopic conditions, as appropriate. The present disclosure is particularly suited for providing enhanced visibility in emergency situations involving smoke, haze and/or darkness.

The inability for the common helmet utility strap or tool band to adjust lengthwise presents several problems. Over time a loop of fixed length made of rubber or elastic material when conformed to a shape will lose its elasticity. This will eventually prevent the device from effectively maintaining its elastic tension around a helmet, for example. Typically, when this occurs the user must discard the device because it is ineffective. Moreover, the lack of tension that occurs directly compromises the safe keeping of tools or other devices reliant on the constant elastic tension required for effective mounting on a helmet. The novel and useful improvements described herein offer a significant improvement to conventional designs.

In accordance with one aspect of the disclosure, a tool band is provided including one or more loops for holding tools.

For purpose of explanation and illustration, and not limitation, a partial view of an exemplary embodiment of the tool band in accordance with the disclosure is shown in FIG. 1 and is designated generally by reference character 100. Other embodiments of a tool band in accordance with the disclosure, or aspects thereof, are provided in FIGS. 2-17, as will be described.

As illustrated in FIG. 1(A), tool band 100 includes a first end 102, a second end 104 and has an elongate flexible body 106. Preferably, flexible body portion 106 includes an elongate fire resistant webbing portion 108, a fire resistant elastic portion 110 attached to the webbing portion, and a coupling portion 112 that is adapted and configured to selectively attach the first end 102 of the band 100 to the second end 104 of the band 100.

The inability for the common helmet utility strap to provide heat and flame resistance when in extreme conditions is based strictly on the very lack of heat and flame resistant properties of the materials used in its construction. When a conventional utility strap or tool band made from non-heat-resistant material (e.g., rubber or elastic) is exposed to heat and flame, it can easily loose its elasticity resulting in a loss of tension and decreasing or eliminating its efficacy as a tool band. The potential also exists for the helmet utility strap to completely fail by snapping or being burnt off.

The portions of tool band 100 may be made from a variety of materials. For example, the webbing portion 108 of the tool band 100 may be made at least in part from aramid fibers. For example, the webbing portion 108 may be made at least in part from KEVLAR™ material. A particular example of webbing can be one-inch wide KEVLAR™ webbing that passes the National Fire Protection Act ("NFPA") 1981 Heat Test & Flame Test. Such a material can be a modacrylic blend including, for example, 83% KEVLAR™ material and 17% modacrylic material. Such webbing material may be obtained, for example, from Offray Specialty Narrow Fabrics, Inc., located in Chester, New Jersey 07930 (Tel: (908) 879-3636. Providing a band 100 made from heat and flame resistant material presents a solution to the dilemma described above.

If desired, the elastic portion may also be made at least in part from aramid fibers. For example, the elastic portion may be made at least in part from NOMEX™ material. An example of a suitable NOMEX™ material includes one-inch wide NOMEX™ material that passes the NFPA 1981 Heat Test & Flame Test. Such material may be about 50% NOMEX™ material and about 50% elastic material. Such material can also be obtained from Offray Specialty Narrow Fabrics, Inc.

The inability for the common helmet utility strap to provide the safe keeping of tools is consistent with its very basic design. The common application of a helmet utility strap or tool band is to trap a tool between the material of the band and the surface of the helmet. The tension of the elasticity of the band is used to secure the tool against the helmet. Although very basic, this method of trapping a tool is actually very inefficient for a variety of reasons. For example, such a method of tool capture imposes significant wear on the elastic properties of the band itself and causes it to lose its elasticity more quickly. Moreover, merely trapping a tool between the band and the helmet does not guarantee that the tools will not shift during use, which can be very disconcerting when searching for a tool in one's headband in a very dark and/or smoky condition.

In order to address this deficiency in the art, as further depicted in FIG. 1(B), one or more loops 114 can be provided for the tool band 100 that are preferably attached to the webbing portion 108. The loop(s) 114 are preferably adapted and configured to hold an object, such as a tool. The loops 114 may be made from an elastic material, preferably a NOMEX™ material as described above. Each of the loops 114 defines a passage 116 therethrough. The passages 116 may be generally transverse to the webbing portion 108 of the tool band, parallel to the tool band 100 or be angled obliquely with respect to the tool band 100, as appropriate. By using elastic, preferably flame resistant secured tool loops 114 as described herein, the placement of tools is exact, secure, and will not unduly cause the elasticity of the band 100 to wear out prematurely.

The ends 102, 104 of the tool band 100 may be attached to one another in a variety of manners, including hook and loop fasteners (e.g., Velcro® material), buckle mechanisms (e.g., Fastex buckles made from nylon), snaps, buttons, hooks and the like. In accordance with a preferred embodiment, a side release buckle 112 is provided having a male portion 112a and a female portion 112b. Suitable buckles may be obtained from Homa Locks, Inc., of Bethel, CT 06801 (Tel.: (203) 743-5913). Buckle 112 preferably includes a length adjustment and is preferably made from heat stabilized nylon 6/6.

By providing a tool band 100 that allows the opening and closing of the band provides better conformity of the band to a given helmet. Typically, mounting a conventional helmet utility strap requires the strap to be stretched over the top of the helmet to establish a secure fit. A band with a properly designed coupling, such as buckle 112 permits the helmet utility strap to work in conjunction with associated adjustability features to offer an optimal fit to the helmet. Moreover, if the user of a conventional helmet strap becomes snagged or entangled, for example, while in a burning building, the very life of the user is jeopardized by the fact that freeing oneself in such a situation is very difficult without having to remove one's helmet. However, by providing a coupling, the strap can merely be disengaged, facilitating the user's ability to free themselves from the dangerous condition without removal of the helmet, which can help avoid unnecessary exposure to heat and smoke.

The inability for the common helmet utility strap to mount on a helmet securely is consistent with its very basic design. A one piece circular band or strap which is made of a rubber or elastic material in many instances is unable to remain secured to a helmet for long periods of time based on its elastic tension alone. The lack of elasticity caused over time, the constant handling of a helmet and the vibrations experienced by a helmet all contribute to the loosening of a conventionally designed helmet strap. To further help mitigate these effects, self-adhesive tabs having hook and loop fasteners (e.g., Velcro® fasteners) 150 may be placed on the inside surface of tool band 100 of the helmet utility strap to prevent the strap from easily failing off a given helmet, should it become dislodged. A corresponding hook and loop fastener can be attached to the helmet of the wearer in a suitable location. In addition, other fasteners may be used in addition to hook and loop fasteners, such as snaps, hooks, buttons, tabs and the like.

In accordance with a further aspect of the disclosure, the tool band can be further provided with a conspicuity device attached thereto. The conspicuity device can include one or more active and/or passive lighting devices.

For purposes of illustration and not limitation, as depicted in FIGS. 1(A)-1(B), the conspicuity device can include one or more active lighting devices as described herein. For example, suitable active lighting devices can include one or more electroluminescent lamps 200, one ore more lasers 300 and one or more work lights 400.

The electroluminescent lamp 200, examples of which are described in detail below, may be affixed to the webbing 108 by various means (e.g., stitching, adhesive, fasteners and the like) and be adapted and configured to emit light.

As further depicted in 1(A)-1(B), a laser 300 can also be provided as a conspicuity device in the tool band 100, for example. Laser 300 can be used for pointing at objects and/or for acting as a location indicator of the wearer or to transmit signals, as desired. Laser 300 and features thereof are described in further detail below.

As depicted in 1(A)-1(B), tool band 100 can also be provided with a work light 400. Work light can be any one of a number of different suitable devices. In accordance with one embodiment, the work light is an LED lamp or flashlight. The LED lamp or flashlight 400 can have a light output between about 25 and about 1500 candlepower. Work light 400 can be a removable flashlight that may be rechargeable, or may be integrally formed with the tool band, and be amiably mounted, as desired. Other embodiments of work light 400 are described in detail herein.

The tool band 100 is preferably also provided with one or more power sources for powering active devices used in combination with the band. If desired, the tool band can have additional suitable tools mounted therein. Such tools can include, for example, one or more door wedges 600, lighting mechanisms, and wrenches 700, among others. If desired, a communication device 800, such as a radio, portable telephone and/or global positioning system can also be mounted in or integrated with the tool band 100.

As mentioned above, the disclosure provides a conspicuity device including an electroluminescent element.

For purposes of illustration and not limitation, as embodied herein, the a conspicuity device in the form of an electroluminescent lamp 200 is provided. Preferably, the lamp 200 has at least one elongate electroluminescent element 210 defining a longitudinal axis L and a transverse axis W. As depicted, for example, in FIGS. 2 and 3, the electroluminescent element 210 includes a plurality of relatively wide emitting segments or cells 220 disposed along the longitudinal axis connected to each other by a relatively narrow emitting segment, or connector, 230.

By using the "cell-connector" pattern as described above, the design of the lamp is optimized as compared to an electroluminescent strip 210 of constant width. Specifically, the disclosed "dashed" design requires energizing a smaller amount of surface area than a similar strip of uniform width. As a result, for a given amount of power, the intensity of the light transmitted is higher from lamp 200. As such, lamp 200 is brighter than if it had an element 210 of constant width along its length.

In further accordance with the disclosure, the elongate element can be a continuous, monolithic element (as depicted) or may be interrupted and formed from more than one piece of electroluminescent material. Suitable electroluminescent material may be obtained, for example, from MetroMark, Inc. of Minnetonka, MN 55343-8862 (Tel.: (800) 680-5556).

By way of further example, as illustrated in FIGS. 3(D)-3(H), a variety of lamp shapes are provided including directional elements as opposed to a simple cell pattern. Specifically, various patterns of connected arrow-shaped cell units 1220 are connected end to end in the depicted lamps 1210. As depicted, each cell unit includes a leading portion 1222, a trailing portion 1224 and a center portion 1226. If desired, cell unit may include a point 1228, such as at the extremities of lamp 1210. Connecting portions 1230 may additionally be used to connect the cell units to each other. As depicted, the patterns of FIGS. 3(D)-3(H) are distinctive and likely to be visible and attract attention in an occluded environment when illuminated. Moreover, provision of arrow shaped cells can help an observer familiar with the pattern to determine the orientation of the lamp, and accordingly, the wearer.

Such electroluminescent material can be driven by an alternating current electrical power source at a particular voltage and frequency. The particular voltage and frequency selected will influence the color emitted by the electroluminescent material, and hence the spectral distribution of the light emitted by the electroluminescent material. For example, by increasing the frequency of the driving voltage, the light emitted by the electroluminescent element progresses toward the blue, higher energy end of the visible spectrum. The EL emission process generates energy only over a limited range and thus causes light to be emitted only over a limited range of wavelengths. The result is a relatively pure visible color with a width at half maximum for the emission spectrum of approximately 70 nm. The emission is limited to the visible wavelength range, so no energy is wasted in the near infrared.

The exemplary electroluminescent phosphors mentioned above come in a discrete set of colors. These may be described by the colors corresponding to the approximate wavelength of the maximum of their emission. For example, for operation at $110V_{rms}$ at 400 Hz, "blue" phosphors experience a maximum emission at about 460 nm, "blue-green" phosphors experience a maximum emission at about 499 nm, "aviation green" phosphors experience a maximum emission at about 510 nm, "green" phosphors experience a maximum emission at about 504 nm and "amber" phosphors experience a maximum emission at about 584 nm.

As mentioned above, the color of every electroluminescent lamp changes as a function of the driving frequency. The colors described in the preceding paragraph are measured at an excitation of $110V_{rms}$, 400 Hz. A phosphor that is green at this point will become blue if the frequency of the drive is increased. For example, color changes will begin to become apparent as the frequency is increased to about 700 Hz and will become extremely pronounced at about 1000 Hz. Large relative changes in the voltage can also introduce slight alterations in the color, although the effect is much less pronounced than in the case of frequency changes. The voltage effect is most noticeable at low voltages.

A variety of shapes are possible for the electroluminescent element 210 of the electroluminescent lamp 200. A preferred embodiment of such a shape is depicted, for example, in FIGS. 3(D)-3(H). As can be seen, element 210 includes a first end 212, a second end 214 and has a front face 216 and a back face 218. Element 210 further includes a plurality of relatively wide emitting portions, or cells 220 connected in series by a plurality of relatively narrow emitting portions, or connectors 230. As clearly shown in FIGS. 3(D)-3(H), the connector 230 may have a width along the transverse axis W that is less than the width along the transverse axis W of at least one of the cells 220. The plurality of cells 220 may have an average width along the transverse axis W, for example, between about three quarters of an inch and about one eighth of an inch. More preferably, the plurality of cells 220 may have an average width along the transverse axis between about one half of an inch and about one quarter of an inch. Even more preferably, the cells 220 have an average width along the transverse axis of about one quarter of an inch.

As further depicted in FIGS. 3(D)-3(H), the relatively narrow emitting segments, or connectors 230, may have an average width along the transverse axis W that is between about three quarters and about one quarter the width of an adjacent cell 220. If desired, the connector 230 may have an average width along the transverse axis W that is about half the width of an adjacent relatively wide emitting segment. For example, for the element 210 depicted in FIGS. 3(D)-3(H), the connector 230 has a width along the transverse axis of about one-eighth of an inch.

The connector 230 preferably has a length along the longitudinal axis L that is less than the length along the longitudinal axis of at least one of the cells 220. If desired, the cells 220 may have an average length along the longitudinal axis L between about three inches and about one half of an inch. More preferably, the cells 220 have an average length along the longitudinal axis between about two inches and about one inch. Most preferably, the plurality of cells 220 have an average length along the longitudinal axis L of about one and one half inches. As depicted in FIGS. 3(D)-3(H), each cell is about one and three-eighths of an inch long by about a quarter of an inch wide.

The connectors 230 can have an average length along the longitudinal axis L that is between about three quarters and about one quarter the length of an adjacent cell 220. More preferably, the connector 230 has an average length along the longitudinal axis L that is about one third the length of an adjacent relatively wide emitting segment. As depicted in FIGS. 3(D)-3(H), each connecting portion is about half an inch long by about one eighth of an inch wide.

As further depicted, for example, in FIGS. 3(D)-3(H), electroluminescent lamp 200 further includes a plurality of electrical conductors 222, 224 operably coupled to the electroluminescent element 210. Electrical conductors 222, 224 are operably coupled to an alternating current power source, described in detail below. As depicted, conductor 222 is connected to a first conductor 226 embedded in the element 210 and conductor 224 is connected to a second conductor 228 that is applied to the back side 218 of the element 210. Thus, when an alternating current is applied across the element 210 using the conductors 222, 224, the phosphors are excited and caused to emit light at a desired wavelength as described above.

Furthermore, as depicted in FIG. 2, the electroluminescent lamp 200 further includes a power source 240 operably coupled to the electroluminescent element 210 by way of the plurality of electrical conductors 222, 224. The power source 240 preferably includes at least one battery 242 operably coupled to the electrical conductors by way of an electrical inverter 244. If desired, the battery 242 may be rechargeable and/or removable from the device. In accordance with the embodiment of FIG. 1(A), the battery 242 and the inverter 244 are located in a housing 246 that is affixed to the webbing 108 by way of a NOMEX™ loop that is oriented in the direction of the webbing. As such, the housing 246 can be removed from the loop 214 to facilitate the replacement of the battery 242. Alternatively, if desired, the entire housing 246 may be connected to conductors 222, 224 by a removable electrical connector 248 to permit housing 246 to be placed in a charging station to facilitate recharging the battery.

Figure 4A:
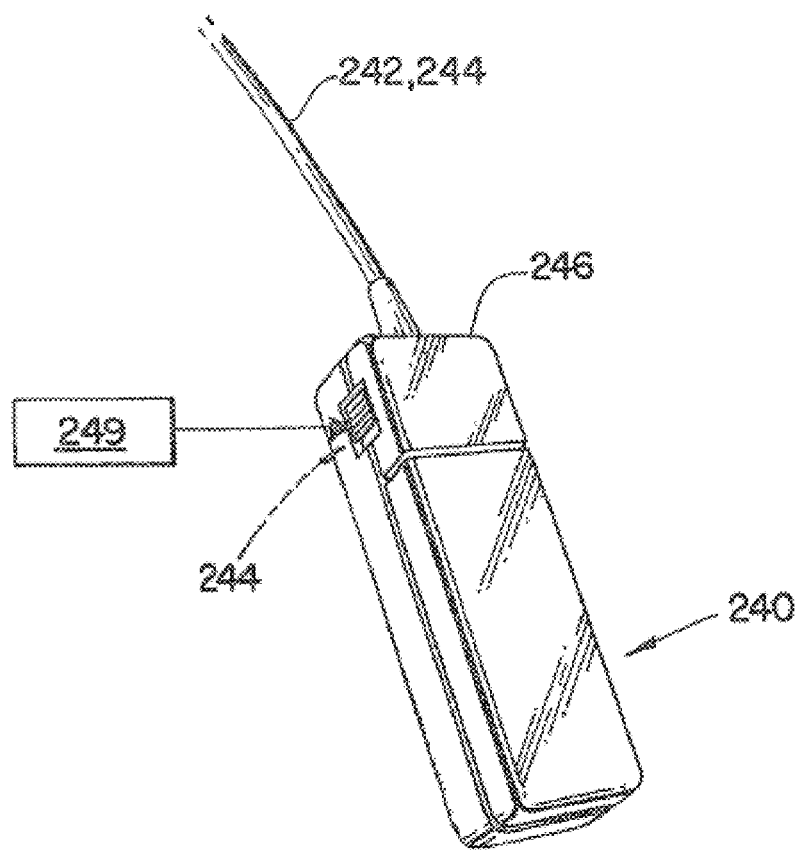
FIG. 4(A)-4(E) is an isometric view of an exemplary power supply for an electroluminescent lamp in accordance with the present disclosure.

As depicted, the electrical inverter 244 is interposed in a circuit between the battery(ies) 242 and the electroluminescent element 210. A variety of different inverters may be used. In accordance with one example, a IM-3 Inverter may be used, commercially available from Elam El Industries, Ltd., of Jerusalem, Israel. (Tel.: 02-5328888; website: www.elam.co.il). Such a housing 246 including an inverter 244 and battery compartment containing batteries 242 is depicted in FIG. 4(A). The inverter 244 depicted in FIG. 4(A), as depicted, accepts two "AAA" batteries and operates between about 2.5 and 3.0 volts, generating output signals in the kilohertz regime. The specifications of the IM-3 power supply are presented in Table 1 below:

TABLE 1

Operating Characteristics of Exemplary Power Supply With Inverter

| Input (VDC) | Input Current (mA) | Output Voltage (Vrms) | Frequency (kHz) |
|---|---|---|---|
| 2.5 | 30 | 80 | 3.7 |
| 2.5 | 38 | 72 | 3.0 |
| 2.5 | 40 | 70 | 2.7 |
| 3.0 | 40 | 96 | 3.8 |
| 3.0 | 47 | 85 | 3.0 |
| 3.0 | 50 | 81 | 2.8 |
| Tolerance | +/−10% | +/−5% | +/−5% |

As depicted in FIG. 4(A), the inverter 244 is operably coupled to a switch 249. The switch 249 can be adapted and configured to permit selection of at least one operating mode of the lamp 200. For example, by using the switch 249, various operating modes such as constant and intermittent operation can be selected, among others. For example, lamp 200 can be adapted and configured to transmit a distress signal in the second or a subsequent operating mode (e.g., "S.O.S."). By way of further example, lamp 200 can also transmit an optical signal that is unique to the wearer. The signal can be any pattern of signals (e.g., Morse code) or can simply be a repeating pattern of a set number of flashes, such as one, two, three, four, five or more flashes separated by a predetermined time that the lamp is off. In this manner, for example, if "five" firefighters are in a building, each firefighter can identify each other by the number of flashes emitted by lamp 200 in each cycle.

In accordance with one embodiment, lamp 200 can emit light for more than about eight hours before the battery 242 requires charging or replacement. In accordance with another embodiment, lamp 200 can emit light for more than about ten hours during an operating mode that provides constant illumination. In accordance with still another embodiment of the disclosure, lamp 200 can emit light for more than about forty hours during an operating mode that provides intermittent illumination.

In further accordance with the disclosure, the device may include an encasement adapted and configured to house the electroluminescent element.

For purposes of illustration and not limitation, as embodied herein and as depicted in FIG. 2, an encasement 250 is provided including a base layer 260 and a lens layer 270 of flexible material bonded together to define a compartment 252 between the layers adapted and configured to receive the electroluminescent element 210. The compartment 252 may be defined by a seal 254 about its periphery. The seal 254 may include at least one of a heat seal, a solvent weld, an ultrasonic weld, stitching and an adhesive seal, among others. At least one of the layers (260, 270) of the encasement 250 includes polymeric material. Preferably, all layers of the encasement 250 include some amount of polymeric material, which can facilitate forming and maintaining seal 254. Preferably, the polymeric material used to form layers (e.g., 260, 270) is fire resistant. A number of suitable polymeric materials can be used, including various vinyl materials that are fire rated, as are known in the art.

As mentioned above, the encasement 250 preferably includes a base layer 260 upon which the electroluminescent element 210 is positioned. Base layer 260 preferably includes retroreflective material. For example, the base layer 260 may include a plurality of microprism reflective elements 262 integrally bonded to a polymeric matrix. In accordance with one embodiment, the retroreflective material of the base layer 260 has a retroreflective value in excess of 350 cd/lux/m$^2$ (cpl) when measured in accordance with NFPA 1971, 2000 edition. Preferably, the layer 260 has a retroreflective value of about 650 cd/lux/m$^2$ (cpl). The base layer 260 may also include a layer 264 of fabric-reinforced polymeric backing material. A suitable commercially available material includes, for example, REFLEXITE® material, such as that described in U.S. Pat. Nos. 4,801,193, 4,244,683, 4,243,618, 4,202,600, 4,555,161, 5,171,624, 5,264,063 and/or 5,229,882. All of these patents are incorporated by reference herein in their entireties. Such material is commercially available from Reflexite Americas of New Britain, CT 06051 (Tel.: (860) 223-9297) in the form, for example, of one-inch wide yellow retroreflective material. This REFLEXITE® material passes the NFPA 1981 Heat Test & Flame Test and demonstrates self-extinguishing properties.

By way of further example, if desired, base layer 260 of the encasement 250 may additionally or alternatively include photoluminescent retroreflective material. Such materials are described, for example, in U.S. Pat. Nos. 5,415,911, 6,159,878, 6,569,786, and 6,656,566. Each of these patents is incorporated by reference herein in its entirety. The photoluminescent retroreflective material is preferably charged by exposure to ultraviolet light. Preferably, the retroreflective photoluminescent material includes photoluminescent elements including strontium aluminate. Other materials, such as zinc sulfide photoluminescent elements may also be used. Comparatively speaking, strontium aluminate retroreflective material tends to have a higher brightness and longer afterglow, which may be desirable in certain applications. These photoluminescent crystals (e.g., strontium aluminate) may be are cast into a polymeric material such as a pliable PVC vinyl, and used in a manner similar to the REFLEXITE® material. Such material is commercially available, for example, from Lanxi Minhui Photoluminescent Co., Ltd., of No. 18, Yuezhong Street, Lanxi, Zhejiang Province, China (Tel.: 86-579-8948789/ 8948900/8988198; website: http://www.mphotoluminescent.com).

The Lanxi Minhui photoluminescent retroreflective vinyl has a reflective value of 650 cd/lux/m$^2$ (cpl). Its flame resistance and temperature resistance complies with all the requirements of the NFPA 1971, 2000 edition and has a melting point of approximately 500° F. High resistance against deformation in high temperature enables this material to maintain its performance. One of the reasons for this stability is that this product has been stably crystallized at a high temperature so that the photoluminescent property can be preserved with a superior anti chemical resistance in high (e.g., 1,200° F.) and low (−20° F.) temperatures. The photoluminescent and illuminant performances of this material are preserved semi-permanently with no deterioration even under direct sunlight. In addition, this material has a resistance to a variety of chemicals such as heptane, MeOH, NaOH, gasoline, kerosene, and mineral oil without any evidence of blistering or dissolving.

As indicated above, charging the photoluminescent retroreflective material described above can occur in various ways. For example, exposure to sunlight or flame can cause the material to fully charge in about five minutes. In overhead neon lighting it can take about fifteen minutes for the material to fully charge. Under exposure to a sixty watt light bulb it can take about forty-five minutes for the material to fully charge.

An individual wearing the utility strap/tool band 100 including lamp 200, for example utilizing this retroreflective photoluminescent technology may benefit dramatically as the luminescent light source could decrease the need for battery power, as it may be decided that a quality after-glow is all that is required for conspicuity. More importantly, the illumination generated by the electroluminescent element 210 will be able to charge its own retroreflective photoluminescent encasement 250. Thus, in the instance that the power source to operate the electroluminescent element 210 dies, the charge gained by the photoluminescent retroreflective encasement 250 presents a unique and effective redundancy. Moreover, the introduction of flame in work environments where some users (e.g., firefighters) can present a benefit to the user, in that the UV light generated from flame can charge the photoluminescent material of the encasement 250.

The particular photoluminescent retroreflective material described herein may be light yellow-green in color, and may similarly glow yellow-green in color, for example. As indicated above, the main component is preferably alkaline earth metal aluminate oxide. Its exciting wavelength is between about 200 nm and about 450 nm. The average size of the photoluminescent particles is between about 45 microns and about 65 microns. Water resistance of the material is in excess of 1000 hours, and the length of the afterglow may be in excess of 3000 minutes. The corresponding brightness and afterglow may be as follows. About two minutes after charging, the material exhibits a brightness of about 1880 mcd/m$^2$. About ten minutes after charging, the material exhibits a brightness of about 475 mcd/m$^2$. About thirty minutes after charging, the material exhibits a brightness of about 165 mcd/m$^2$. About sixty minutes after charging, the material exhibits a brightness of about 80 mcd/m$^2$.

A clear lens layer 270 is then affixed to the base layer 260, trapping the electroluminescent element 210 between the two layers. The lens layer 270 is preferably formed from a vinyl material. Even more preferably, the lens layer 270 is heat resistant, and permits passage of visible light and ultraviolet light therethrough without significantly altering its properties. This is of particular importance if ultraviolet light is needed to charge a base layer 260 including photoluminescent retroreflective material.

Figure 4B:
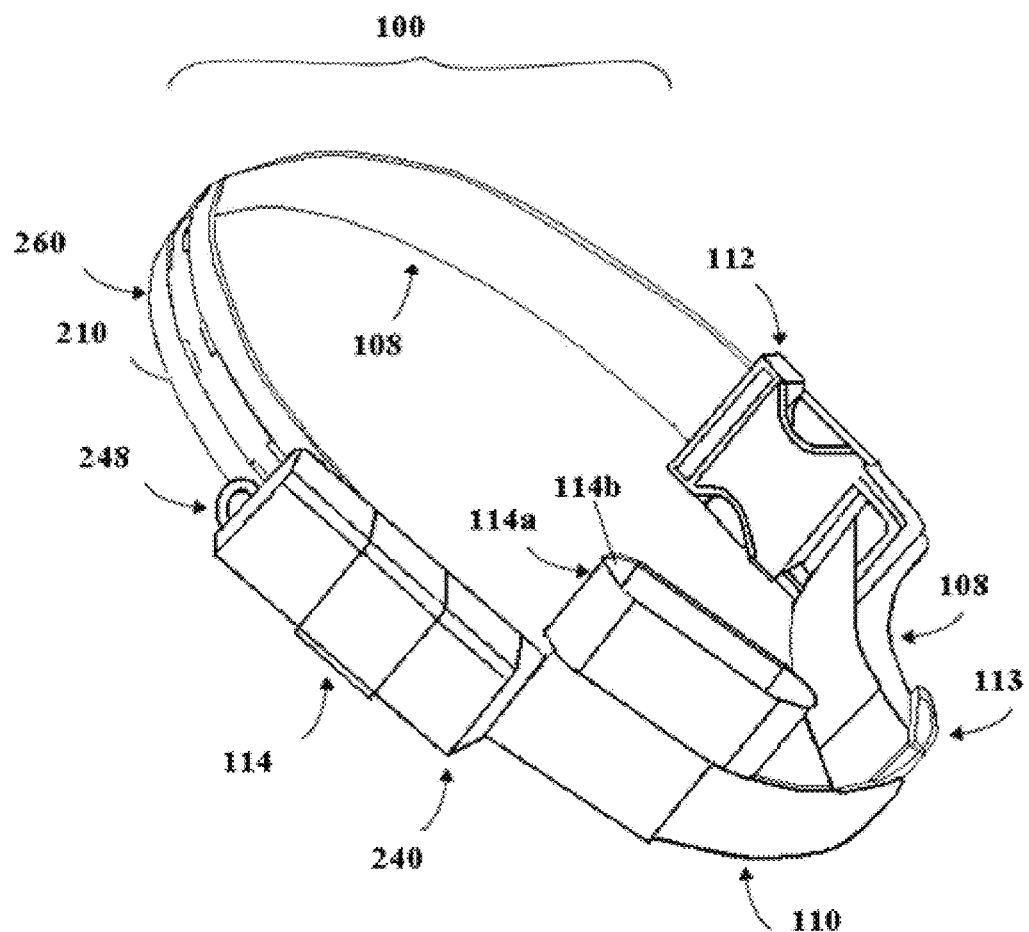
Figure 4C:
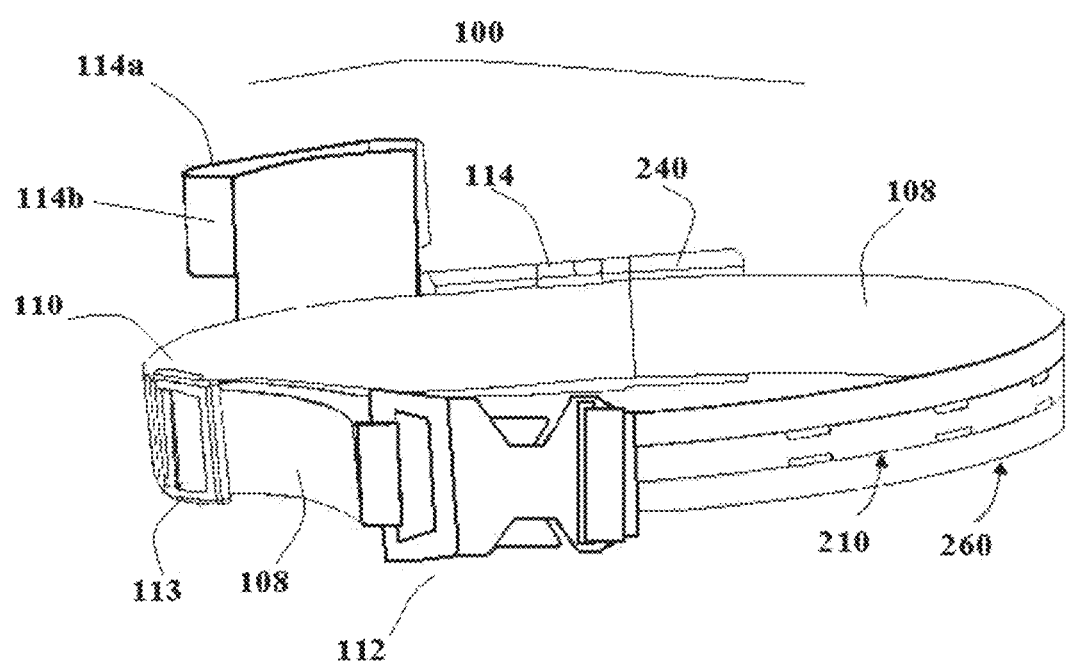
Figure 4D:
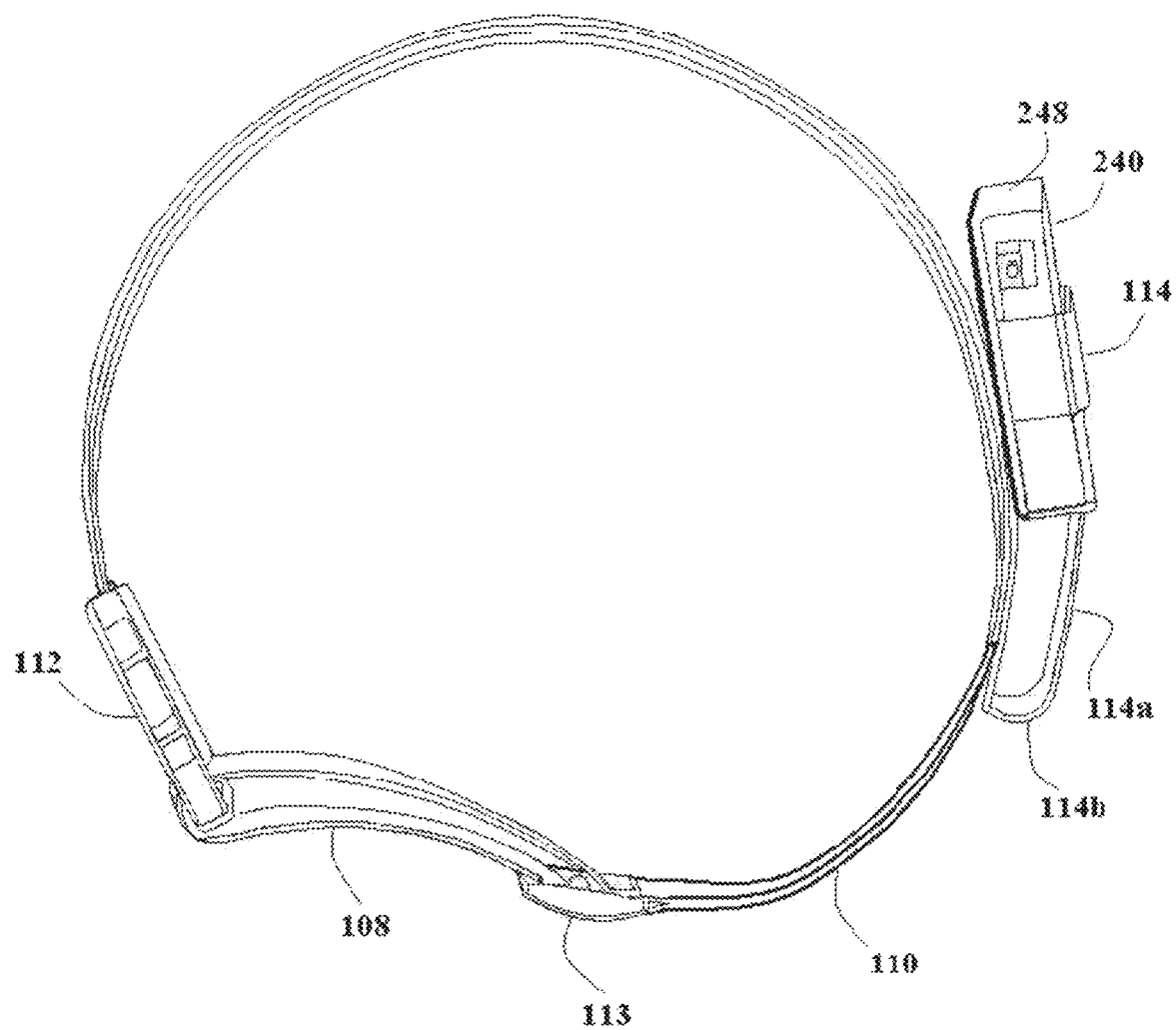
Figure 4E:
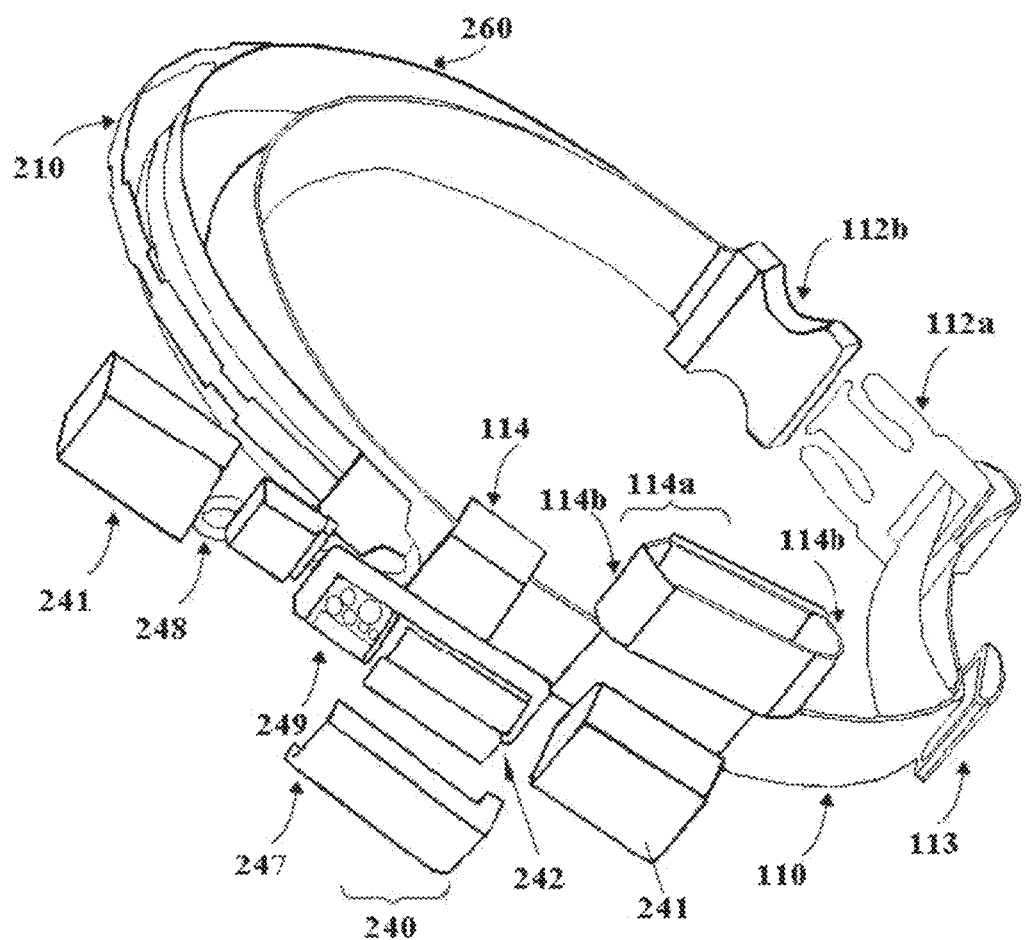

For purposes of further illustration only, various views of device 100 illustrated in FIGS. 1(A)-1(B) are also presented in FIGS. 4(B)-4(E). FIGS. 4(B) and 4(C) depict various perspective views of device 100, FIG. 4(D) depicts a top view of device 100 and FIG. 4(E) depicts an exploded view of device 100 detailing the battery compartment door 247, protective insulative rubber boots 241 that protect the batteries 242 and inverter 244, as well as flexible (preferably rubber) boot 243 that protects the electrical connections to the lamp 210. Additional features such as large loop 114a that can be used as a tool holder may be provided including elastic (e.g., NOMEX) portions 114b as depicted.

In accordance with one embodiment of the disclosure, the electroluminescent lamp 200 may be adapted and configured to emit a majority of photons in a wavelength range surrounding about 500 nm. Example I below has been carried out to show this and further illustrate the embodiments of the present disclosure, and is not intended to limit the disclosure disclosed herein in any way.

Example I

Spectral Energy Distribution of Lamp

Spectral Power Distribution

Light may be precisely characterized by giving the power of the light at each wavelength in the visible spectrum. The resulting spectral power distribution (SPD) contains all the basic physical data about the light and serves as the starting point for quantitative analyses of color. The SPD can be measured by a spectrophotometer.

The spectral energy distribution of an exemplary embodiment of a lamp 200 made in accordance with the teachings herein was tested to determine its spectral energy distribution by an independent lighting testing laboratory. The spectral distribution test was performed with an input voltage to the inverter 244 of about 2.85 V(DC), an input current of about 144 mA (DC) an input power of 410 mW. A complete assembly with an encasement 250 was tested, having lens layer 270 in place. To perform the test, the following equipment was used by an independent testing laboratory: (i) a Xitron 2503 Power Analyzer, (ii) an Optronic Laboratories OL770 Spectroradiometer, (3) an ITL (Independent Testing Laboratories, Boulder, CO) 30" Diameter integrating sphere and (4) a Topward 3306D DC power supply. The sample device was mounted inside of the integrating sphere and operated at 2.85 V(DC) until stabilization occurred. The relative spectral distribution and electrical data were then recorded. In order to measure the mean performance, five data sets were recorded and averaged. Readings were taken with the sample operating in a 25+/−5 degree Celsius free air ambient condition. Applicant has been informed that all data taken is traceable to the National Institute of Standards and Technology.

Figure 5:
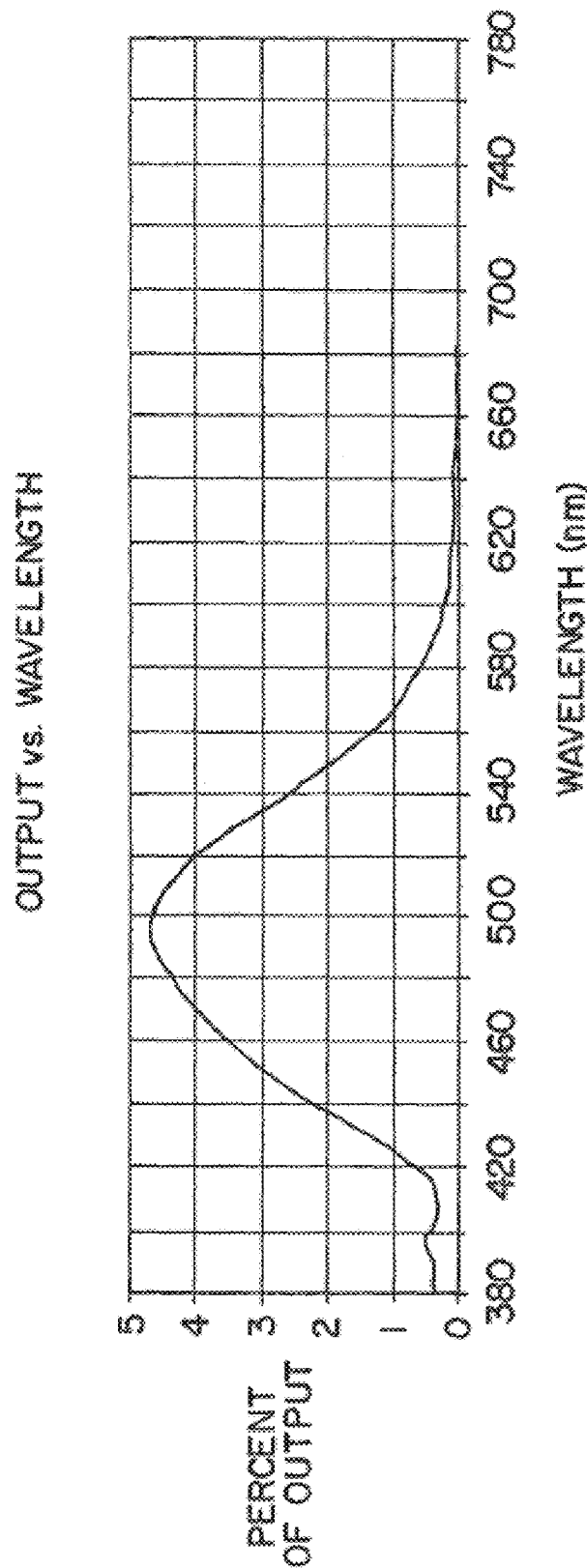
FIG. 5 is a graph depicting the spectral energy distribution of an exemplary electroluminescent lamp made in accordance with the present disclosure.

The data resulting from the independent testing is depicted in Table 2 below and is plotted in FIG. 5.

TABLE 2

Measured Spectral Distribution of Exemplary Electroluminescent Lamp

| Wavelength (nm) | Percent of Integrated Radiant Flux for each 5 nm wavelength window (%) |
| --- | --- |
| 380 | 0.34749 |
| 385 | 0.38194 |
| 390 | 0.39478 |
| 395 | 0.48253 |
| 400 | 0.44254 |
| 405 | 0.30381 |
| 410 | 0.30608 |
| 415 | 0.41334 |
| 420 | 0.66301 |
| 425 | 0.99008 |
| 430 | 1.39020 |
| 435 | 1.80125 |
| 440 | 2.19734 |
| 445 | 2.58515 |
| 450 | 2.90591 |
| 455 | 3.21744 |
| 460 | 3.49706 |
| 465 | 3.72746 |
| 470 | 3.94573 |
| 475 | 4.18883 |
| 480 | 4.32491 |
| 485 | 4.48174 |
| 490 | 4.57953 |
| 495 | 4.63655 |
| 500 | 4.63298 |
| 505 | 4.58236 |
| 510 | 4.44016 |
| 515 | 4.27734 |
| 520 | 4.02709 |
| 525 | 3.70739 |
| 530 | 3.35136 |
| 535 | 2.96975 |
| 540 | 2.60528 |
| 545 | 2.23733 |
| 550 | 1.90088 |
| 555 | 1.59871 |
| 560 | 1.32491 |
| 565 | 1.08739 |
| 570 | 0.89697 |
| 575 | 0.72165 |
| 580 | 0.59057 |
| 585 | 0.48425 |
| 590 | 0.38872 |
| 595 | 0.31372 |
| 600 | 0.25337 |
| 605 | 0.20957 |
| 610 | 0.16386 |
| 615 | 0.13685 |
| 620 | 0.11056 |
| 625 | 0.09016 |
| 630 | 0.07892 |
| 635 | 0.06722 |
| 640 | 0.06078 |
| 645 | 0.04946 |
| 650 | 0.03827 |
| 655 | 0.03579 |
| 660 | 0.03565 |
| 665 | 0.03339 |
| 670 | 0.01982 |
| 675 | 0.02021 |
| 680 | 0.02657 |
| 685 | 0.01747 |
| 690 | 0.01823 |
| 695 | 0.01608 |
| 700 | 0.01361 |
| 705 | 0.01577 |
| 710 | 0.01059 |
| 715 | 0.01597 |
| 720 | 0.00812 |
| 725 | 0.01237 |
| 730 | 0.01397 |
| 735 | 0.01156 |
| 740 | 0.01008 |
| 745 | 0.00793 |
| 750 | 0.01257 |
| 755 | 0.00770 |
| 760 | 0.00944 |
| 765 | 0.00613 |
| 770 | 0.00893 |
| 775 | 0.00904 |
| 780 | 0.00045 |

As can be seen, the lamp 200 that was tested demonstrated a maximum of light output near 500 nm. This data is actually based on a "green" EL lamp as described above that would be adapted and configured to have a peak emission at 504 nm when driven at $110V_{rms}$ at 400 Hz. The shift in the spectrum is believed to be due to running the lamp at several kHz. For the reasons discussed below, it is believed that the specific spectral distribution of lamp 200 is particularly advantageous in low light and/or smoky conditions.

The human visual system comprises two types of photoreceptor (cones and rods), which operate under different lighting conditions. In fact, there are different experimentally derived curves that demonstrate the sensitivity of the retina to light under different lighting conditions. A first curve describes "photopic" conditions (when light is plentiful) and a second curve describes "scotopic" conditions (when light is scarce). As one moves from photopic to scotopic conditions or vice versa, there is also a third curve, called the "mesopic" curve. Mesopic vision applies quite commonly (e.g. under road lights at night). During the daytime (i.e., a "photopic" condition), nearly all photopigments in the rods are effectively "bleached". At this time, the human eye sees color and acuity is high (because of foveal vision). At night, "scotopic" vision is generally determined by rods. At this time, the human eye generally does not see color and acuity is generally low. In effect, the human eye has two functionally separate retinas—one for photopic conditions, and one for scotopic conditions.

With regard to cones, there are three types of color-sensitive cones in the retina of the human eye, corresponding roughly to red, green, and blue sensitive detectors. Experiments known in the art have yielded response curves for three different kind of cones in the retina of the human eye. The "green" and "red" cones are mostly packed into the fovea centralis. By population, about 64% of the cones are red-sensitive, about 32% green sensitive, and about 2% are blue sensitive. Interestingly, the "blue" cones have the highest sensitivity and are mostly found outside the fovea. The shapes of the curves are obtained by measurement of the absorption by the cones, but the relative heights for the three types are set equal for lack of detailed data.

Notably, at extremely low intensities of stimuli, when only rods are stimulated, the retina shows a variable sensitivity to light according to its wavelength, being most sensitive at about 500 nm, the absorption maximum of the rod visual pigment, rhodopsin.

The light sensitivity of the normal human eye has been studied extensively in scientific literature. The response of the eye as a function of frequency is called the luminous efficacy of the eye. It has been tabulated for both the light-adapted ("photopic") case and the dark-adapted ("scotopic") case. Table III below depicts the luminous efficacy of the human eye for the "scotopic" and "photopic" cases.

TABLE III

Luminous Efficacy Table for Human Retina

| Wavelength □ (nm) | Photopic Luminous Efficacy V□ | Photopic Conversion lm/W | Scotopic Luminous Efficacy V□ | Scotopic Conversion lm/W |
|---|---|---|---|---|
| 380 | 0.000039 | 0.027 | 0.000589 | 1.001 |
| 390 | 0.000120 | 0.082 | 0.002209 | 3.755 |
| 390 | 0.000120 | 0.082 | 0.002209 | 3.755 |
| 400 | 0.000396 | 0.270 | 0.009290 | 15.793 |
| 410 | 0.001210 | 0.826 | 0.034840 | 59.228 |
| 420 | 0.004000 | 2.732 | 0.096600 | 164.220 |
| 430 | 0.011600 | 7.923 | 0.199800 | 339.660 |
| 440 | 0.023000 | 15.709 | 0.328100 | 557.770 |
| 450 | 0.038000 | 25.954 | 0.455000 | 773.500 |
| 460 | 0.060000 | 40.980 | 0.567000 | 963.900 |
| 470 | 0.090980 | 62.139 | 0.676000 | 1149.200 |
| 480 | 0.139020 | 94.951 | 0.793000 | 1348.100 |

TABLE III-continued

Luminous Efficacy Table for Human Retina

| 490 | 0.208020 | 142.078 | 0.904000 | 1536.800 |
|---|---|---|---|---|
| 500 | 0.323000 | 220.609 | 0.982000 | 1669.400 |
| 507 | 0.444310 | 303.464 | 1.000000 | 1700.000 |
| 510 | 0.503000 | 343.549 | 0.997000 | 1694.900 |
| 520 | 0.710000 | 484.930 | 0.935000 | 1589.500 |
| 530 | 0.862000 | 588.746 | 0.811000 | 1378.700 |
| 540 | 0.954000 | 651.582 | 0.655000 | 1105.000 |
| 550 | 0.994950 | 679.551 | 0.481000 | 817.700 |
| 555 | 1.000000 | 683.000 | 0.402000 | 683.000 |
| 560 | 0.995000 | 679.585 | 0.328800 | 558.960 |
| 570 | 0.952000 | 650.216 | 0.207600 | 352.920 |
| 580 | 0.870000 | 594.210 | 0.121200 | 206.040 |

| | | | | |
|---|---|---|---|---|
| 0 (south pole) | 0 | 0 0 | 0 | 0 |
| 5 | 3 | 1 1 | 1 | 0 0 |
| 15 | 3 | 2 2 | 1 | 0 0 |
| 25 | 3 | 3 6 | 2 | 0 2 |
| 35 | 3 | 2726 | 5 | 0 9 |
| 45 | 37 | 5544 | 9 | 0 24 |
| 55 | 86 | 8257 | 15 | 0 44 |
| 65 | 110 | 10868 | 19 | 0 61 |
| 75 | 123 | 12175 | 21 | 0 72 |
| 85 | 129 | 12778 | 22 | 0 79 |
| 90 | 130 | 12678 | 21 | |
| 95 | 129 | 12476 | 20 | 0 79 |
| 105 | 126 | 12174 | 20 | 0 74 |
| 115 | 115 | 10967 | 18 | 0 62 |
| 125 | 100 | 9560 | 15 | 0 49 |
| 135 | 81 | 7649 | 11 | 0 34 |
| 145 | 61 | 5435 | 8 | 0 19 |
| 155 | 36 | 3119 | 5 | 0 9 |
| 165 | 16 | 12 7 | 2 | 0 2 |
| 175 | 6 | 4 2 | 2 | 0 0 |
| 180(north pole) | 0 | 0 0 | 0 | 0 |

* Note:
Divide all Candela and Lumen values by 1000

Figure 6:
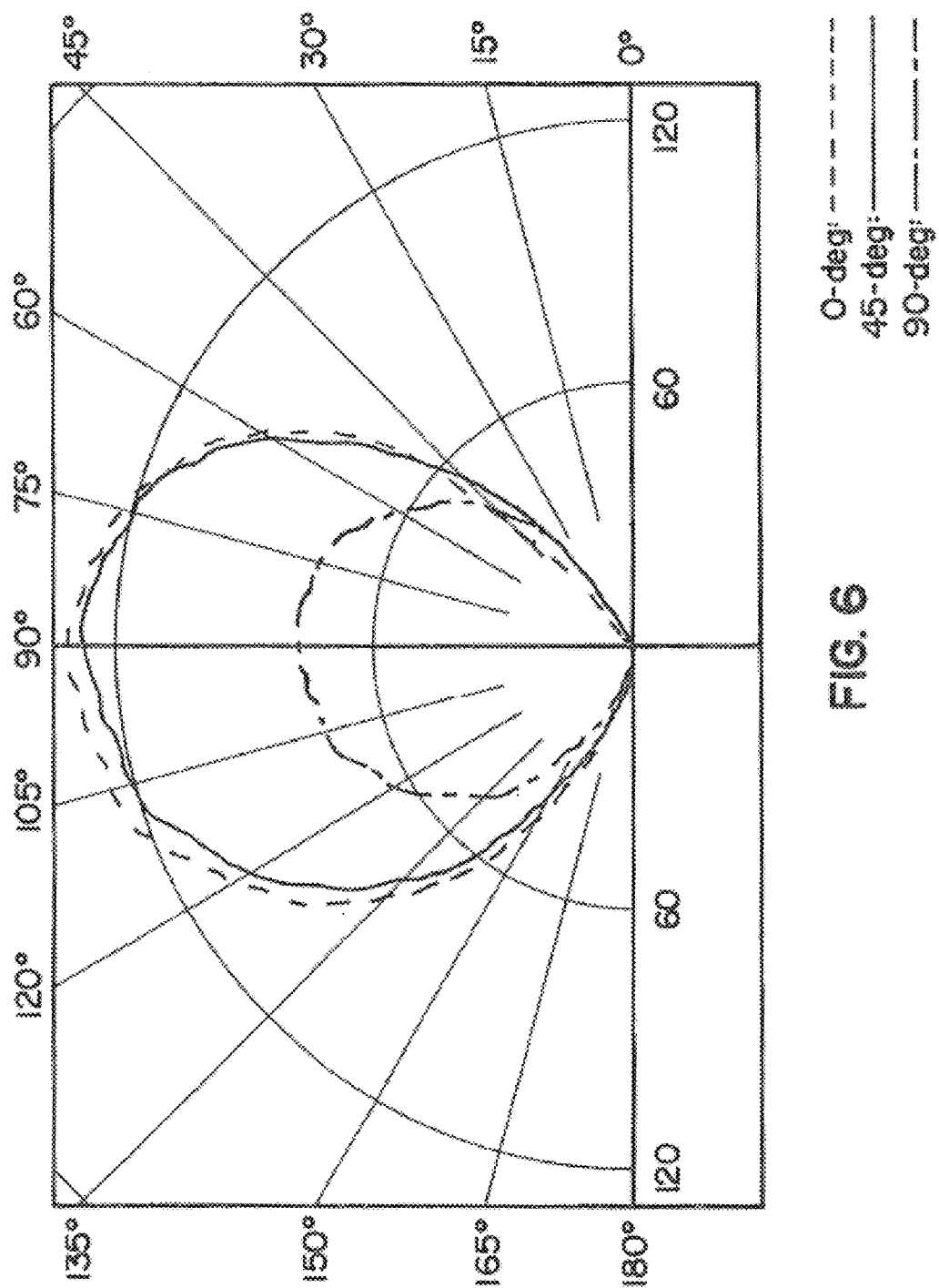
FIG. 6 is a graph depicting the intensity of an exemplary electroluminescent lamp made in accordance with the present disclosure.
Figure 7A:
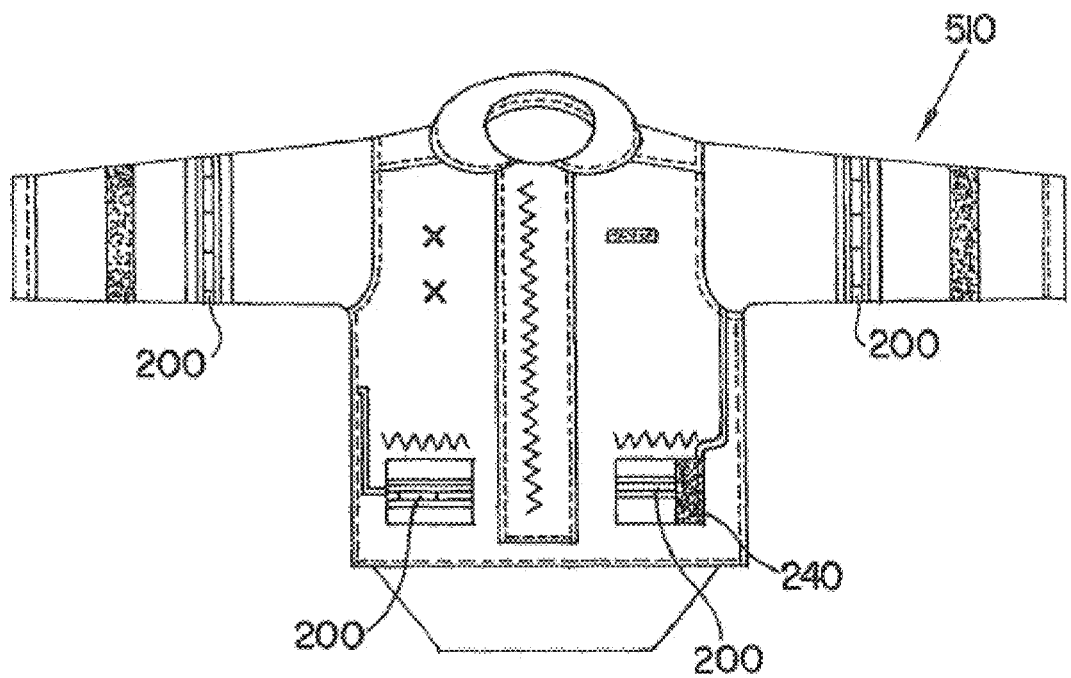
Figure 7B:
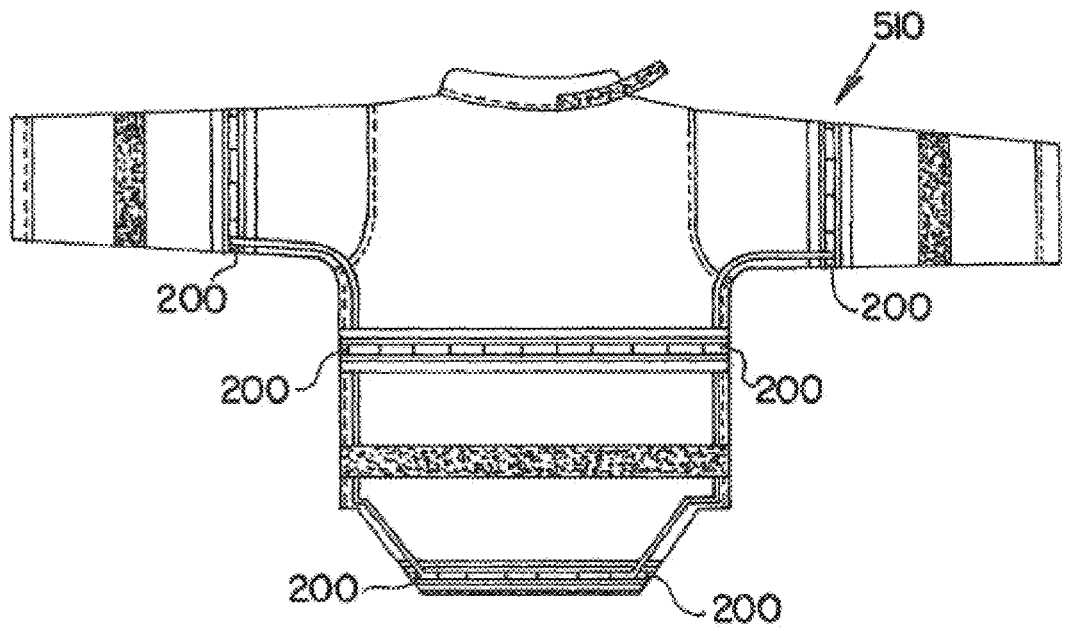
Figure 8A:
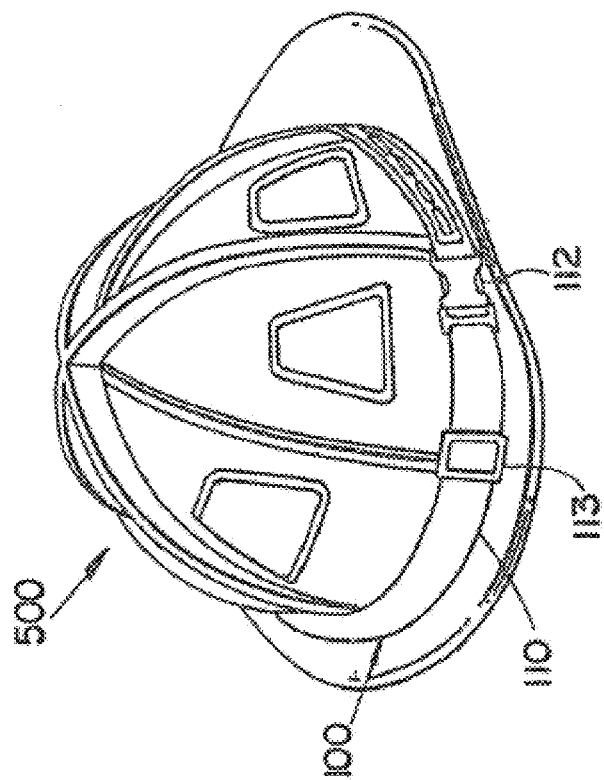
Figure 8B:
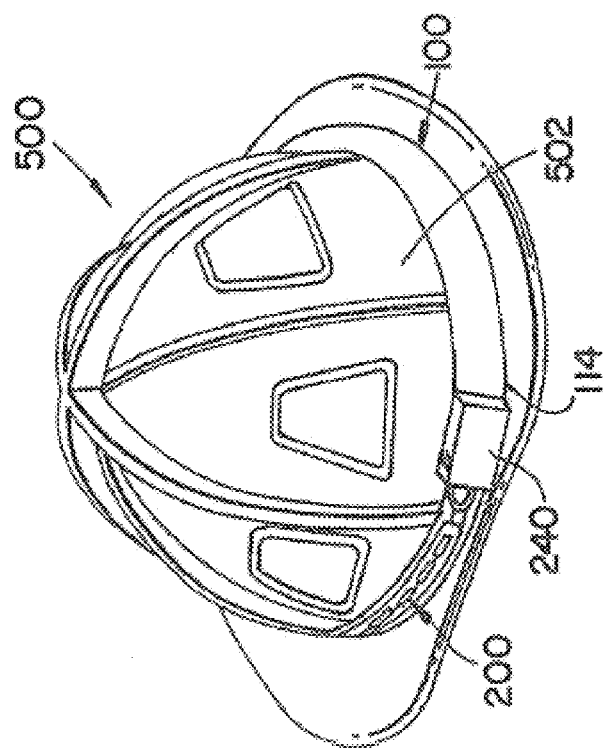
Figure 8C:
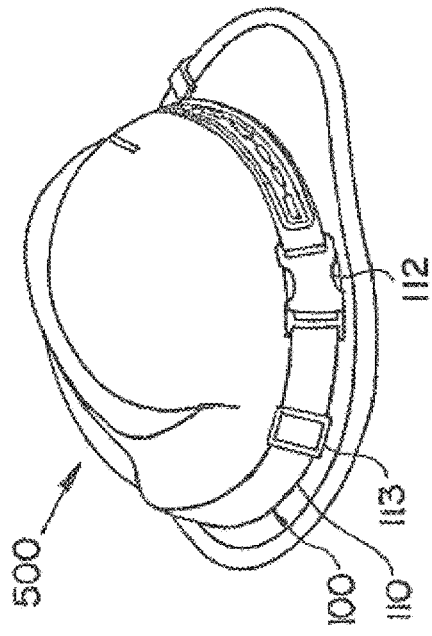
Figure 8D:
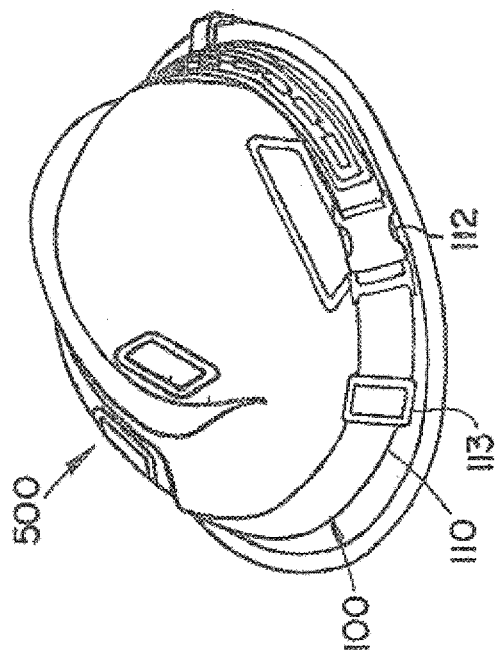
Figure 8E:
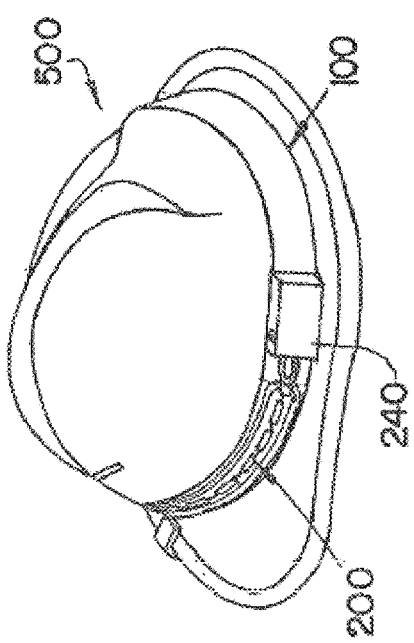
Figure 8F:
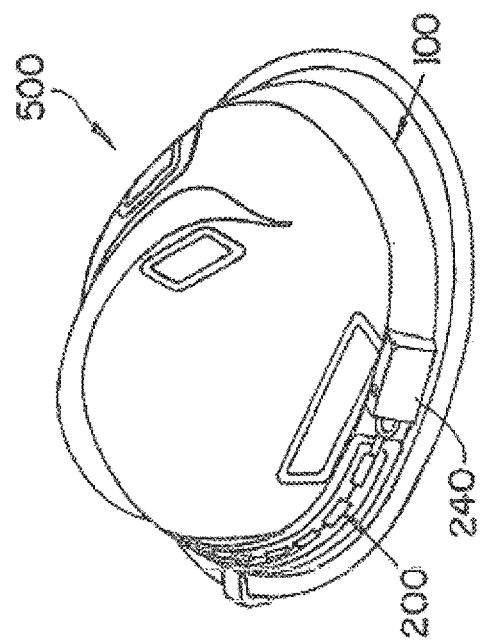

These data are also plotted in FIG. 6. FIG. 6 depicts the intensity values along the 0 degree meridian from the top of the "sphere" (180 degrees) in 15 degree vertical increments to the bottom of the sphere (0 degrees). As can be seen, the peak intensity for the lamp 200 (as measured) is about 0.13 Candela at the "equator". Nonetheless, lamp 200 is still highly visible in a dark, smoky environment.

The data summarizing the zonal lumens over the sphere are presented below in Table V. The amount of light output in lumens is integrated for each vertical angular section. For example, the first entry of "0-30" integrates the total number of lumens passing through the area of the surface of an imaginary sphere defined between the south pole (0 degrees) and 30 degrees of latitude above the south pole, and so forth. The right column of Table V depicts the percentage of total lumens passing through each section.

TABLE V

Integrated Zonal Lumen Summary

| Zone | Lumens | Percent of Total Light Output |
|---|---|---|
| 0-30 | 2 | 0.3 |
| 0-40 | 11 | 1.7 |
| 0-60 | 78 | 12.6 |
| 0-90 | 290 | 46.9 |
| 90-120 | 215 | 34.7 |
| 90-130 | 264 | 42.7 |
| 90-150 | 317 | 51.3 |
| 90-180 | 328 | 53.1 |
| 0-180 | 618 | 100.0 |

* Note:
Divide all Candela and Lumen values by 1000.

As can be seen from the data in Table V above, 46.9% of the total light output was received by the lower "hemisphere" while the remaining 53.1% of the total light output was received by the upper "hemisphere".

Field experience has shown that lamp 200 is even visible in a "black smoke" condition from up to about six feet away. This distance is sufficient for firefighters to see each other that are progressing through a burning structure in close proximity to one another.

In accordance with still a further aspect of the disclosure, an article of clothing is provided having an electroluminescent lamp as described herein.

For purposes of illustration and not limitation, as embodied herein, and as depicted in FIGS. 7(A)-8(F), any suitable apparel can be fitted with one or more electroluminescent lamps 200. For example, a jacket 510, pair of trousers 520 and/or footwear may be fitted with one or more lamps 200 as described herein and as depicted in FIGS. 7(A)-7(E). The apparel may include turn out gear and boots for firefighters, but may also include conventional athletic apparel. As described above, lamp 200 is highly visible at night. As such, individuals wearing lamp 200 in the darkness (e.g., joggers and the like) can benefit greatly from this technology.

In accordance with one embodiment, it is possible to provide lamp 200 with a hook and loop fastener backing (e.g., 150) so that lamp 200 is removable from the article of clothing or other article to permit machine washing of the article of clothing. After the article has been cleaned, lamp 200 can be reapplied and the power supply 240 can be returned to its dedicated or other pocket.

It will also be appreciated that the shape of electroluminescent element 210 can be of any suitable shape. For example, element 210 can be shaped to form designs, words, characters and athletic logos, such as the Nike® brand "swish" logo. Preferably, element 210 is driven as described herein to have a spectral energy distribution similar to those depicted in the Examples above.

By way of further example, as depicted in FIGS. 8(A)-8(F), various helmets 500 may be provided including a generally rigid protective shell 502, and an electroluminescent conspicuity device such as lamp 200 described herein. It will be appreciated that lamp 200 may be provided in one or more suitable lengths. While lamp 200 can be disposed around the entire periphery of a helmet generally, in the case of a fire helmet it is advantageous to not expose lamp 200 or its supporting circuitry (contained, e.g., in housing 246) to the particularly high heat conditions experienced by the front, flame-facing surface of a fire helmet. Thus, lamp 200 may be disposed about less than the entire periphery of the helmet. For example, lamp 200 may be disposed about more than about 40% and less than about 90% of the periphery of the helmet. It will be appreciated that lamp 200 can be integrated into myriad other types of helmets, such as bicycle helmets, construction hard hats, athletic helmets such as football and hockey helmets, and the like.

The disclosure also provides a conspicuity device including a band adapted and configured to be mounted to an object and a laser beacon mounted on the band. For purposes of illustration and not limitation, as embodied herein and as depicted in FIGS. 1(A)-1(B), band 100 is provided with laser beacon 300.

Figure 9A:
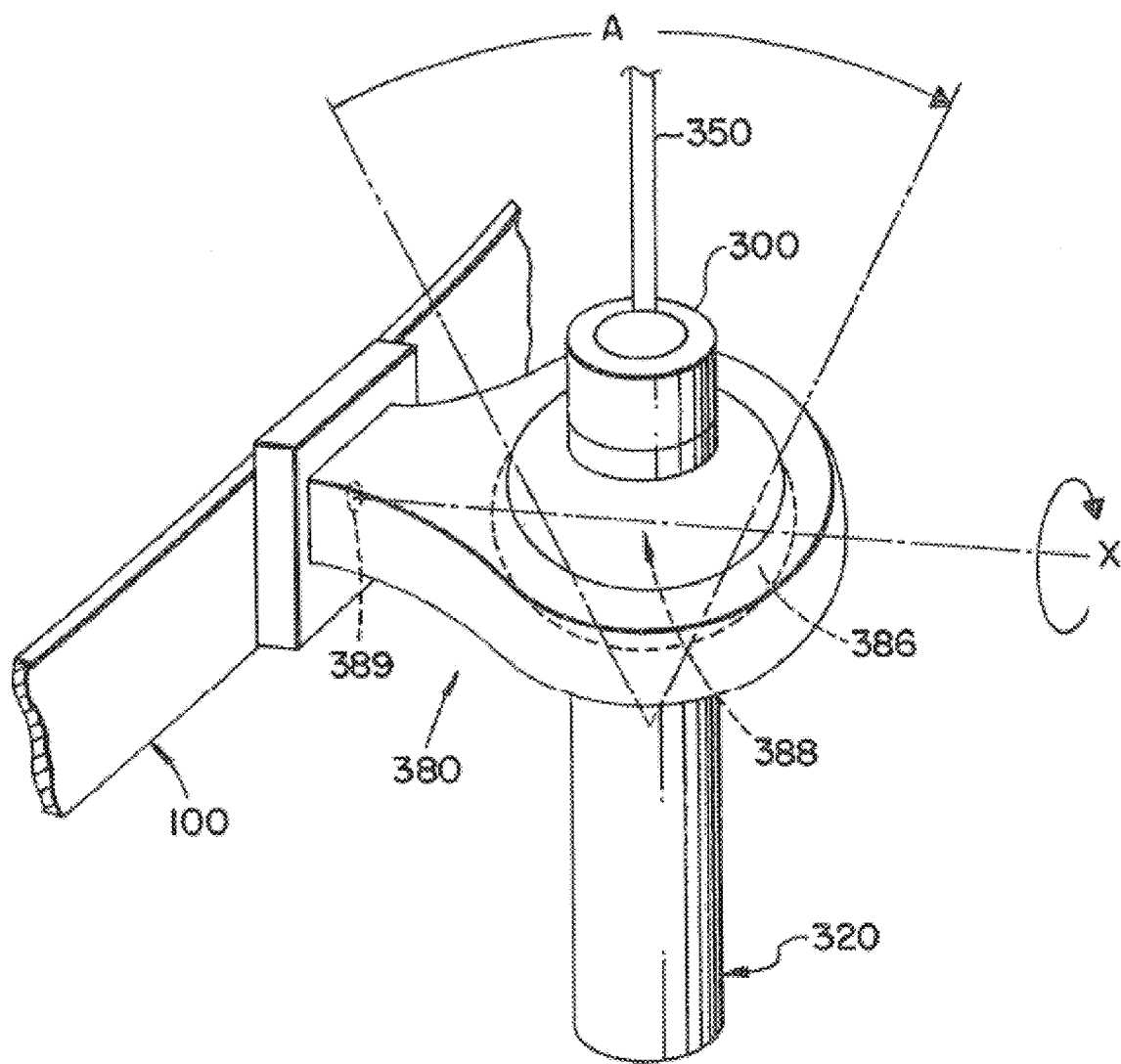
FIGS. 9(A)-9(B) and FIGS. 10(A)-10(P) depict aspects of a laser beacon provided in accordance with the present disclosure.

As depicted in FIGS. 1(A)-1(B), the laser beacon 300 is rotatably mounted to the band by way of a pivoting bracket 310 that is clipped or otherwise attached to band 100. If desired, the laser beacon 300 may be mounted in a loop 114 attached to the band 100. By way of further example, as depicted in FIG. 9(A), the laser beacon 300 may be pivotally mounted and weighted (e.g., by a pendulum 320) to direct a beam 350 vertically upward when in use to form a signal beacon. It will be appreciated that the weight of the laser beacon 300 itself may be used as a pendulum. As shown in FIG. 9(A), laser beacon 300 is situated in a mounting bracket 380 having a floating spherical retainer 382 mounted in a frame 384 having an interior spherical surface 386. Beacon 300 is received by an opening 388 defined in spherical retainer 382. As can be seen, bracket 380 permits beacon 300 to rotate through a cone of operation defined by solid angle A. By weighting the laser beacon 300 and/or mounting it in such a manner, it will always point the beam 350 in an upward direction. If desired, bracket 380 may also have a pivot 389 that permits it to rotate about an axis X as well. This will ensure that beacon 300 will point upwards, even when the user bends forward at the waist. This is advantageous, as it can prevent a wearer of the laser beacon from shining the laser toward another individual inadvertently, such as by bending over. The laser beacon 300 can be adapted and configured to emit light in a variety of wavelengths. For example, the laser beacon 300 can emit, green, blue or violet light beams 350, among others.

Moreover, the beam 350 emitted from the laser beacon 300 can have a variety of shapes and sizes. For example, the laser beacon 300 can emit a substantially collimated beam 350 of light or a diverging beam of light, as desired. The beam 350 is preferably sufficiently wide to permit suitable use as a signal beacon for observers relatively nearby when used in indoor applications (e.g., 10-100 feet), and/or observers far away in outdoor applications (e.g., 100-10000 feet). For example, in accordance with one embodiment, the laser beacon 300 is preferably adapted and configured to emit a beam 350 having a diameter in excess of about one centimeter at a point in the beam more than five feet from the laser.

Figure 9B:
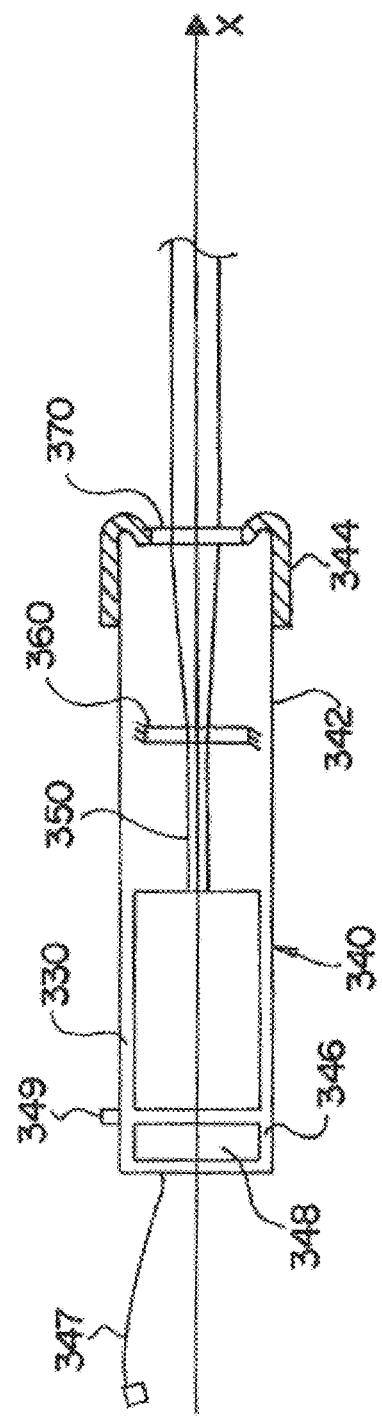

In further accordance with the disclosure, as depicted in FIG. 9(B), the laser beacon 300 can include a laser generator 330 adapted and configured to generate a substantially parallel beam 350, and a first lens 360 downstream (i.e., down beam) from the laser generator 330 adapted and configured to cause the parallel beam 350 to diverge as it passes through the first lens 360. Accordingly, lens 360 may be a "plano-convex" lens. If desired, the laser can further include a housing 340 for holding the first lens 360 and laser generator 330, and a second lens 370 disposed in the path of the beam 350 downstream from the first lens 360. The second lens 370 is preferably adapted and configured to cause the diverging beam passing from the first lens 360 to become substantially collimated, or to control its divergence, as desired, depending on the specific optical components used. If desired, the distance along the beam path between the first lens 360 and second lens 370 can be adjusted to change the diameter and/or divergence of the beam 350 emitted by the laser beacon 300. For example, the distance between the lenses 360, 370 may be adjusted by rotating a first portion 342 of the housing with respect to a second portion of the housing 344. Accordingly, for example, the diameter of the beam 350 leaving the laser can be adjusted from a diameter of about one eighth of an inch to a diameter of about one half inch, if a substantially collimated beam is desired. By way of further example, using appropriate lensing, adjustment of the optics can provide an optical "signal cone" of varying degrees, from a relatively narrow "cone" to a relatively "broad" one in any suitable angular increments, or continuous angular increments.

In operation, beam 350 can make air in the path of the beam effectively "glow." For example, if a photon of appropriate wavelength interacts with electron of a gas molecule in the air, the electron's energy can be raised to a higher quantum state. Shortly thereafter, the electron will return to its ground state, emitting a photon in the process. It will be appreciated that the light so emitted by the electrons in gas molecules present in air is not "laser" light as it is diffuse, however, it may have a color characteristic similar to the laser beam shining through it. By way of further example, beacon 300 can be outfitted with appropriate optics to supply a planar or conical moving beam. Such beams are highly visible in low light and/or smoky conditions. If desired, the housing 340 of the laser beacon 300 may define a compartment 346 for receiving a battery 348 for powering the laser beacon 300. Additionally or alternatively, a power lead 347 can be provided for providing power to another active electrical accessory on tool band 100 and/or for drawing power from an external power source, such as light 400 described herein. If desired, the laser beacon 300 may also be configured to operate in a plurality of operating modes by way of a switch 349 as with the electroluminescent lamp 200. For example, the laser beacon 300 can be operated in a first operating mode wherein the laser is on constantly, and a second operating mode wherein the laser blinks. If desired, the laser beacon 300 may be adapted and configured to transmit a signal in the second operating mode, such as a distress signal and/or an identification signal that uniquely identifies the user of the beacon. Such a distress or identification signal can be particularly useful if laser beacon 300 is being used by an individual in a forest fire. The beam 350 of laser can be seen by rescue aircraft from many miles away, and can facilitate pinpointing the location of such an individual if the individual's global positioning system malfunctions.

An example of a suitable laser flare is the Green Rescue Laser Flare® commercially available from Greatland Laser, LLC of Anchorage, Alaska. Examples of such lasers are described, for example, in U.S. Pat. Nos. 6,688,755, 6,295,007, 6,280,057, 6,163,247 and 6,007,219. Each of these patents is incorporated by reference herein in its entirety. Such device is an FDA approved Class III-A laser under 5 mW of power designed to signal persons at a distance. This laser can be legally used as a distress signal in an emergency, and can also be used for training under established Federal rules. The Rescue Laser Flare® is visible at distances of up to thirty miles, and demonstrates effective conspicuity and has effectively been able to get the attention of search and rescue pilots in various case by case accounts. The ability, for example, of a forest fire fighter to effectively signal a rescue party up to 30 miles (48 km) away, depending on atmospheric conditions; by way of a helmet mounted tool band 100 can actually be critical to survival. Embodiments of the Rescue Laser Flare® are waterproof up to 80 feet, and made from machined aircraft aluminum and anodized for corrosion resistance. The laser diode lasts about 5,000 hours prior to failure. This device can be safely operated with persons at a distance greater than 13 feet (4 meters). The laser can operate continuously for over five hours in a constant mode or 10 hours in a blink mode using fully charged batteries. The specifications of this particular device are presented in Table VI below:

TABLE VI

| | |
|---|---|
| Range | 25-30 Miles |
| Output power | 55 mW |
| Class | III-A |
| Operating voltage | 3 V |
| Output model | CW |

TABLE VI-continued

| | |
|---|---|
| Average loop | <550 mA |
| Battery source | 2× AAA Batteries |
| Dimensions | 13 × 143 mm |
| Laser lifetime | 3000-5000 hours |
| Battery lifetime | 2.5 Hours |
| Crystal efficiency | Very good to excellent |
| Beam divergence | <1.2 mRad |

It will be appreciated that while this laser does not embody all of the features described herein (for example, optical beam divergence and the like), this or a similar laser may be modified accordingly.

This laser technology is believed to be helpful in situations where there is low visibility due to smoke. For example, in many instances, the only way to "see" a laser, with the use of a laser's beam, is to shine it through a cloud of smoke, chalk dust, mist, etc. in a dimly-lit space. The small particles in the cloud act as tiny diffuse surfaces which scatter part of the beam toward your eyes. Dust particles usually create a sparkling effect as they float through the beam. Technically, what one is actually seeing are the particles in the cloud, not the beam itself. Therefore, in shorter distances such as 10 to 30 Feet, less powerful lasers can offer emergency service workers the ability to help to target themselves so that others can locate them in a smoke condition more easily. This will enable those entering into smoke filled environments to have better orientation of each other helping to prevent anyone from getting lost.

Figure 10A:
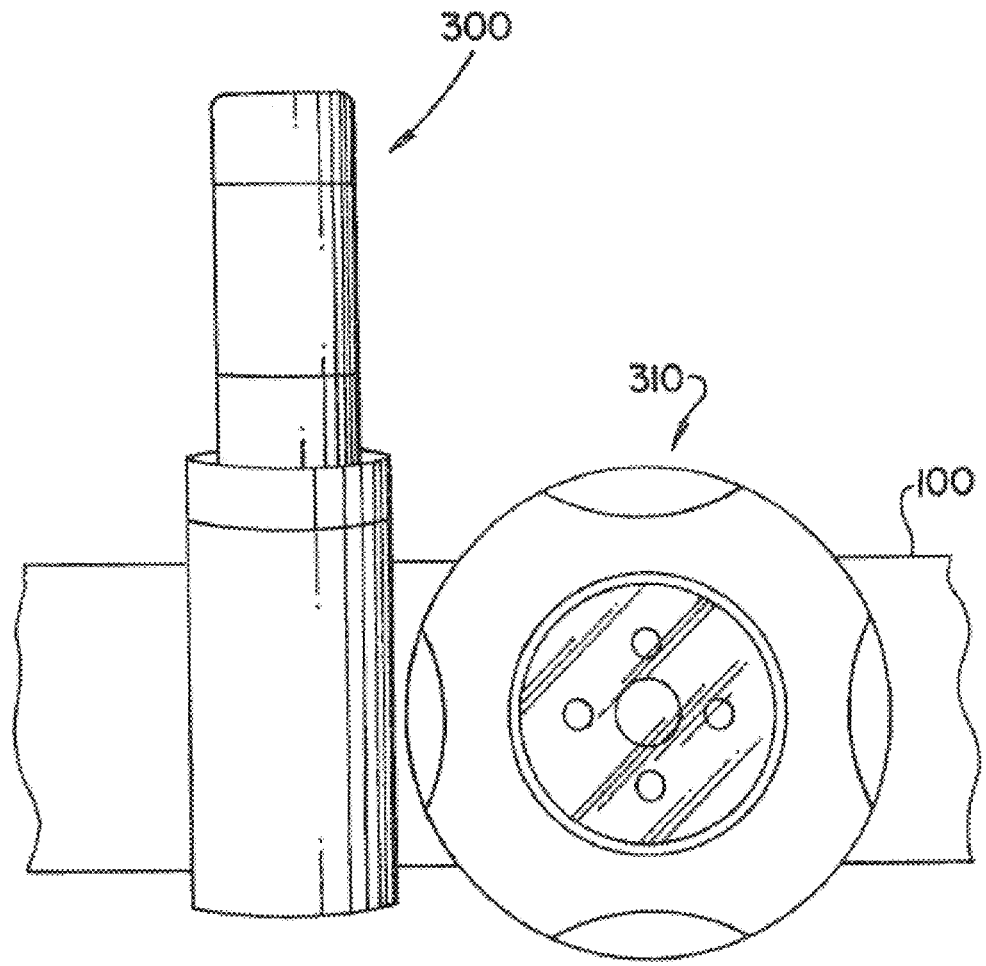
Figure 10E:
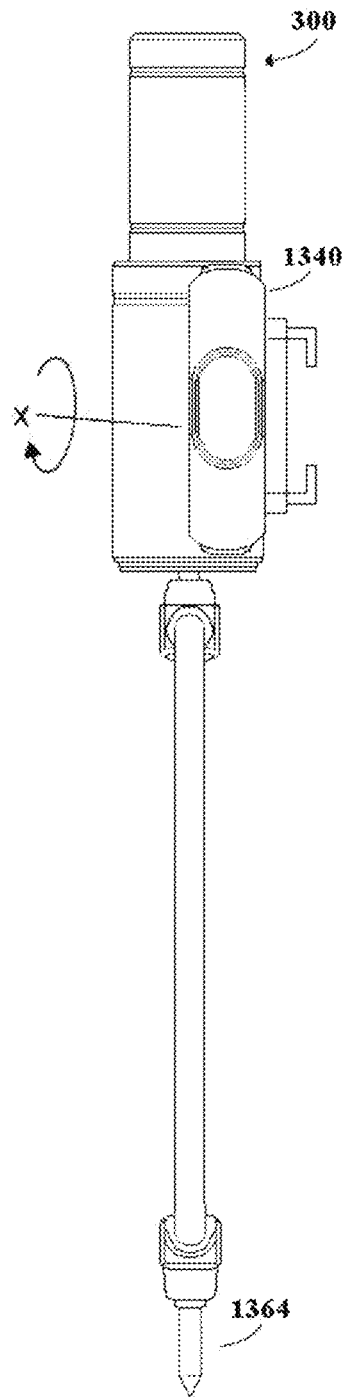
Figure 10F:
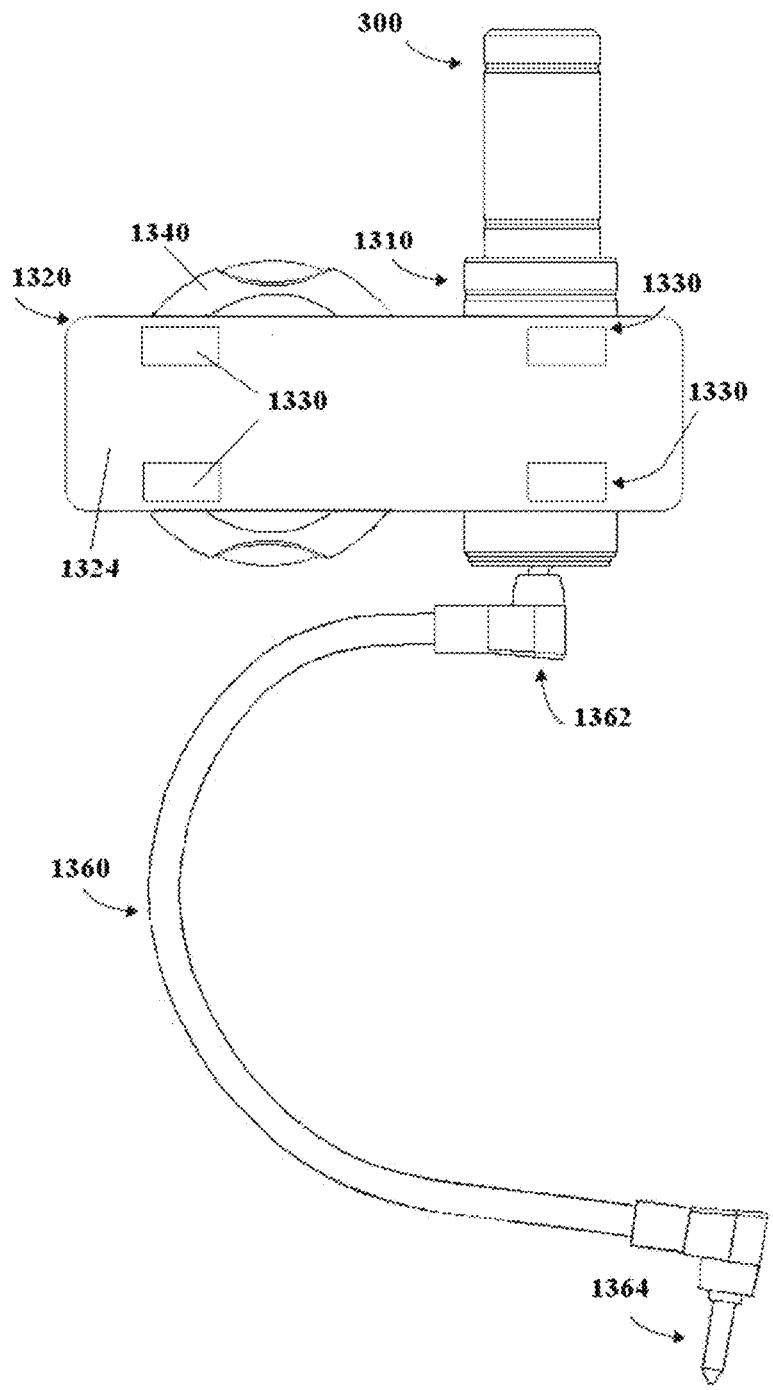
Figure 10H:
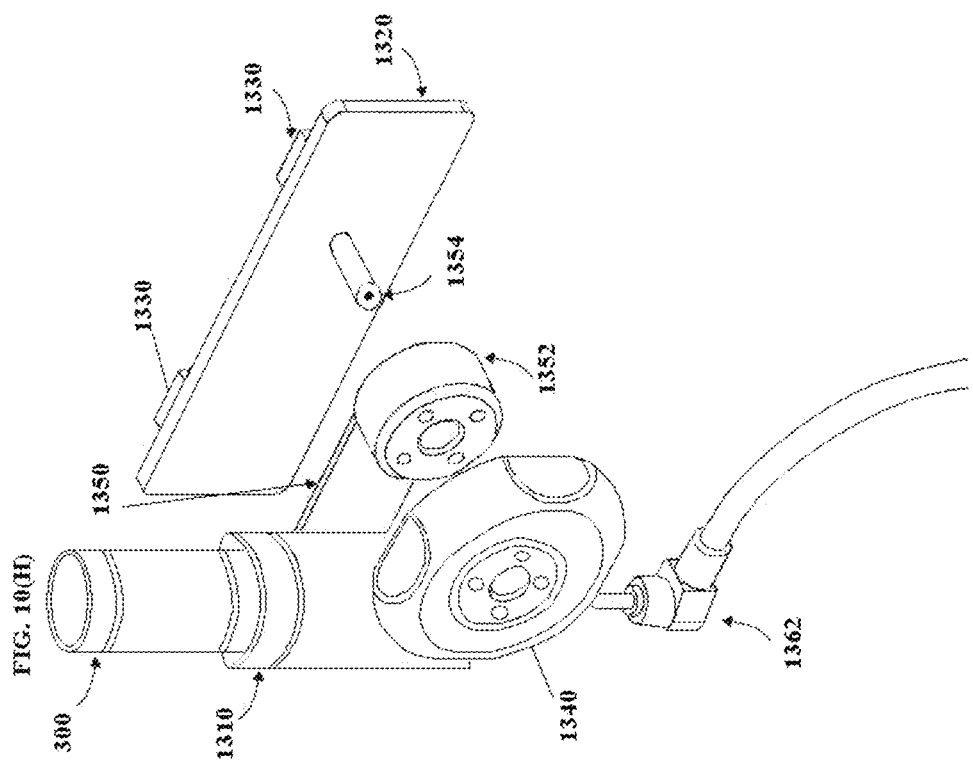
Figure 10G:
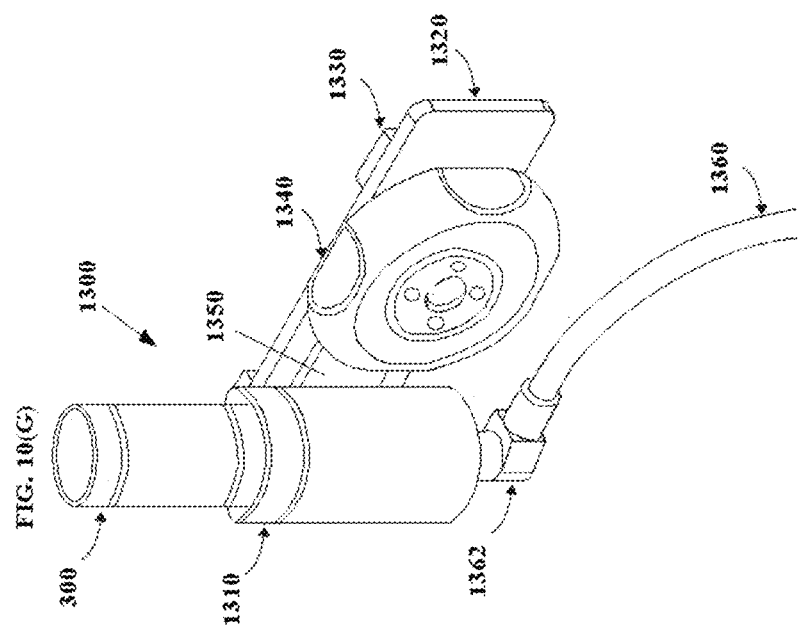
Figure 10O:
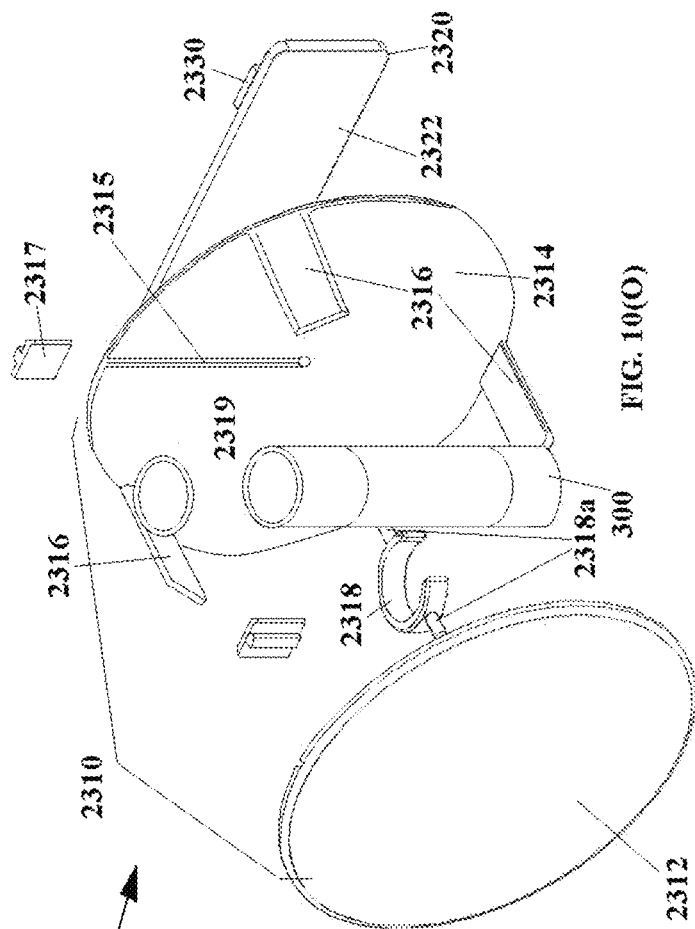
Figure 10N:
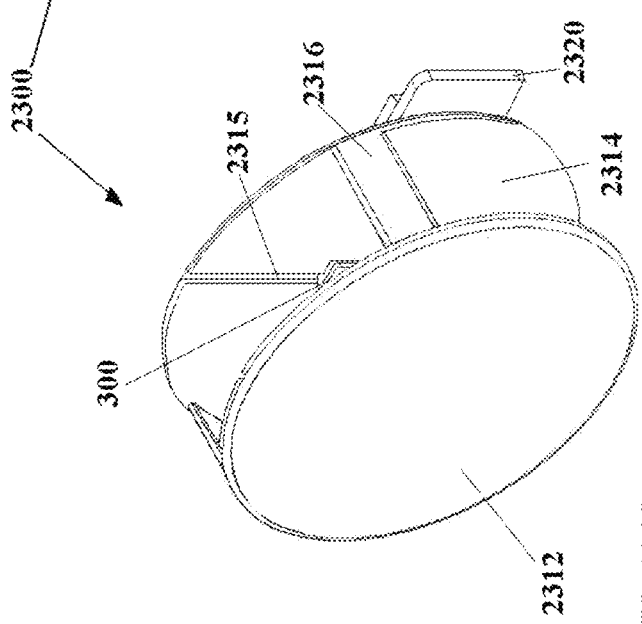

This Green Rescue Laser Flare® can be attached to band 100 in a variety of ways. For example, it may simply be mounted in a loop 114 as described herein. By way of further example, it may be enclosed in a cloth encasement or pouch. By way of further example, laser beacon 300 may be mounted on an adjustable platform or fixture 310, such as a pivoting bracket and/or a plastic encasement that can adjust to various positions as depicted in FIG. 10(A). As also mentioned above, pendulum positioning may be provided in a number of ways with a counterweight. The counterweight can even be the laser itself, if desired. Unlike, pyrotechnic flares, laser beacon 300 is non-flammable and non-hazardous.

FIGS. 10(B)-10(F) depict a top view and four side views of the laser beacon in a positioning assembly 1300. As depicted, laser beacon 300 is disposed in a sleeve-type retainer 1310 that is connected to an arm 1350 which is connected to a hub 1352 that is adapted and configured to rotate about a pivot 1354 (FIG. 10(H)). Pivot 1354 in turn is connected to a first side 1322 of a mounting plate 1320 having a second side 1324. Second side 1324 of plate 1320 includes a plurality of teeth or retainers 1330 that each cooperate with plate 1320 to define a space 1332 for receiving a strap or a belt. Beacon may be rotated about pivot by loosening or rotating adjustment wheel 1340 about axis X. While laser beacon may be powered by an on-board battery as described herein, it may also be powered by an external battery. As such, a plug in power cable 1360 is also provided having a first connector 1362 for connecting to the laser beacon 300 and a second connector 1364 for connecting to a power source.

FIGS. 10(I)-10(O) depict still another embodiment of a laser beacon 300 in a positioning assembly 2300. Assembly 2300 permits laser beacon 300 to rotate freely through a 360 degree rotation about axis X. As will be appreciated, this embodiment most advantageously uses a battery powered laser beacon. As depicted most clearly in FIG. 10(O), laser beacon is disposed in a retainer ring 2318, such as in a snap fit configuration. If desired, an additional retainer ring 2319 may be provided to help maintain beacon 300 in position within ring 2318. Retainer ring 2318 is further provided with two knobs or protrusions 2318*a* that are received within assembly 2310 within parallel guide tracks 2315. Assembly 2310 includes a first guard wall 2312 and a second guard wall 2314 connected by a plurality of struts 2316. If desired, retainers 2317 may be provided for holding protrusions 2318 in place during use. Assembly 2310 is received on mounting plate 2320. Mounting plate 2320 is similar to plate 1320 and includes a plurality of teeth or retainers 1330 for receiving a belt or a strap.

Figure 10P:
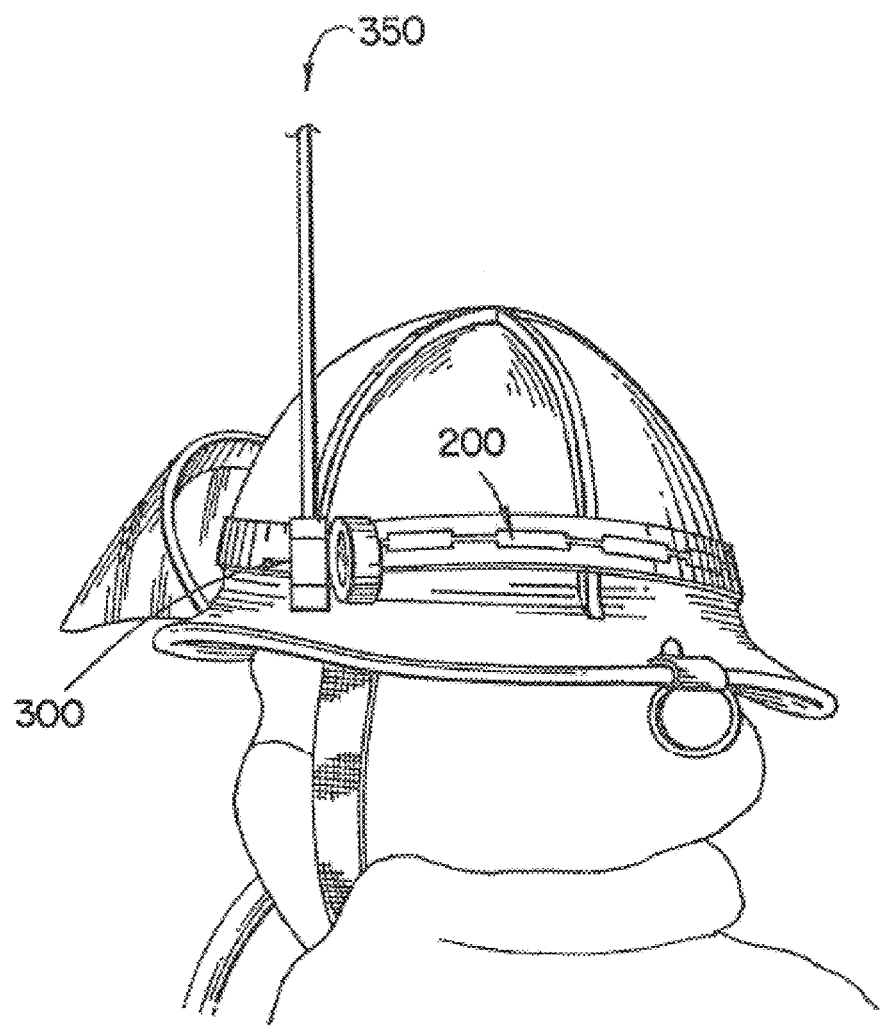
Figure 11A:
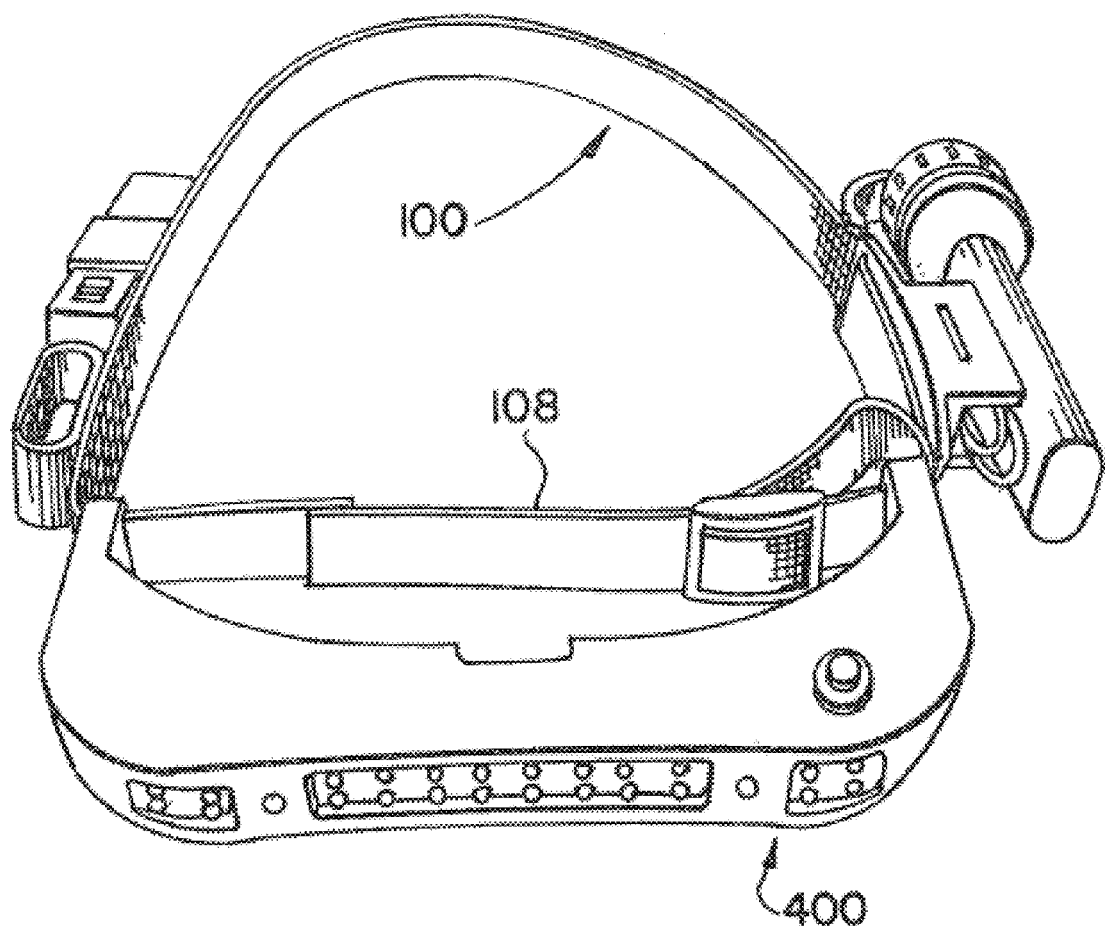
FIGS. 11(A)-11(G) depict various views of a tool band including an electroluminescent lamp and a work light alone, and mounted on a helmet, in accordance with the present disclosure.
Figure 11B:
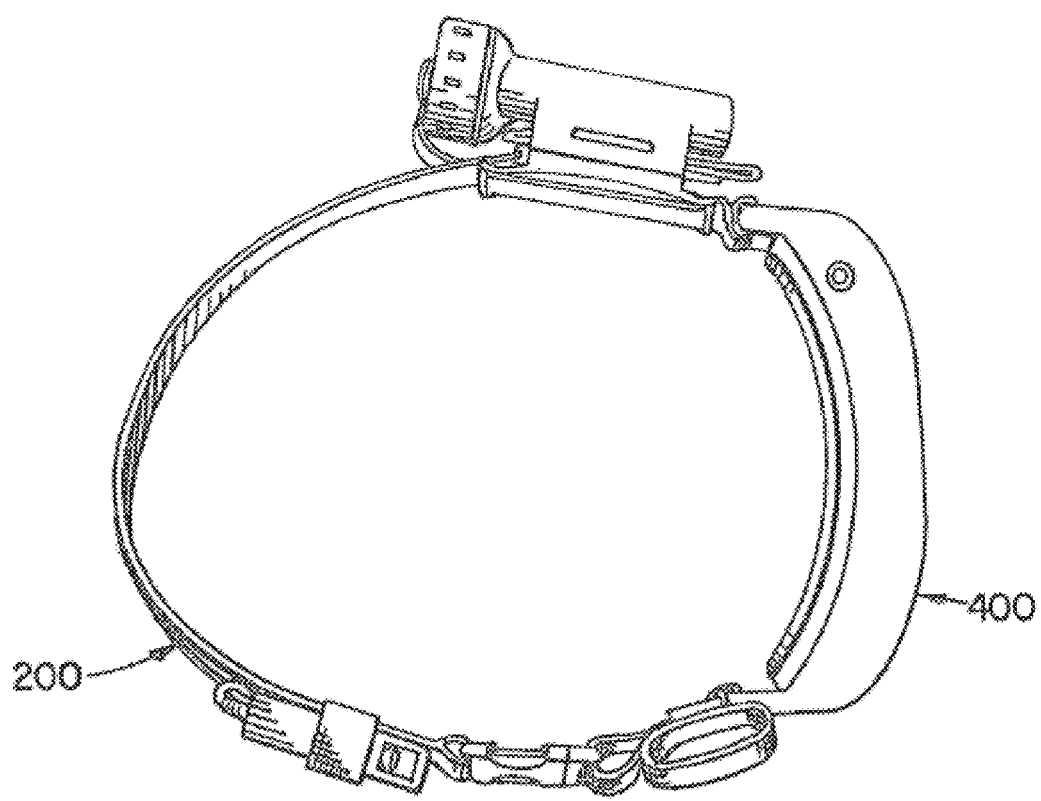
Figure 11C:
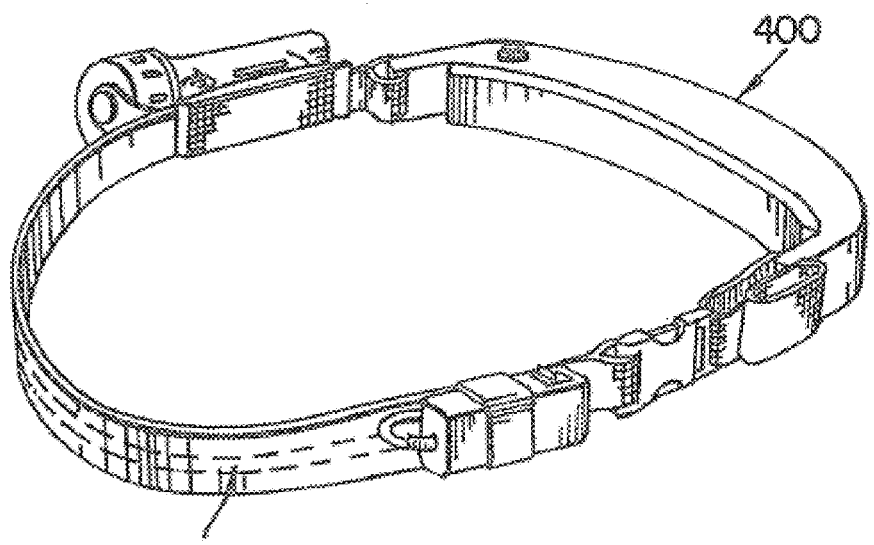
Figure 11D:
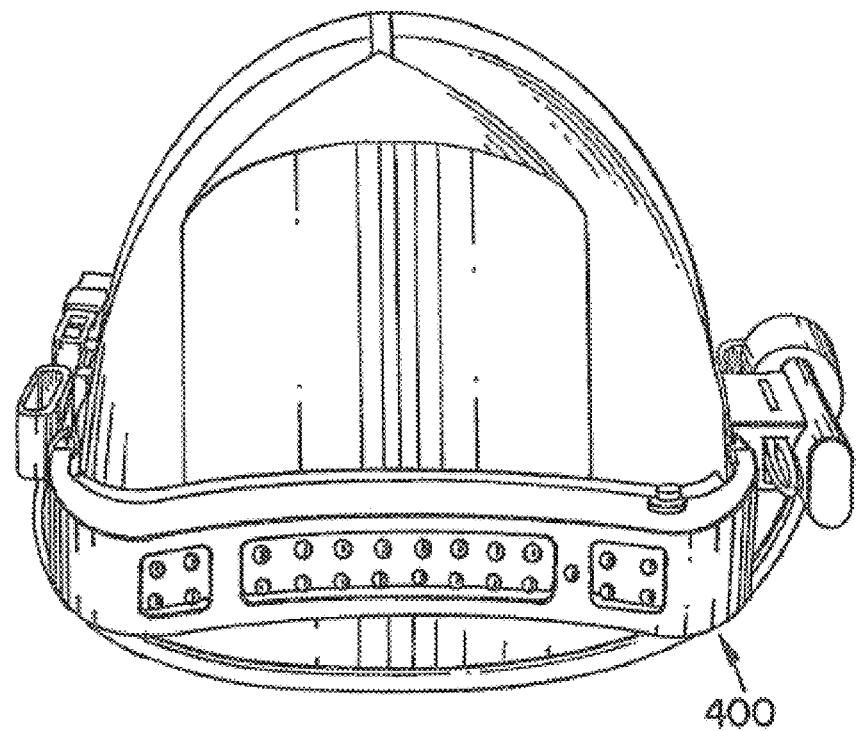
Figure 11E:
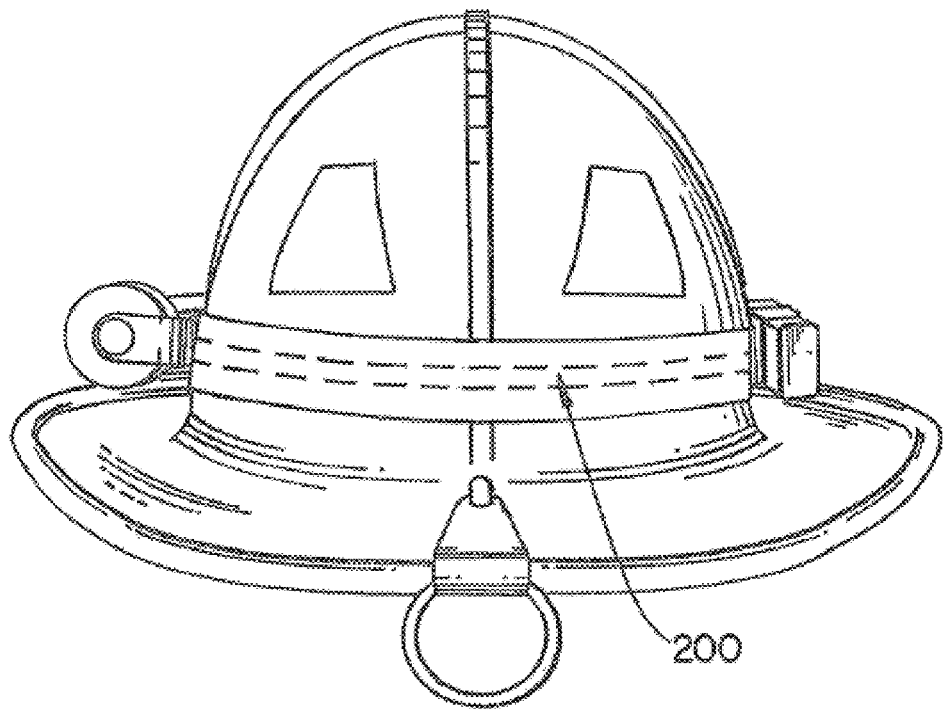
Figure 11F:
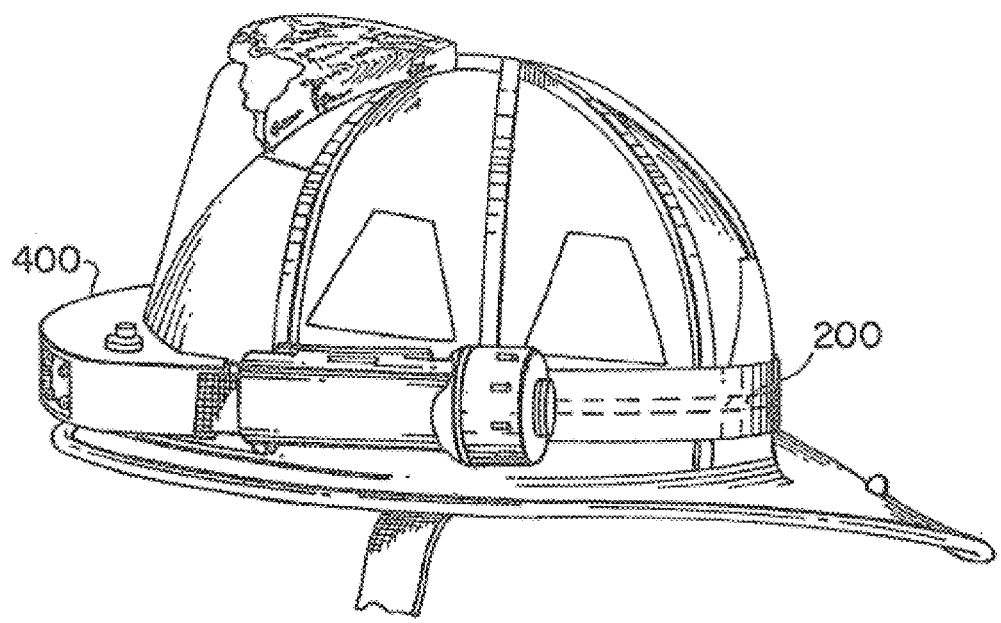
Figure 11G:
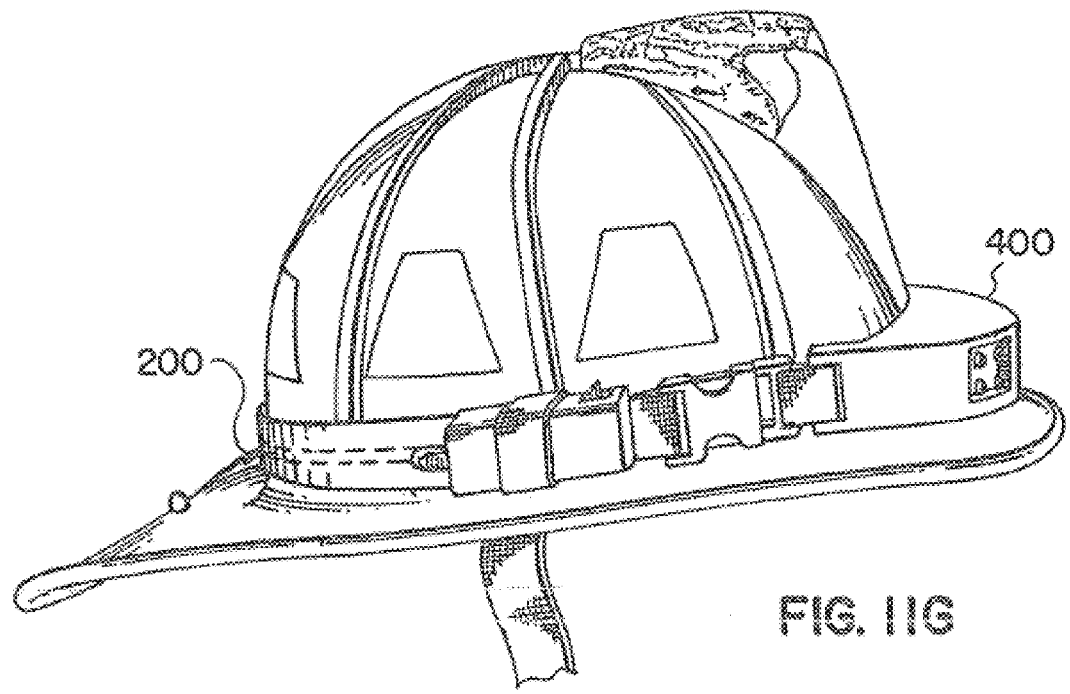
Figure 12A:
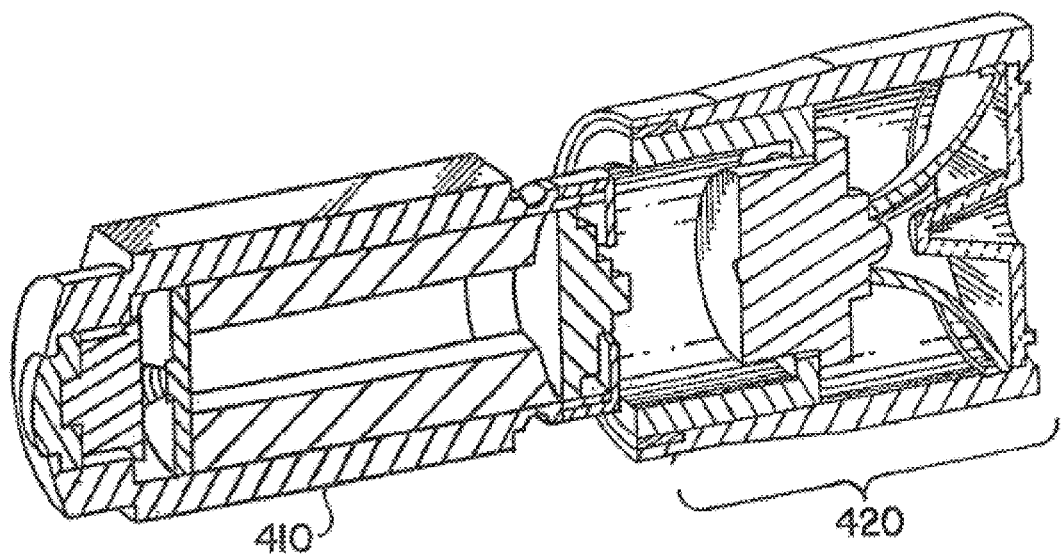
FIGS. 12(A)-12(F) depict various views of features of a novel work light provided in accordance with the present disclosure.
Figure 12B:
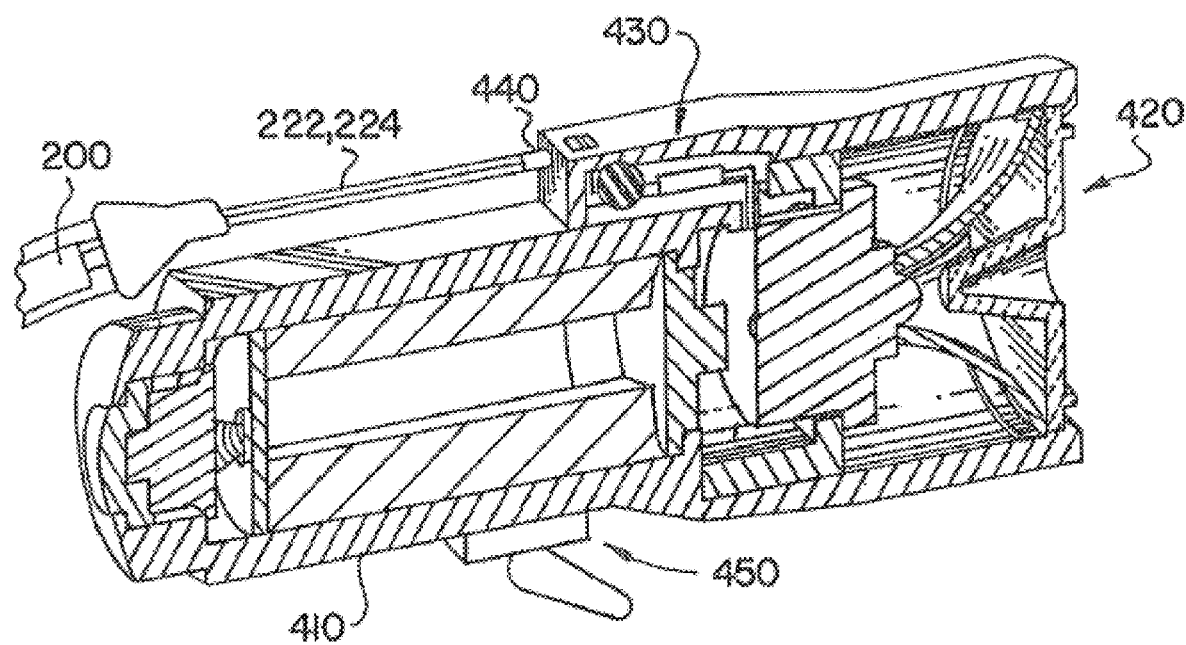
Figure 12C:
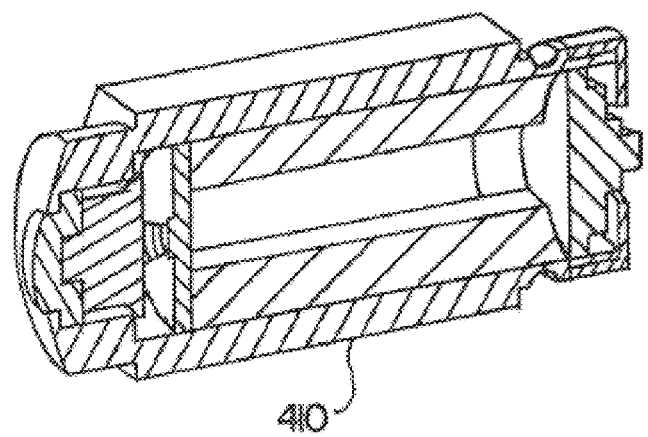
Figure 12D:
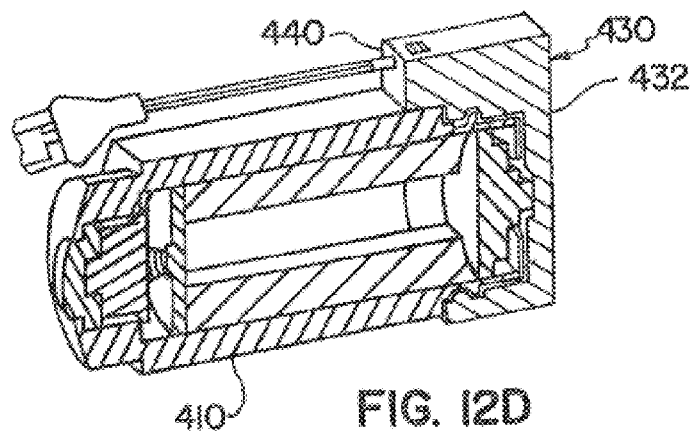
Figure 12E:
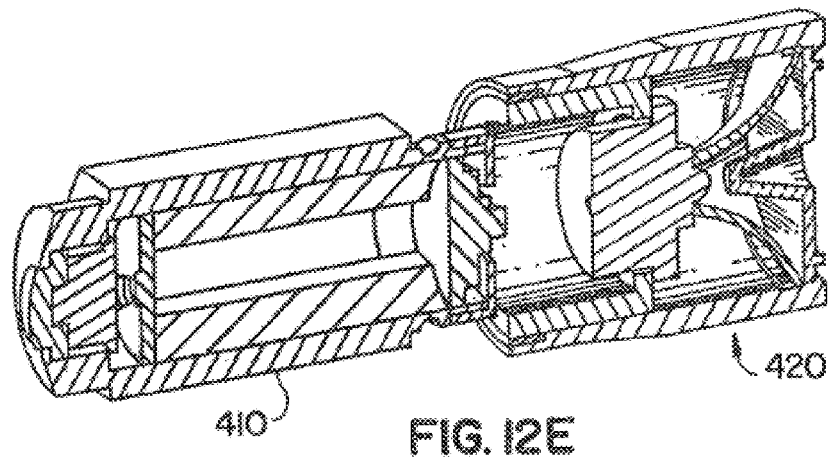
Figure 12F:
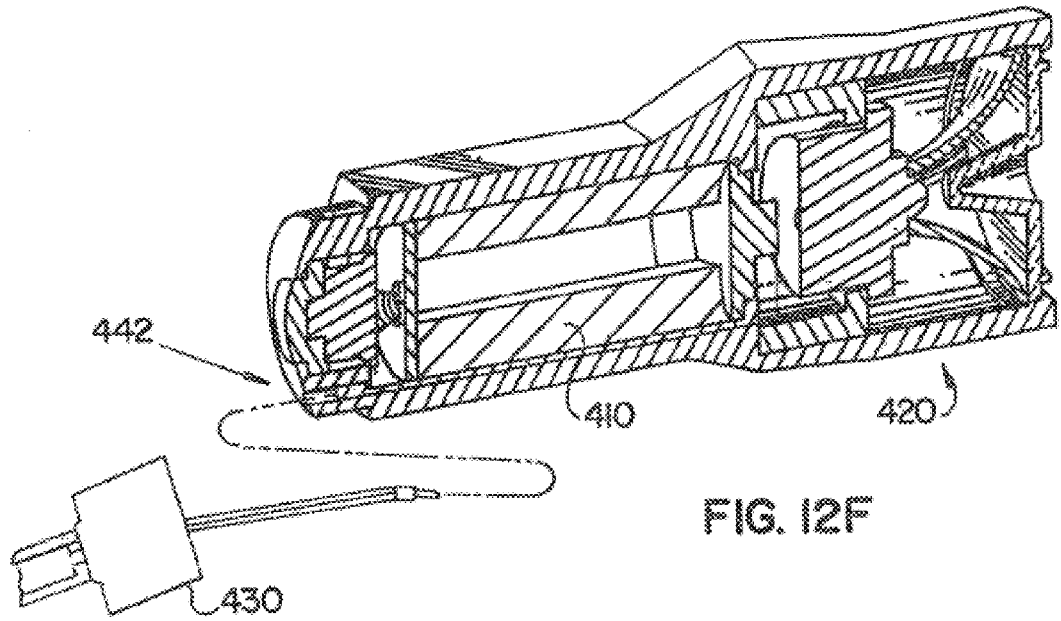
Figure 13A:
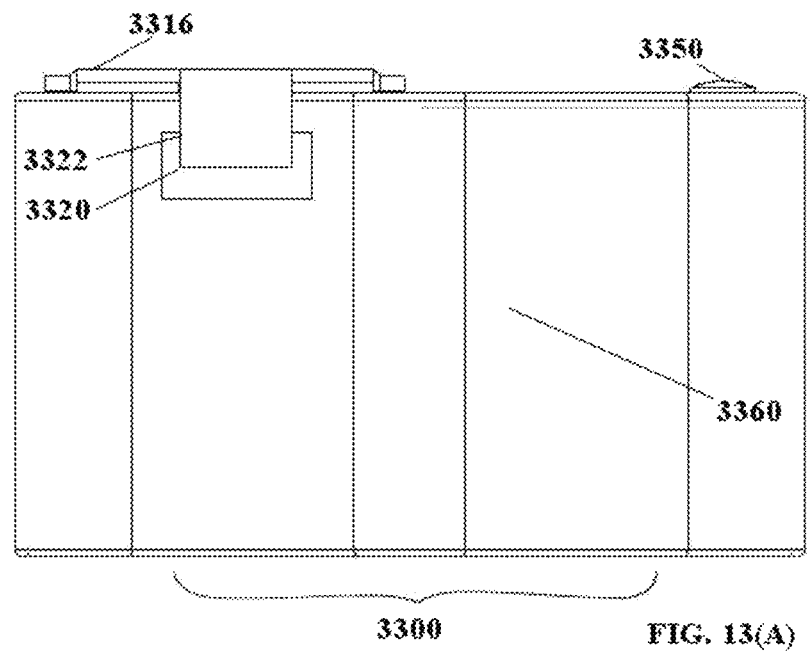
Figure 13B:
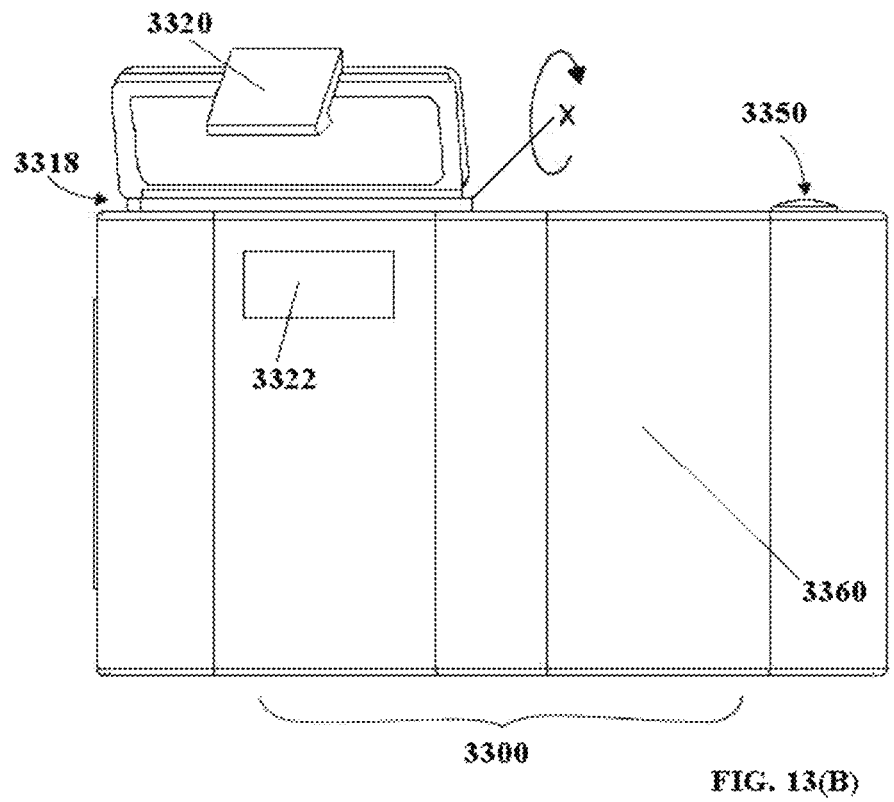
Figure 13C:
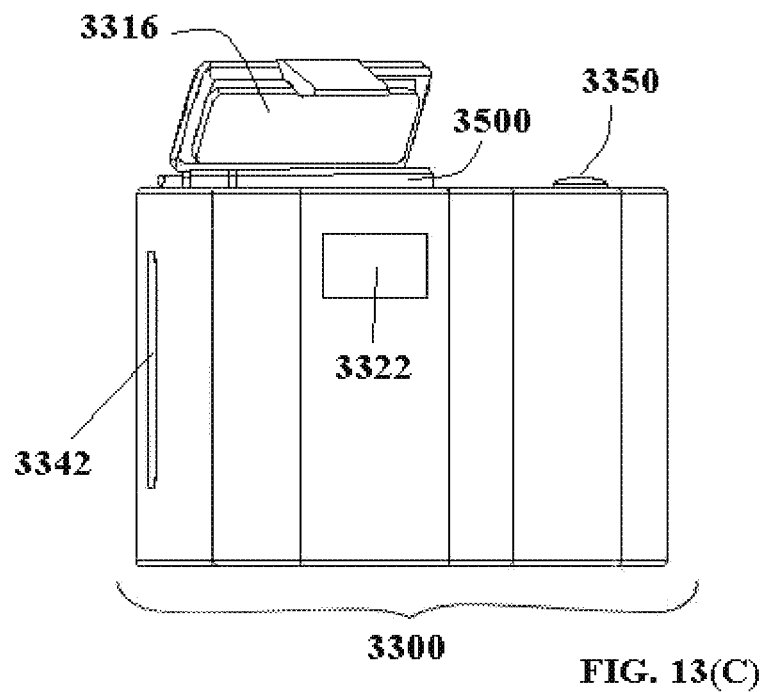
Figure 13D:
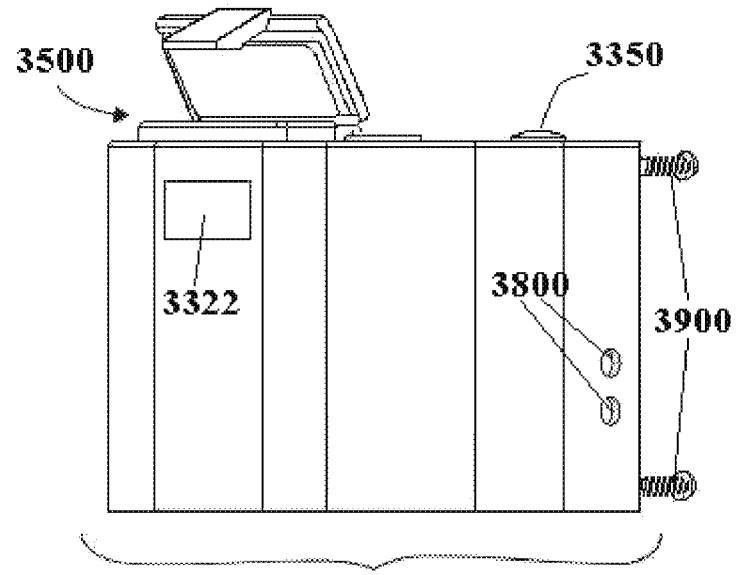
Figure 13E:
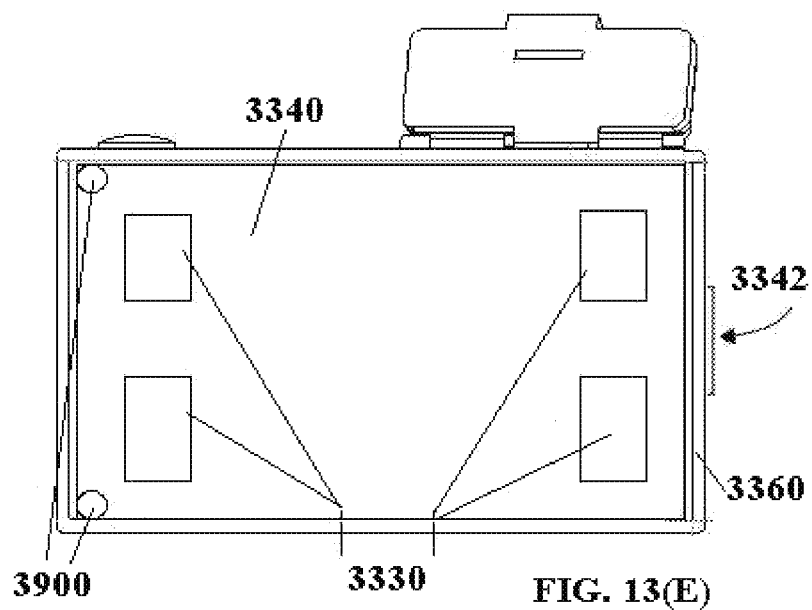
Figure 13F:
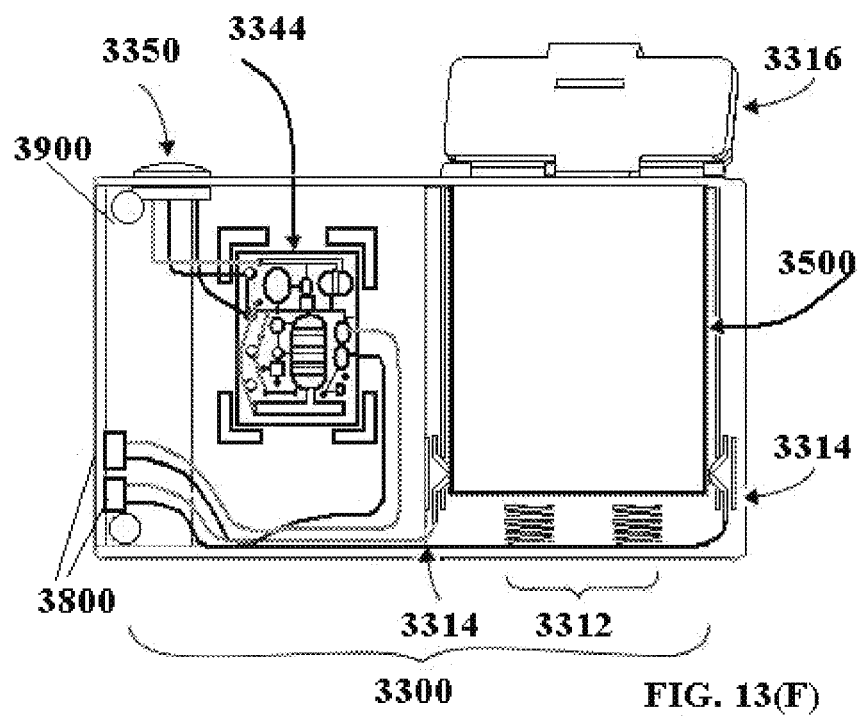
Figure 13I:
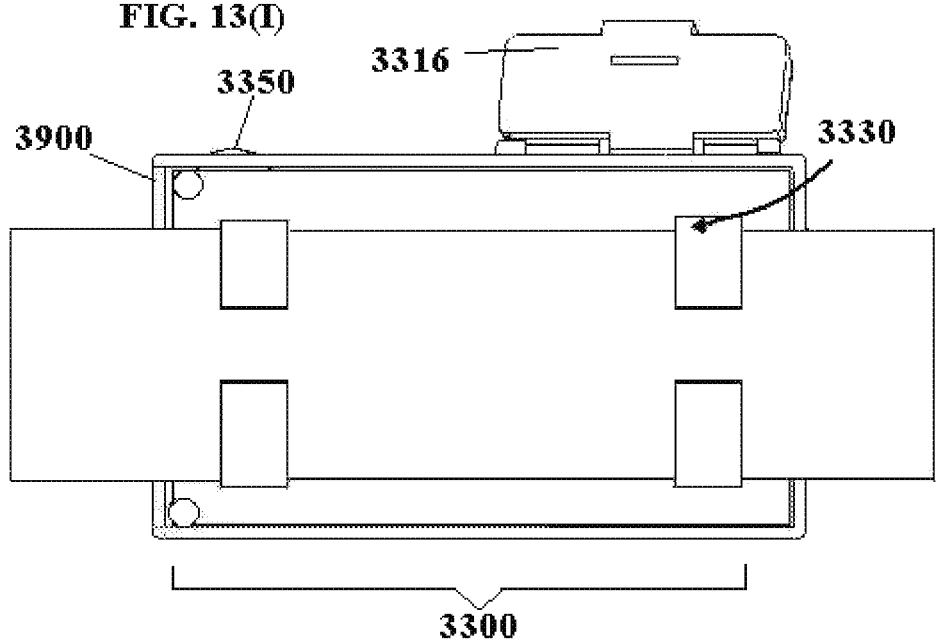
Figure 13J:
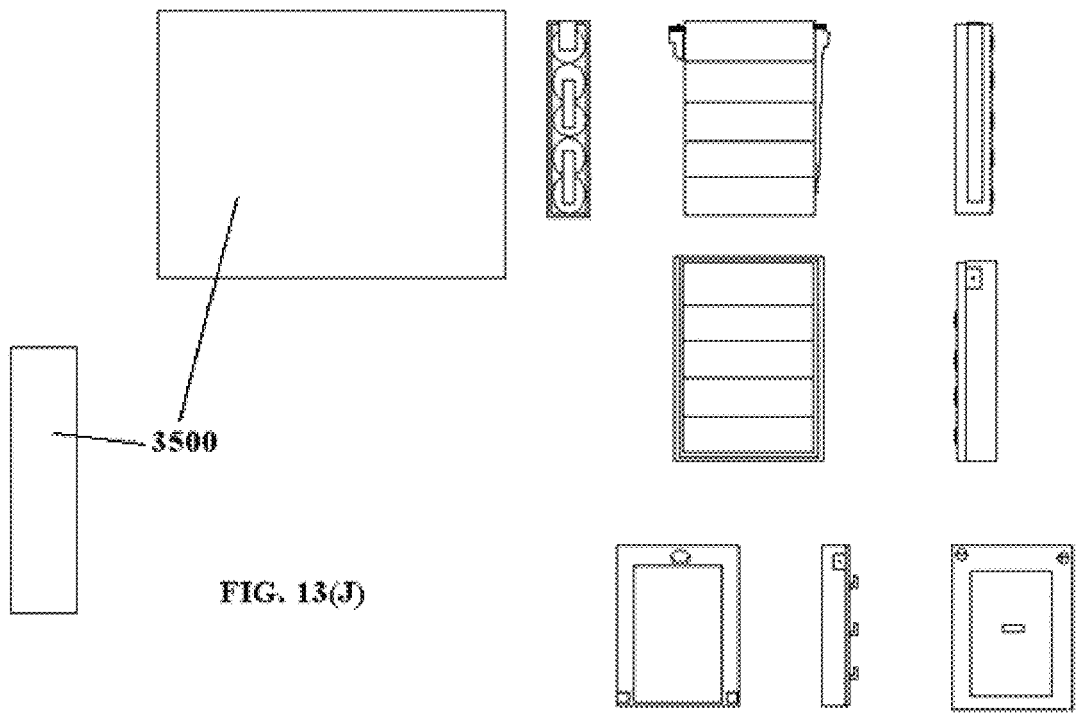

If desired, as embodied herein, an electroluminescent lamp (such as lamp 200) may be mounted on the band 100 to be used in combination with laser 300. Using laser 300 in combination with lamp 200 can be particularly advantageous. While each device can be used to support the same function (e.g., locating a nearby individual), the laser 300 can also be used to locate an individual that is far away. An embodiment of such an arrangement is depicted in FIG. 10(P). As is further depicted in FIGS. 1(A)-1(B), tool band 100 can be further outfitted with a work light 400. Work light 400 can include, for example, a flashlight that is removable from tool band 100, or may include a lamp. If desired, work light 400 can also act as a power source for other active lighting devices on tool band 100.

As indicated above, work light 400 is preferably either a flashlight, such as a compact torch flashlight or a compact lamp. A compact torch flashlight ranging from about 4 to 5 inches in length can easily mount on tool band 100 permitting the projection of work illumination in front of the user of band 100. Attachment devices may be used for selective directional targeting that preferably permits illumination of the space in front of the user. Attachment can be accomplished in a variety of ways. It will be appreciated that the work light 400 will preferably be positioned on the right or left side of the user on band 100 thereby directing its beam forward. In accordance with one example, a loop 114 can be provided defining a passage therethrough along the direction of band 100 that is adapted and configured to hold light 400 securely in place. A molded clip and bracket may also be used that allows removability of light 400 and/or aiming of the light. Moreover, a work light 400 can be fully integrated into band 400 having replaceable batteries and/or a removable battery pack.

An example of one suitable torch flashlight that may be used, is a compact torch flashlight called the Helm-A-Lite™ Compact Torch commercially available from the Helm-A-Lite company in Pointe-Claire, QC, Canada (Tel. (514) 426-9266; website: www.helmalite.com). This torch flashlight is about four inches in length and projects a beam of light from a one watt lamp including light emitting diodes ("LED's"). The flashlight housing is made from heat and flame resistant polycarbonate, is water proof, impact resistant and safe to use. This particular torch flashlight is powered with 3 AAA batteries and has a burn time of about 15 hours.

In accordance with another embodiment of the disclosure, as depicted in FIGS. 11(A)-11(G), a compact lamp 400 can be mounted to the "front" side of the utility strap/tool band 100 oriented such that it is on the front of the helmet, opposite the rear of a user's helmet where an integrated conspicuity lamp (e.g., 200) may be mounted. Such a configuration permits lamp 400 to project work illumination in front of the user.

An example of a suitable lamp 400 is a compact multiple LED lamp system called the Foxfury™ Signature model, commercially available from FoxFury Action Lighting (NOAH Systems LLC) of Vista, California (Tel.: (760) 945 4231; website: www.foxfury.com). Certain aspects of this lamp are described in U.S. Pat. No. 6,966,668, which is incorporated by reference herein in its entirety. The commercial embodiment of this lamp 400 is depicted in FIGS. 11(A)-11(G). The lamp is 6 inches in length and casts a broad light designed to satisfy peripheral work light illumination. This lamp operates with a sequence of 24 LED's and is made with a heat and flame resistant polycarbonate, is water proof, impact resistant and intrinsically safe. Lamp illumination is powered with 4"AA" batteries and has a burn time of 18 hours.

In accordance with one embodiment of the disclosure, as depicted in FIGS. 12(A)-12(F), the work light 400 may be a torch flashlight include a direct current power source 410 such as a battery or a capacitor bank, a lamp 420 operably coupled to the power source 410, and an electrical inverter 430 operably coupled to the battery 410 for converting direct current to alternating current. Inverter 430 can be independent of the work light (FIG. 12(F)), integrated with the work light when it illuminates (FIG. 12(B)), or can be configured into an inverter "head" 431 that plugs into battery 410. Preferably, battery 410 is rechargeable and may be provided with a charging stand (not depicted). A kit may be provided in accordance with the teachings herein, including all components and accessories for band 100.

Work light 400 may further include an electrical port 440 operably coupled to the electrical inverter 430 for supplying alternating current to another device, such as electroluminescent lamp 200. Light 400 can include a variety of direct current power supplies 410, such as conventional and/or rechargeable batteries, and the like. If desired, work light 400 can also include an electrical generator 450 that can generate electricity and store it in battery and/or a capacitor during periods of extended use.

The generator 450 can be used to generate power, for example, by shaking the work light 400 or a removable portion of work light 400 containing the generator and battery(ies) or capacitor, by turning a generating crank, and the like. Suitable examples of generating schemes are described, for example, in U.S. Pat. Nos. 6,994,450, 6,914, 340, 6,563,269 and 6,322,233. Each of these patents is incorporated by reference herein in its entirety. If desired, the light 400 can also include a DC power port 442 for powering a DC accessory, such as laser beacon 300 described herein. If desired, inverter 430 can be integrally formed with lamp 200 or band 100 and can be plugged into light 400 to obtain DC power to power the lamp 200 by way of inverter 430.

The utility strap/tool band 100 for helmets provided herein can be considered to be a system wherein an electroluminescent illuminated strip (e.g., 200) compliments many applications which may involve the use of other technologies. Although tool band 100 serves primarily as a conspicuity device, an objective of tool band 100 outside of providing conspicuity is to assist users in carrying or incorporating other functional tools into band 100 to facilitate achievement of a myriad of task oriented goals. As depicted, the electroluminescent lamp 200 integrated into tool band is preferably a permanent fixture (but could be removable, if desired). This uniqueness of the design of band 100 embodied herein offers a variety of components that can be easily plugged-in or removed from band 100, thereby providing a modular system having interchangeable components. As will be appreciated, the active electrical components contained by band 100 may each have their own power source, or may share a power source, as appropriate. It will also be appreciated that while a helmet band is a preferred embodiment, tool band 100 and all of its features described herein can be embodied as a belt for wearing around a user's midsection, arms, legs, neck or head, as appropriate. By way of further example, tool band may also be configured for use as a sash or a utility vest, among other configurations.

For example, an utility strap/tool band 100 for a helmets with an integrated electroluminescent lamp 200 may be modularly combined with (i) work lamp illumination, (ii) work torch illumination, (iii) a laser beacon (e.g., 300), (iv) an electrical inverter and (v) a conventional or rechargeable battery pack, among other features, such as a global positioning device, a two-way radio, a portable telephone, an electrical generator, and the like. Illustrations of some of these concepts are present in FIGS. 12(A)-12(F).

Alternatively, many of the interchangeable components described above can also be designed to be an integrated, permanent fixture of band 100. Preferably, in such a configuration, most or all of the components can operate from a single power source such as a battery pack. Advanced flashlight designs can improve functionality as a specially designed torch or lamp can incorporate an inverter and/or a generator within its housing as described herein, enabling a flashlight to have a AC and DC output. It is also within the scope of the disclosure to provide for an integrated flashlight, inverter, and laser.

Additional embodiments of devices made in accordance with the disclosure are further disclosed in FIGS. 13(A)-17(D).

FIGS. 13(A)-13(M) depict an additional embodiment of a housing including a power source provided in accordance with the disclosure. As depicted, a power supply housing 3300 is provided having a generally rectangular body. A battery compartment 3310 is defined in housing that is adapted and configured to receive a battery pack 3500. Battery pack 3500 may have any suitable configuration. In accordance with a preferred embodiment, battery pack 3500 includes 5 "AAA" type rechargeable (e.g., NiMH, NiCD or Li-Ion) batteries. Commercially available battery packs are available having storage capacities, for example, of about 800, 1500, 1600, 1800 and 2000 mAH. DC power. Battery 3500 provides electrical power to power supply housing 3300 when engaged with electrical contacts 3314. Battery 3500 is preferably spring biased by springs 3312 to eject battery 3500 from compartment 3310 when cover hatch 3316 is in an open condition. As depicted, cover hatch 3316 is hingedly connected to power supply housing 3300 by a pin hinge 3318 and held in place by a catch 3320 that engages a recess 3322 in housing 3300. To close hatch 3316, battery 3500 is pushed down into compartment 3310 while being opposed by spring force until catch 3320 engages recess 3322.

As depicted, a plurality of power ports 3800 are provided for powering accessories. Ports may be direct current ("DC") ports in direct electrical communication with battery 3500 and/or alternating current ("AC") power ports in electrical communication with battery 3500 by way of inverter 3344. Housing 3300 also includes a switch 3350 that may power the AC port and/or the DC port. As will be appreciated, additional AC or DC ports may be provided. Switch 3350 is preferably a three way switch that can operate inverter in an on/off, constant on and blink mode, particularly for powering device 200. However, other accessories such as work lights or laser beacons can be operated in blink mode for conspicuity and/or to conserve electrical power.

The structure of power supply housing 3300 includes a back panel 3340 that fits into a front housing portion 3360. As depicted, back panel 3340 fits into the back of front housing portion 3360. A tab 3342 provided along one edge of back panel 3340 mates with a slot 3362 defined in front housing portion 3360. Two screws 3900 are used to hold back panel in position. As depicted in FIG. 13(L), back panel actually helps define battery compartment 1310 and includes a plurality of ribs 1317 to guide battery 3500 into position. As most clearly depicted in FIG. 13(I), a plurality of teeth or retainers 3330 are provided for receiving a belt or a strap therein.

Figure 14A:
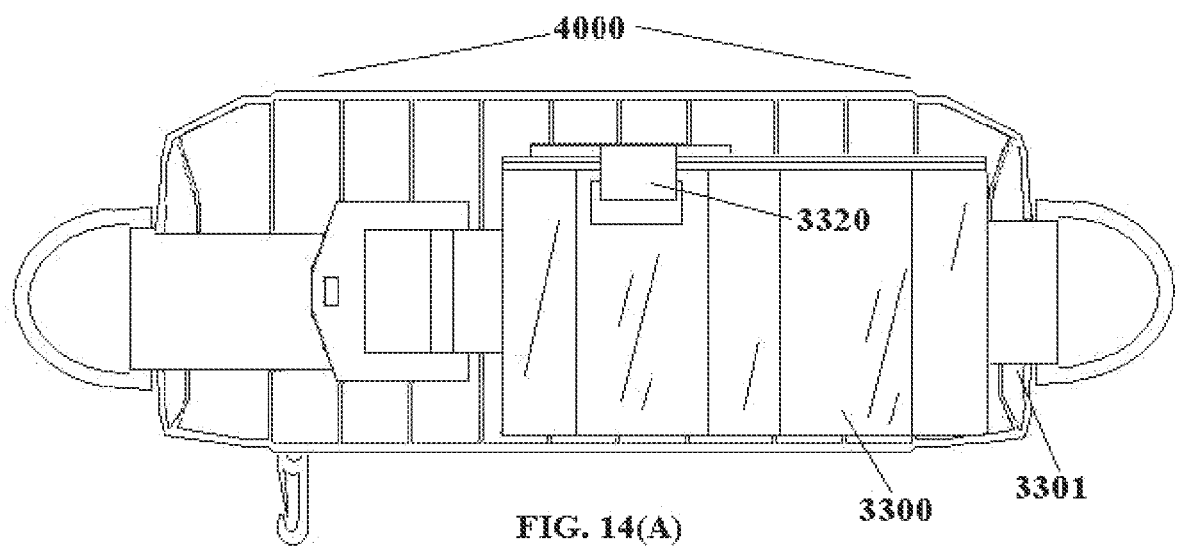
FIGS. 14(A)-14(B) depict views of a belt made in accordance with the disclosure.
Figure 14B:
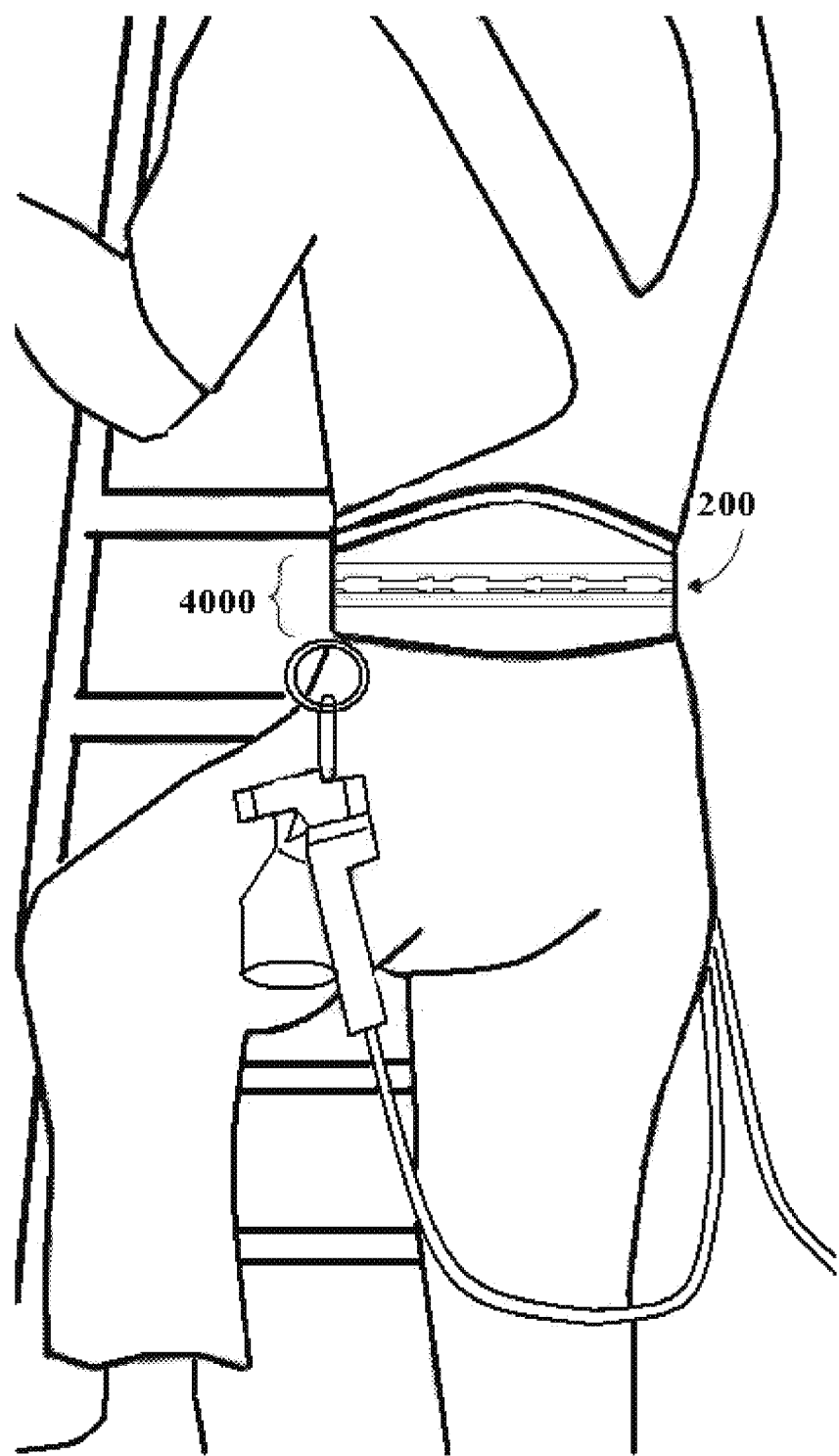
Figure 15H:
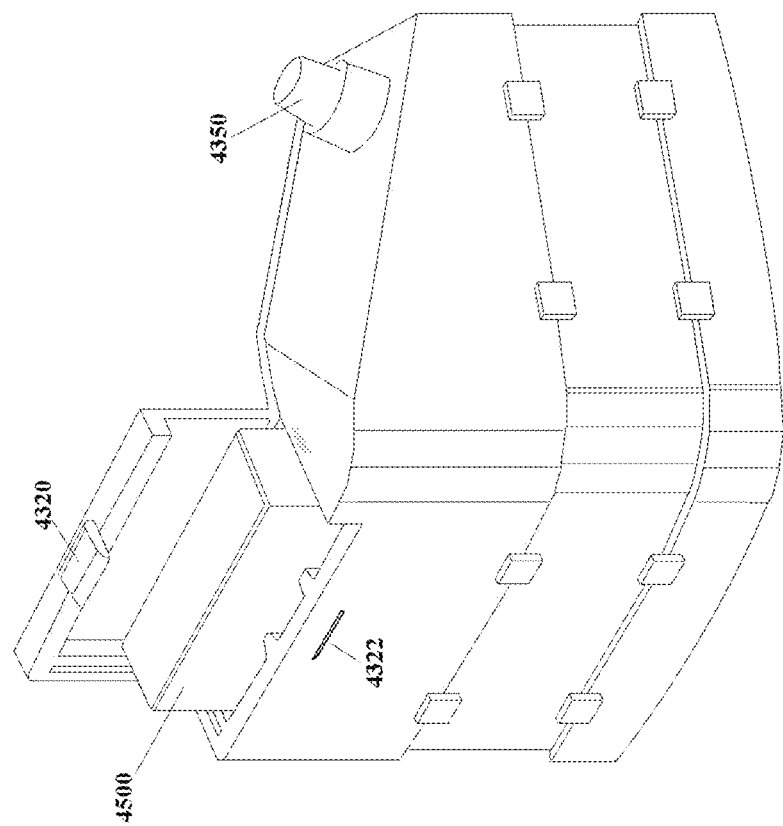
Figure 15G:
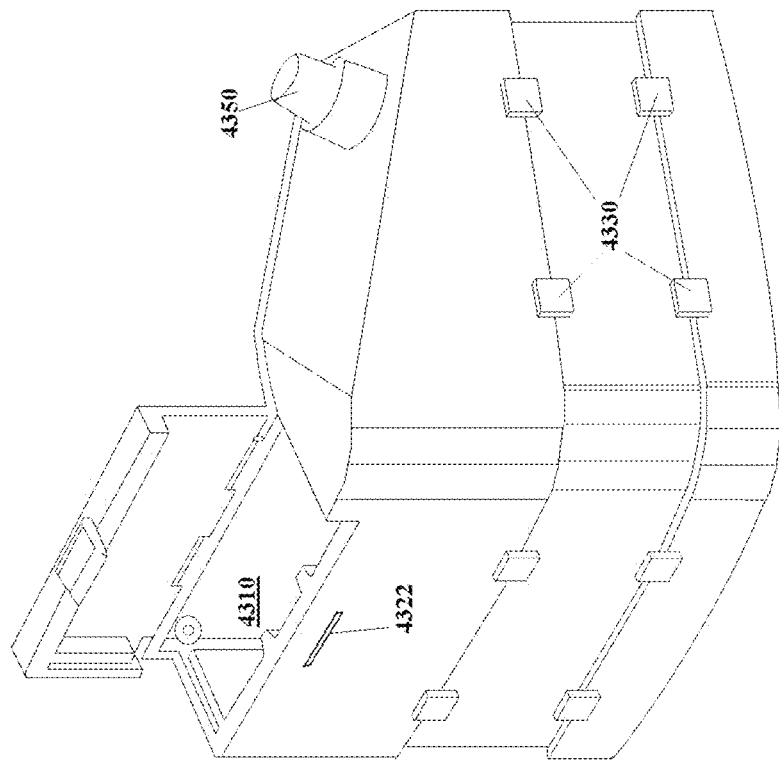
Figure 15I:
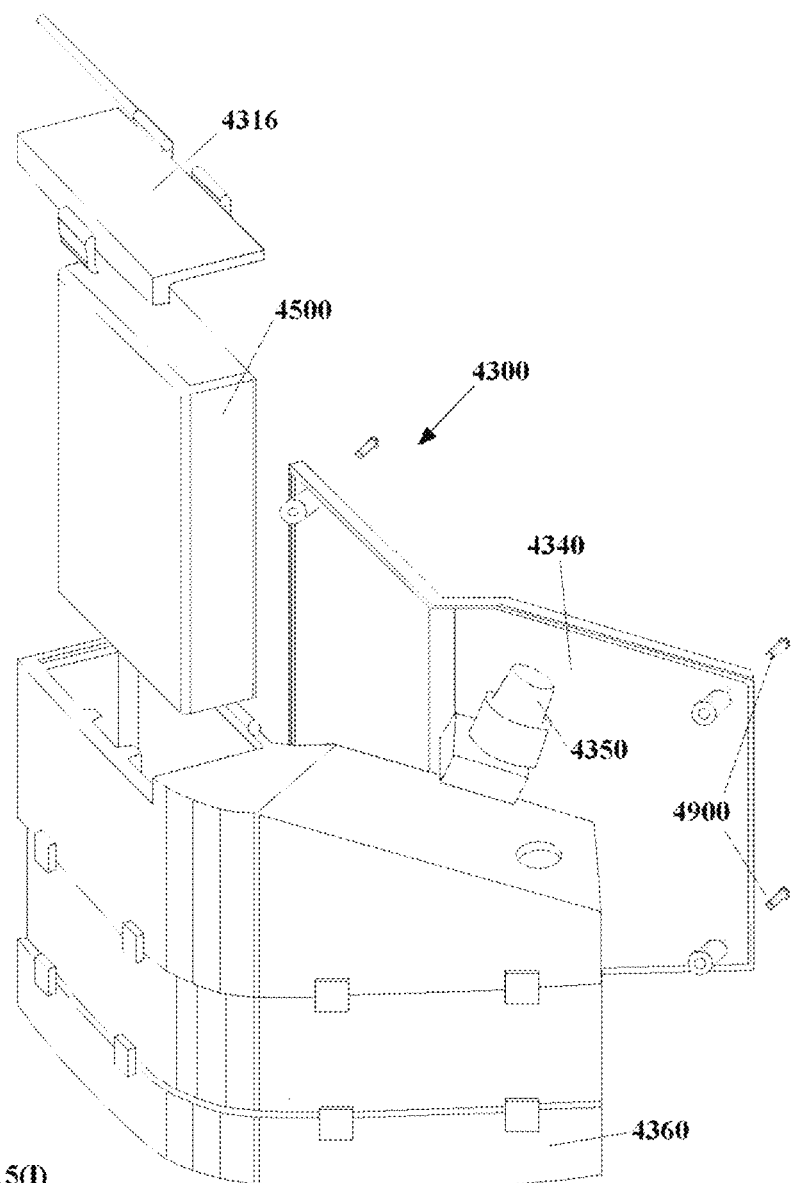

As depicted in FIGS. 14(A)-14(B), power supply housing 3300 may be attached to a belt 4000 and used to power a conspicuity device 200 as described herein by way of a power line 3301 that can plug into power supply housing 3300. As depicted in FIG. 14(C), power supply housing 3000 may be disposed in a pocket 4120 of a bag or other container 4100 for powering a conspicuity device (e.g., 200). Conspicuity device 200, as depicted, is attached to a handle 4110 of bag 4100. Conspicuity device 200 may be removably attachable, such as by straps, buttons, and/or hook and loop fasteners as described herein. Moreover, a kit may be provided including power supply housing 3300 and conspicuity device 200 with attachment hardware (e.g., hook and loop fasteners) that can facilitate retrofitting any garment or other object (e.g., toolbox, backpack, bags, target exit devices, etc.) with a conspicuity device. Such garments may include fire apparel as embodied herein and depicted in FIGS. 7(A)-7(E), belts (e.g., waist, shoulder sashes). Such a kit is facilitated by the modular nature of devices made in accordance with the present disclosure.

Moreover, such a kit may be used as a stationary device that is mounted in a window, such as in a home in a child's room. The conspicuity device may be activated, for example, by a smoke detector or manually. For example, housing 3300 may include an acoustically activated switch 3500 that turns on when a nearby smoke detector sounds an alarm. Thus, as a result of the smoke alarm being activated, a device (e.g., 200, 300) may activate to alert an emergency worker arriving on the scene of the location of possibly sleeping and/or unconscious individuals.

Device 200 may also be integrated into a fire alarm and activated when the alarm activates to provide a visual signal to help occupants of a building (or vehicle) physically orient themselves to facilitate escaping from a dangerous situation. Device 300 may be similarly integrated, and point its beam 350 in the direction of an escape route.

FIGS. 15(A)-15(I) depict an embodiment of an ergonomically shaped power supply housing 4300 made in accordance with the disclosure. Housing 4300 is structurally and functionally similar to power supply housing 3300, with certain notable differences. Dimensions of housing 4300 are depicted in inches. Housing includes a front housing portion 4360 that is adapted to receive a rear housing portion 4340 held in place, for example, by screws 4900. In the instant embodiment, front housing portion 4360 defines a channel 4365 that is adapted and configured to receive a belt or strap held in place by retainers 4330. A switch 4350 similar to switch 3350 is also provided on an upper surface 4370 of power supply housing 4300. A battery compartment 4310 is defined in housing 4300, that may be covered by a hatch 4316 attached to housing 4300 by hinge 4318. A catch 4320 provided on hatch 4316 can mate (preferably by snap fit) with recess 4322 defined on housing 4300. A plurality of AC and/or DC ports 4800 are provided.

Most notably, the shape of housing 4300 differs from that of housing 3300. For example, housing 4300 has a contoured V-shape, clearly depicted in the top view of FIG. 15(A). As can be seen, housing 4300 has a first portion 4302 that is angled with respect to a second portion 4303 of housing 4300. As depicted, the housing portions are angled at an angle of about 114 degrees. Such an angulation is advantageous as it helps housing 4300 fit the curvature of may helmets used by professionals in the emergency service and other industries, such as New York firefighter helmets (leather and synthetic plastic), various other modern type firefighter helmets, various forestry type firefighter helmets and various types of rescue helmets and hard hats.

Housing 4300 also includes an inclined upper surface inclined along the direction of the front portion 4360 (about 25°) of the housing and a side portion 4380 of the housing (angle "a") as illustrated in FIGS. 15(D) and 17(C). This contouring makes it easier for a user to reach switch 4350 when mounted on a helmet, as particularly illustrated in FIG. 17(C).

Housings 3300, 4300, 240 are all preferably waterproof and include suitable gasketing about peripheries (e.g., gasket 3390 in FIG. 13(H)) and in power ports (e.g., 3800, 4800) and proximate switch (e.g., 249, 3350, 4350) to substantially prevent the entry of moisture.

Moreover, power supply housings depicted herein (e.g., 3300, 4300) may be used to power other accessory devices (e.g., two-way radios, portable telephones, infrared cameras and the like) as desired.

As depicted in FIGS. 16(A)-16(G), a further embodiment of a work light 2500 provided in accordance with the disclosure. Work light 2500 includes a lamp body 2510 pivotally attached to a hinge base 2524 of a base plate 2520. Lamp body 2510 includes a lamp of any desired suitable power output, such as a one (1) Watt Luxeon LED light, among others. Base plate 2520 includes a plurality of retainers 2522, wherein opposing retainers can retain a strap or belt, as desired, and as illustrated in use in FIG. 17(A). Work light further includes an on/off switch 2550 and a power cable 2530 having a first end 2532 connected to lamp body 2510 and a second end 2534 having a connector that may be inserted in a power port of a power source (e.g., 3300, 4300).

Figure 17A:
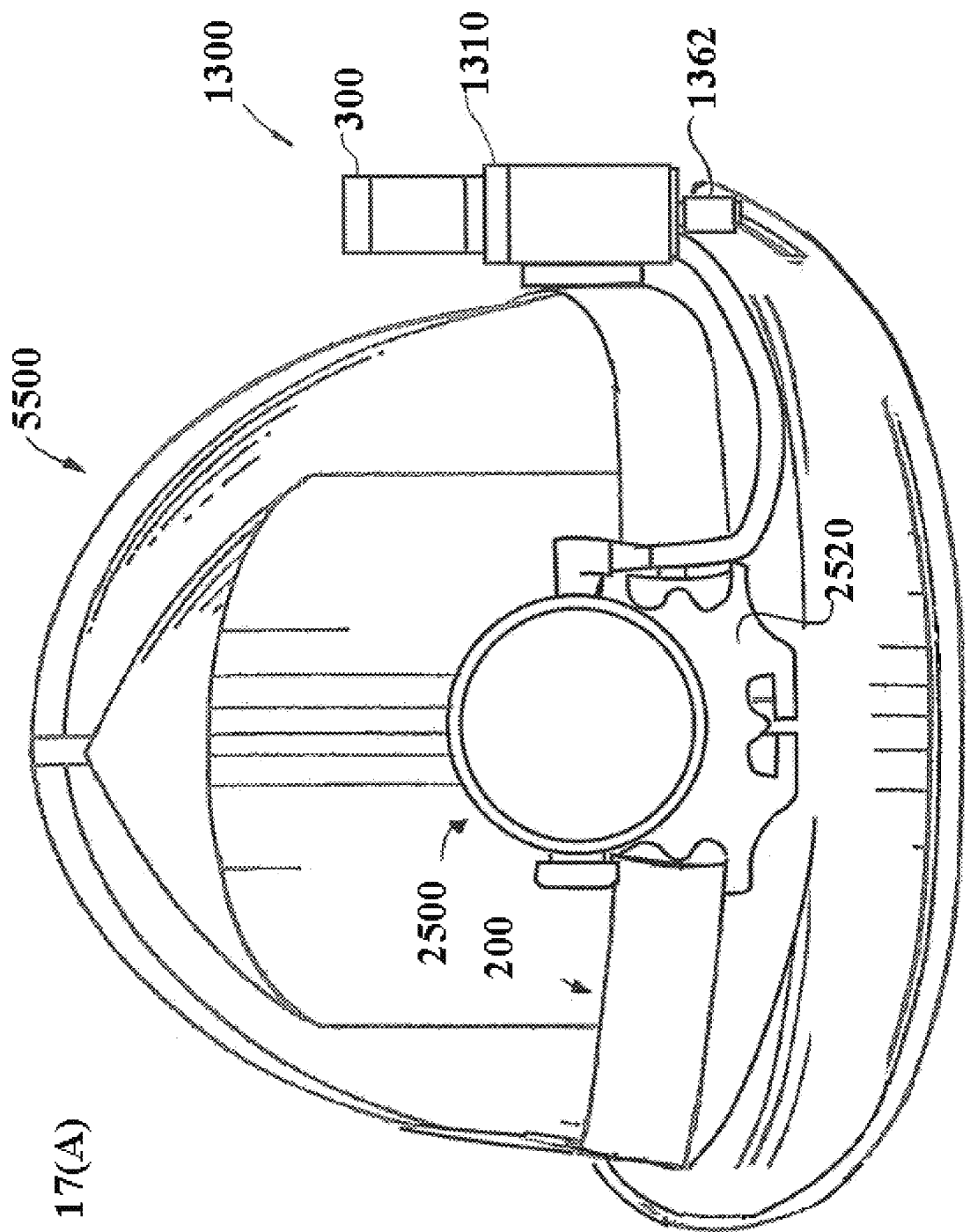
Figure 17B:
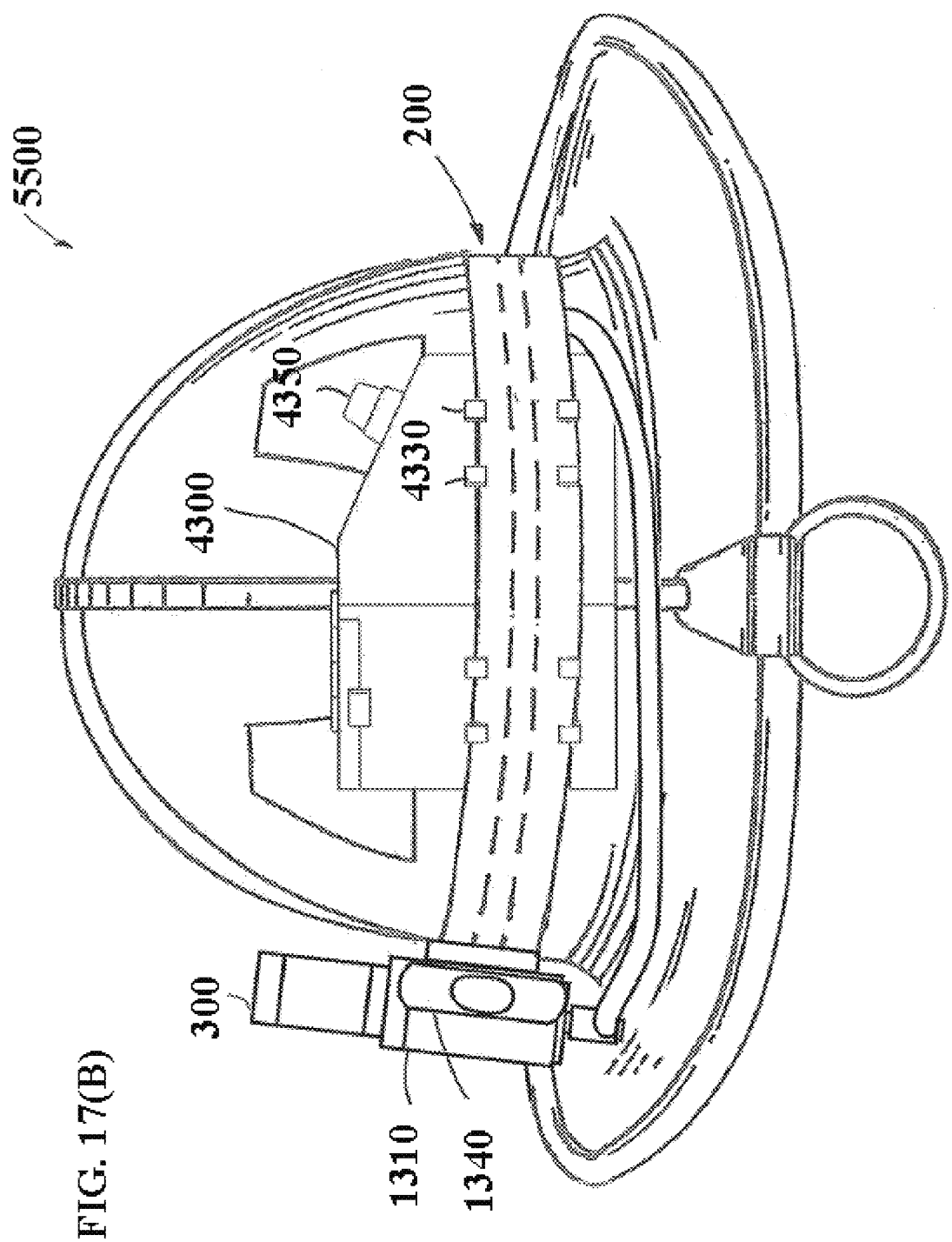

FIGS. 17(A)-17(D) depict various views of a helmet 5500 including conspicuity devices (200, 300) provided in accordance with the disclosure. A first view of a front of helmet 5500 is provided in FIG. 17(A) wherein work light 2500 is located at the front of the helmet and laser beacon assembly 1300 is disposed proximate a side of helmet 5500. FIG. 17(B) depicts a rear view the helmet as configured in FIG. 17(A), illustrating conspicuity device 200 and housing 4300 disposed proximate the rear of the helmet. Disposing the power supply housing proximate the rear of the helmet 5500 provides better weight distribution for the helmet (and balance on the wearer's head) and places the load close to the helmet's center line. Moreover, such placement keeps the electronics away from heat radiation in a firefighting situation.

Figure 17D:
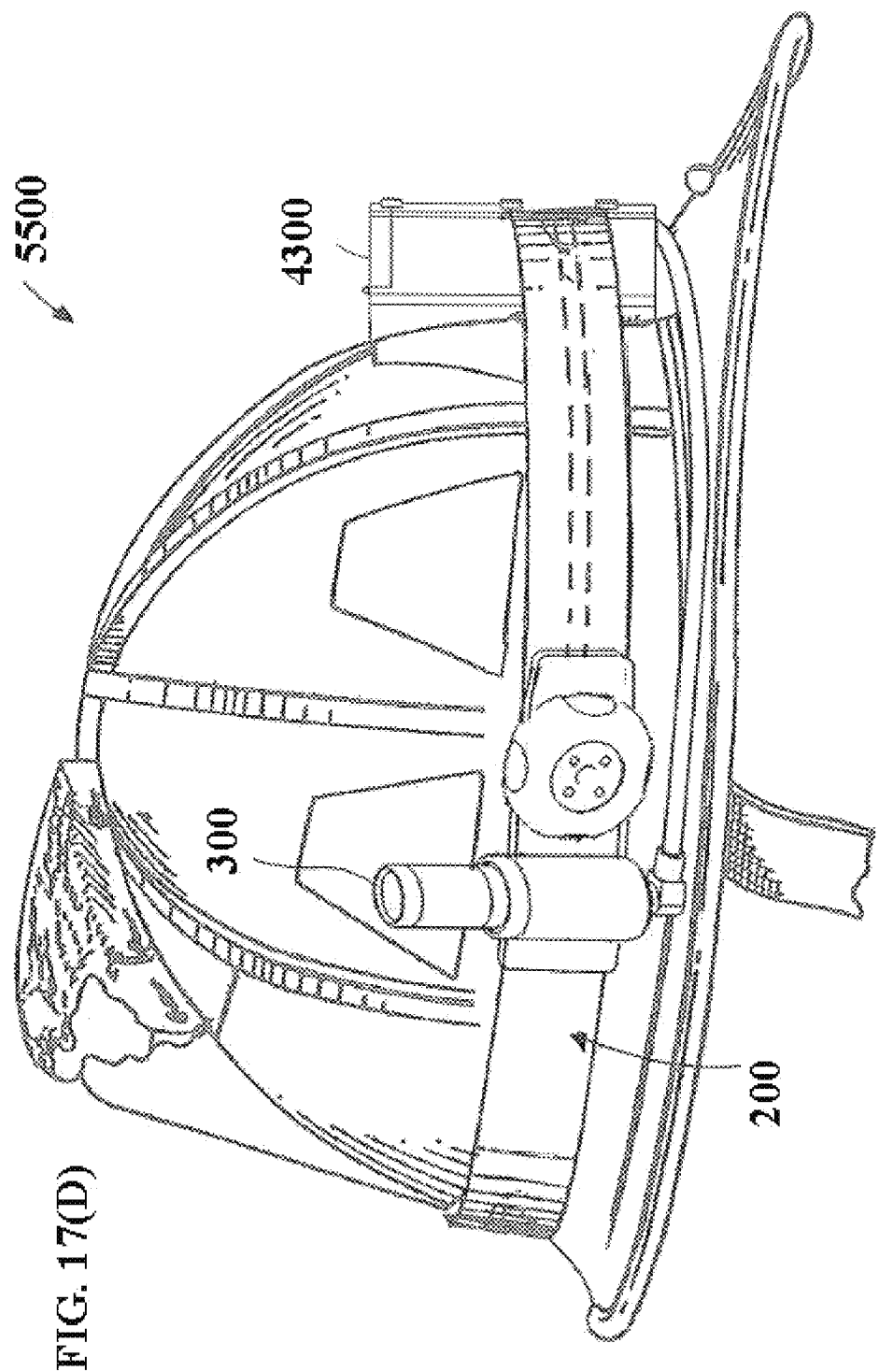

As can be seen, ergonomically, power button 4350 of housing 4300 is angulated so that it is easy for a user to reach when wearing the helmet 5500. FIG. 17(C) illustrates a side view of a helmet 5500 with work light 2500 positioned on the side of the helmet with its lens pointed toward the front of the helmet and the power supply housing disposed proximate the back of the helmet. FIG. 17(D) illustrates a side view of the helmet as configured in FIG. 17(A) illustrating the laser beacon and housing.

As will be appreciated, the modular system provided herein may further include a charger for battery 3500, 4500. Suitable chargers are known in the art. The modular design provided herein permits ready replacement of a portion of the system that is not functioning, thus eliminating the need to replace or repair the entire system.

The disclosure also provides a method of providing improved conspicuity in an environment rendered opaque by smoke and/or darkness. For purposes of illustration and not limitation, the method includes providing an illuminative device (such as lamp 200) to an object to be given conspicuity, and causing the illuminative device to emit light having a wavelength equal to or shorter than about 550 nm. More preferably, the illuminative device emits light having a wavelength equal to or shorter than about 510 nm. If desired, the light emitted by the illuminative device may have a wavelength equal to or shorter than about 475 nm. By way of further example, the light emitted by the illuminative device may have a wavelength equal to or shorter than about 445 nm or 400 nm. As the wavelength of the emitted light progresses below 500 nm, the devices may be more useful in applications where it is desired to view an object from a long distance away. If desired, the illuminative device may include a laser beacon (e.g., 300), a lamp having an electroluminescent element (e.g., 200) and/or an LED lamp (e.g., 400), among others.

In accordance with still another aspect, the disclosure provides a lighting device including a light source having a spectral energy distribution that is specifically adapted and configured to substantially overlap the spectral sensitivity of the human eye in one or more viewing conditions. For purposes of illustration and not limitation, any suitable light source can be used, including passive or active. Suitable active light sources may include a laser beacon (e.g., 300), a lamp having an electroluminescent element (e.g., 200) and/or an LED lamp (e.g., 400), among others.

The sensitivity of the human eye in scotopic conditions was discussed above in Example I. However, in photopic conditions, the human eye is sensitive to different, longer wavelengths. As indicated in Table III above, in photopic conditions, the human eye is most sensitive to a wavelength of about 555 nm. Accordingly, lighting devices are provided herein that are tailored to the sensitivity of the human eye in photopic conditions and mesopic conditions as well as scotopic conditions.

The spectral energy distribution of the light source may be specifically adapted and configured to substantially overlap the spectral sensitivity of the human eye in photopic, mesopic and/or scotopic conditions. The overlap of the spectral distribution of the light source and the sensitivity of the human eye can be less than or equal to about 100%, about 95%, about 90%, about 85%, and so on in any suitable increments (e.g., of 1% or 5% for example) until the overlap ceases to have a performance advantage by virtue of the overlap. For example, there may only be a 20% overlap, but the 20% overlap may lie in a region of particular sensitivity of the human eye. For example, in darkness conditions, the human eye is most sensitive to light having a wavelength of about 507 nm. As such, a light having even a small portion of its spectral distribution (e.g., about 10%) at or near 507 nm may demonstrate significant visibility.

As mentioned above, the lighting device may include an active lighting device and/or a passive lighting device. By way of further example, if the lighting device is active, it may be selected from the group including (i) a running light for a car, (ii) an illuminated sign, (iii) an illuminated warning signal (iii) an interior building light, (iv) a street light, (v) a reading light, (vi) a flashlight (vii) a light emitting diode and (viii) electroluminescent material, among others. If the lighting device is passive, the device may include photoluminescent material and/or retroreflective material. If it is passive, the lighting device may selected from the group including (i) a surface of a motor vehicle, (ii) a road sign, (iii) a fence (iii) an interior surface of a building and (iv) paint, among others.

Figure 35A:
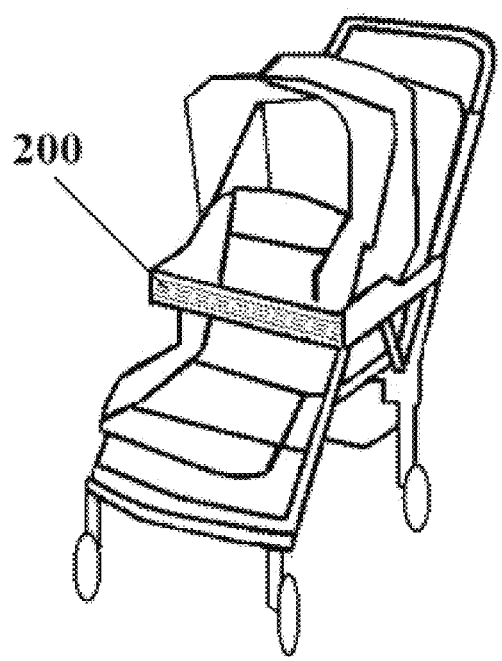
FIGS. 35(A)-35(B) illustrate an embodiment of the disclosure including an infant stroller.
Figure 35B:
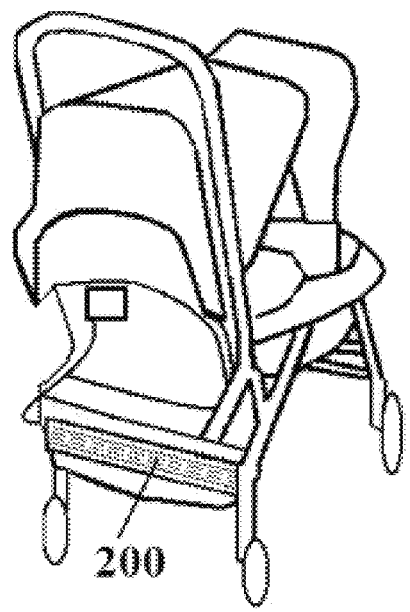

It will be appreciated that device 200 may be applied to a variety of objects, such as bicycles, baby strollers (e.g., FIGS. 35(A)-35(B)), carts, slow moving vehicles and the like. Such devices, for example, may be removably attached to objects in various applications (e.g., by hook and loop fasteners or other fasteners, magnets and the like) or may be permanently integrated, as appropriate, in their respective application.

Figure 18:
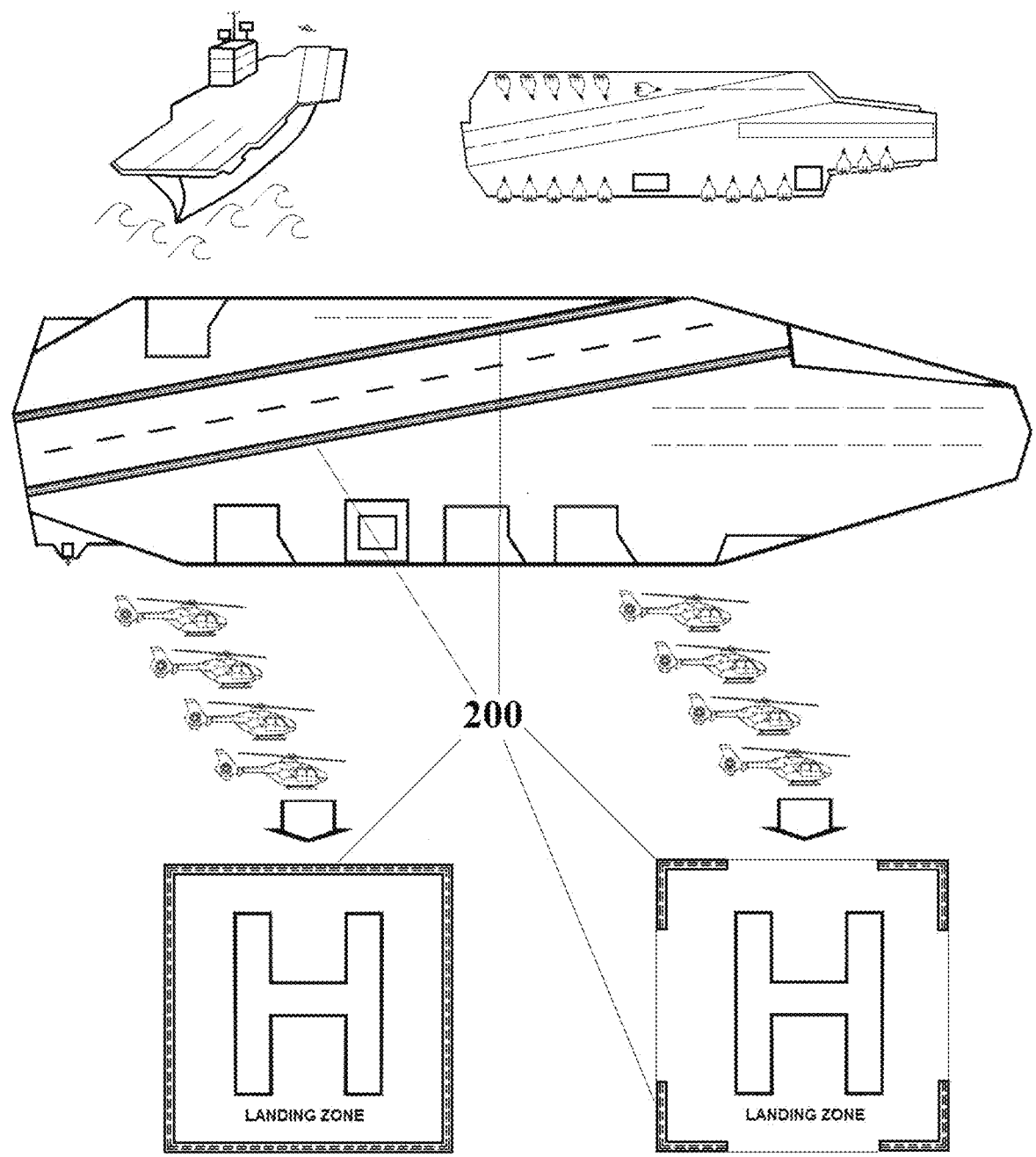
FIGS. 18-20 illustrate embodiments of the disclosure used in accordance with assistance of takeoff and landing of aircraft and other aspects.
Figure 19:
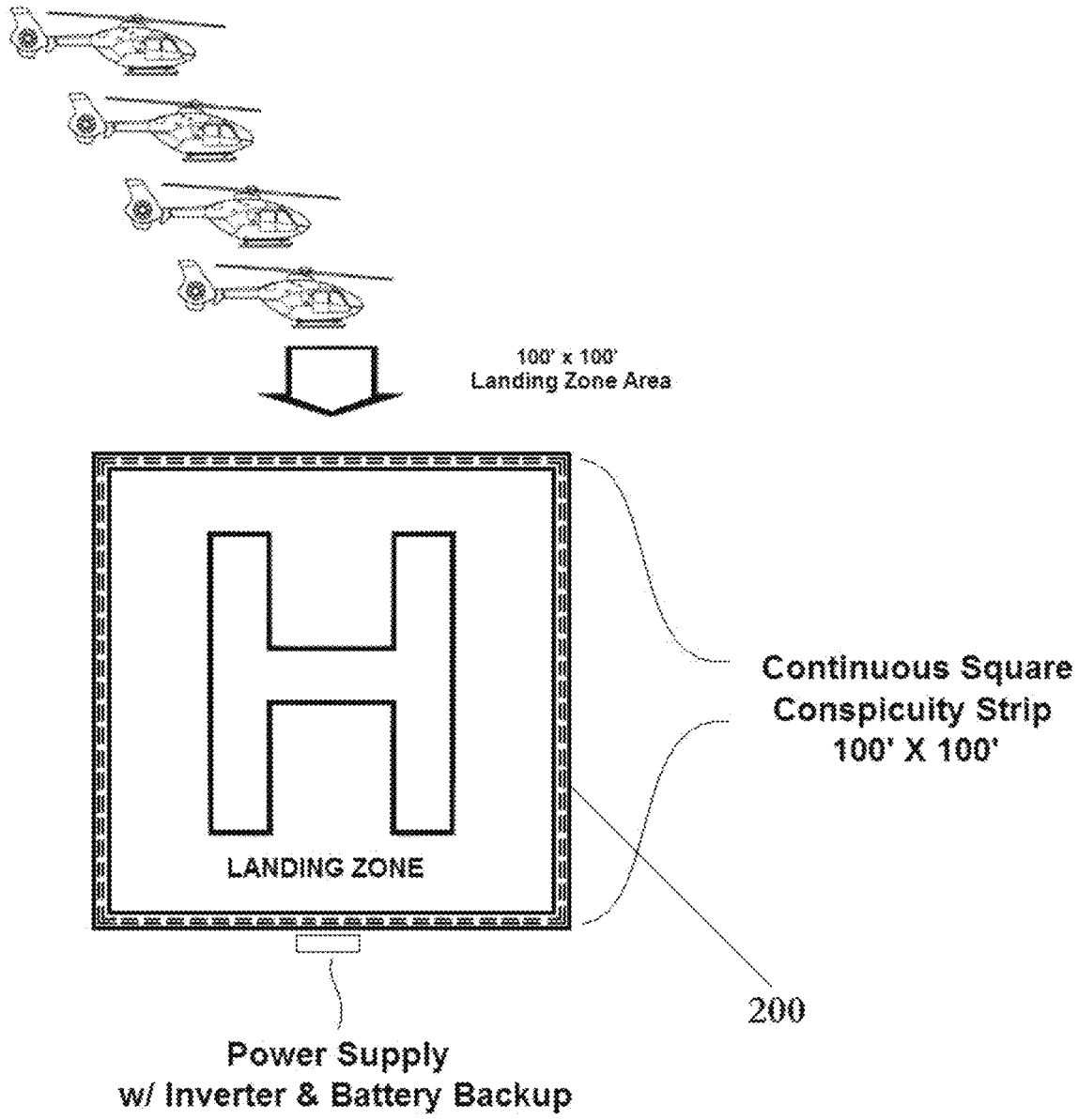
Figure 20:
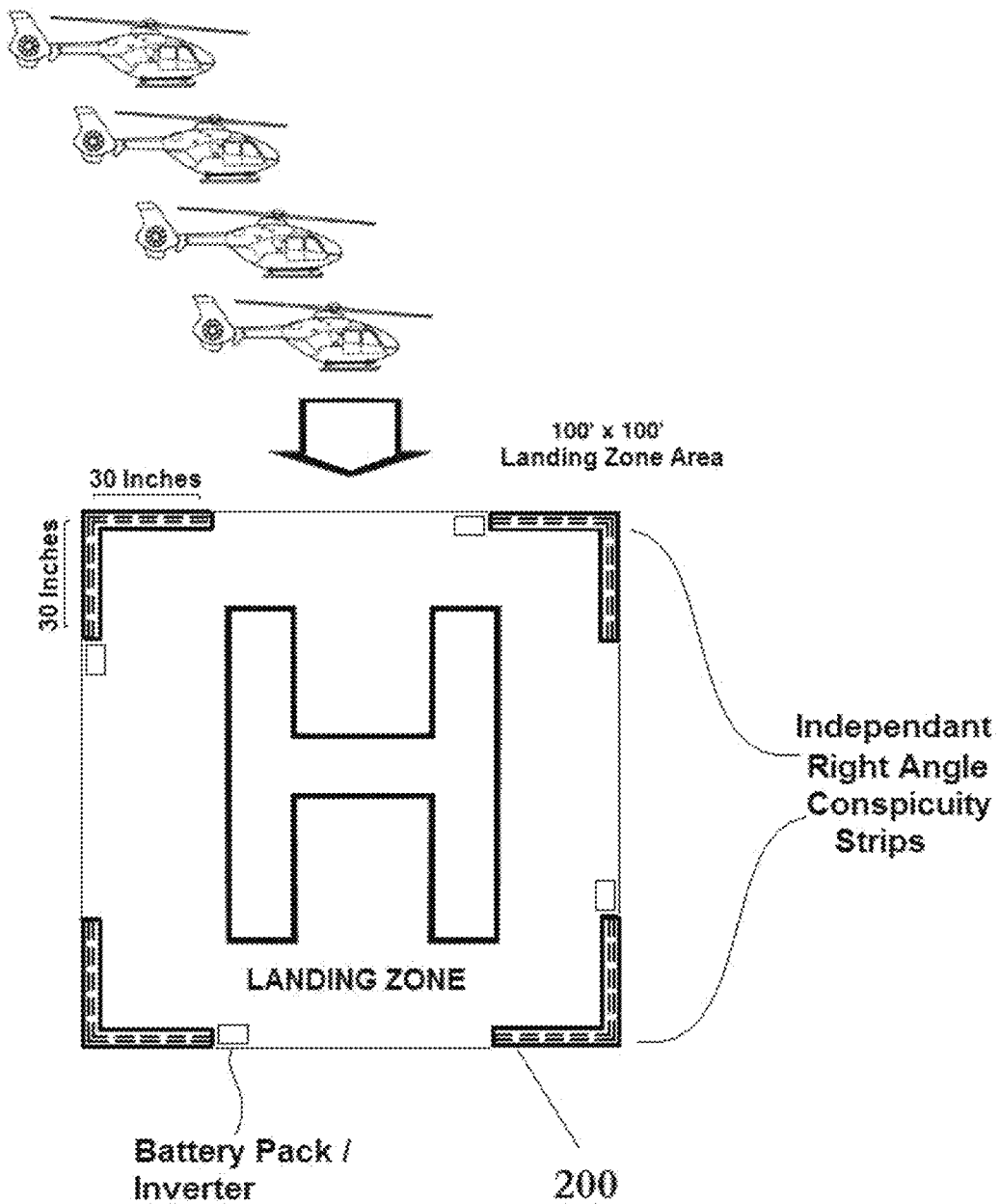
Figure 21:
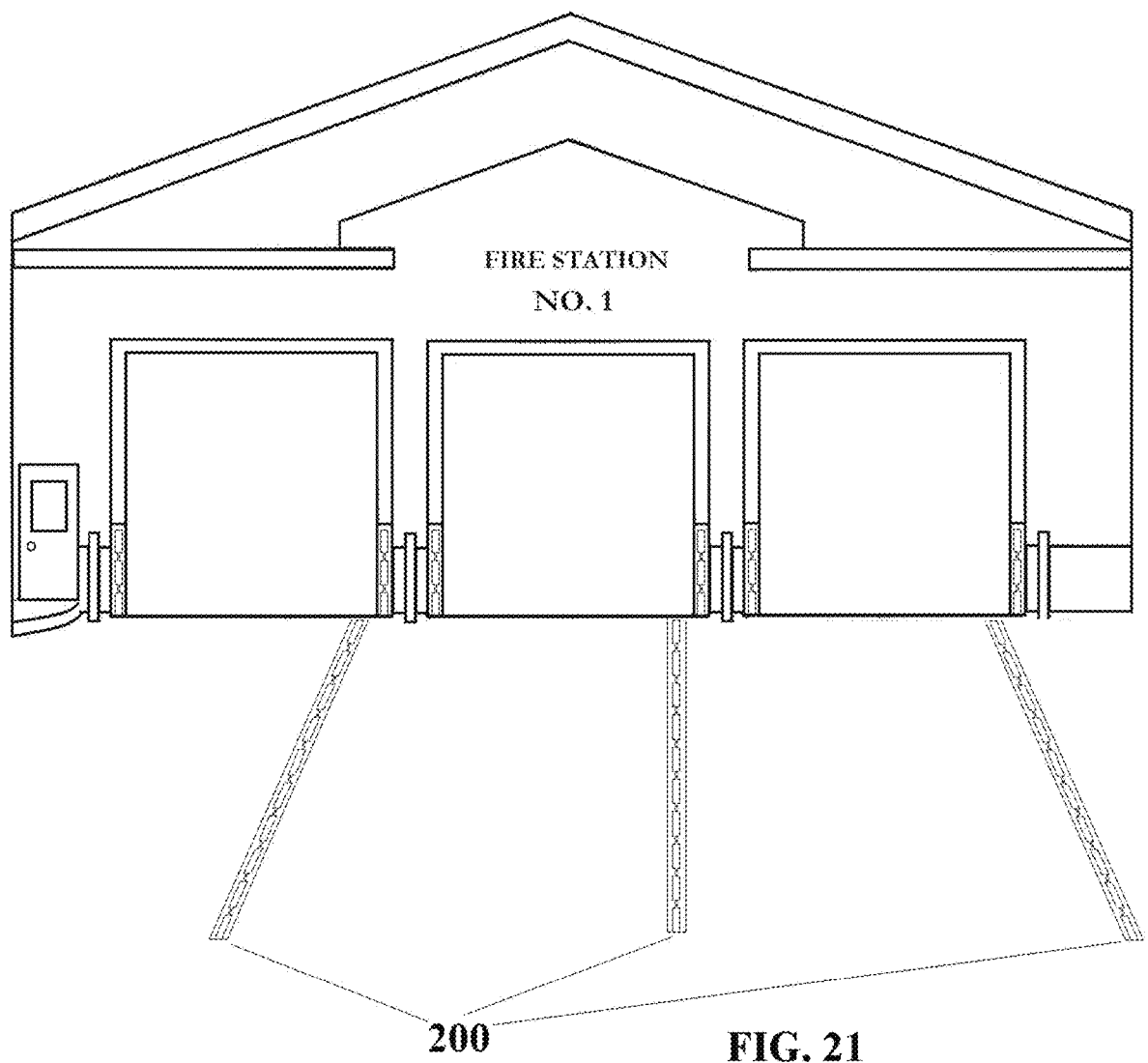
FIGS. 21-24 illustrate embodiments of the disclosure used in accordance with traffic applications.
Figure 22:
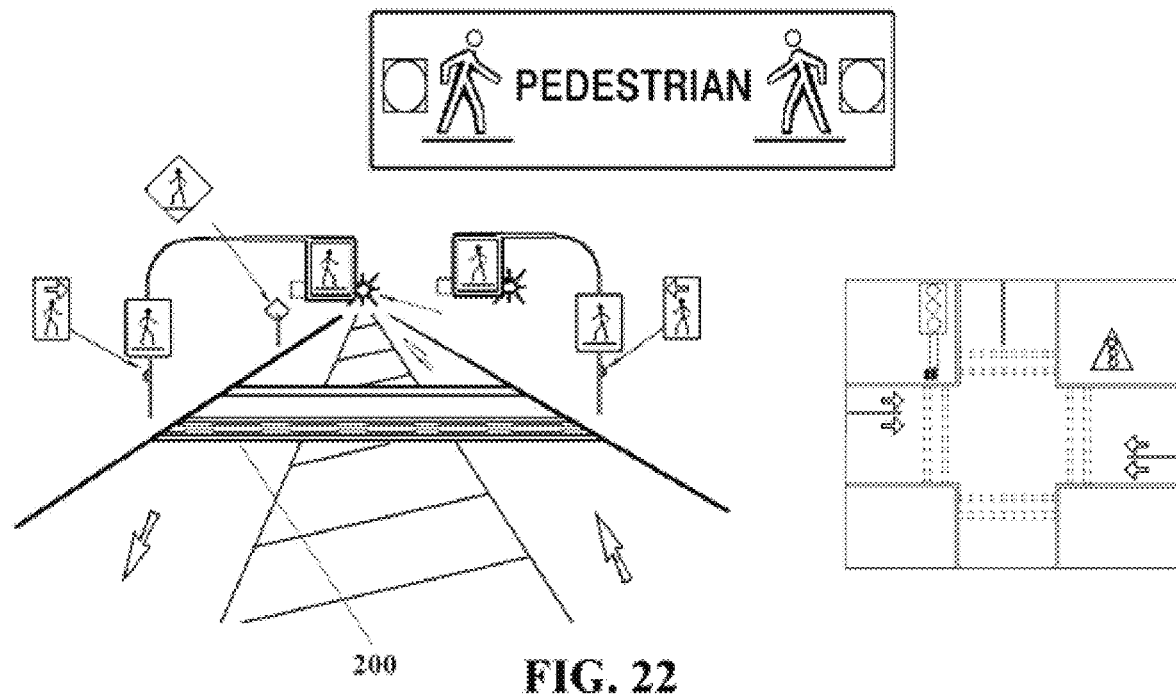
Figure 23:
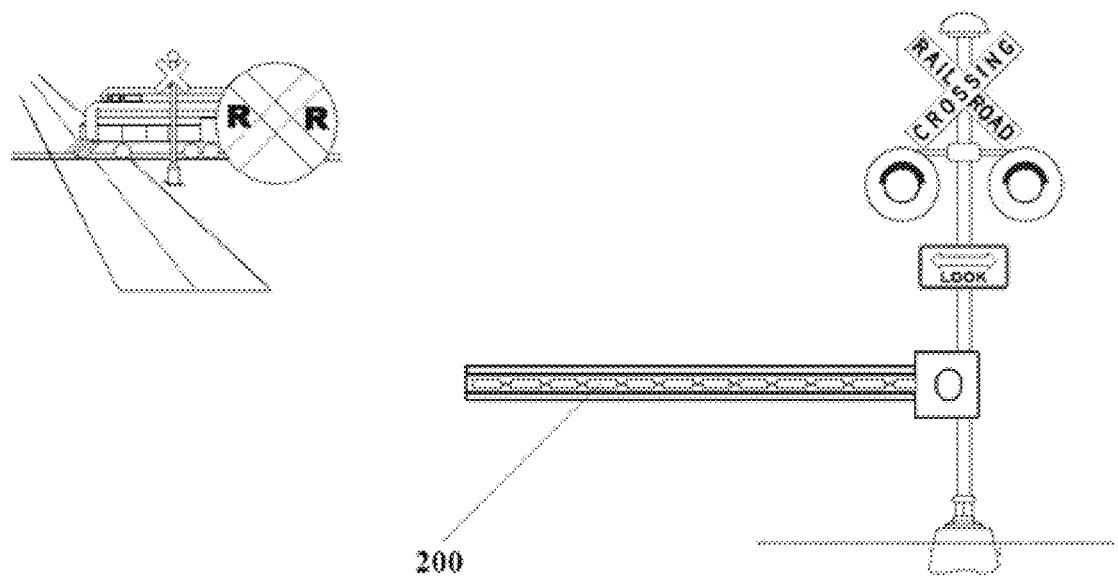
Figure 24:
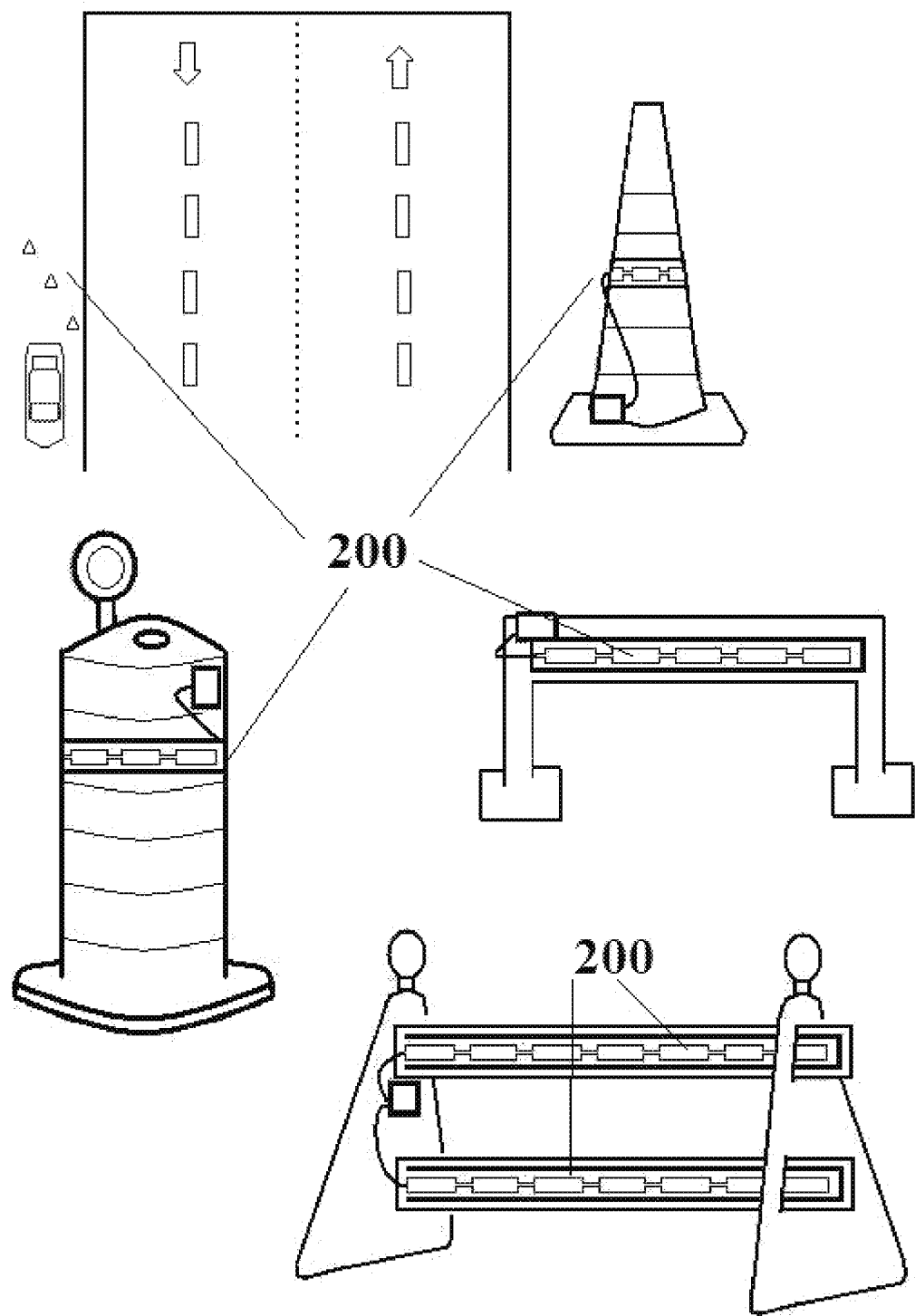
Figure 25:
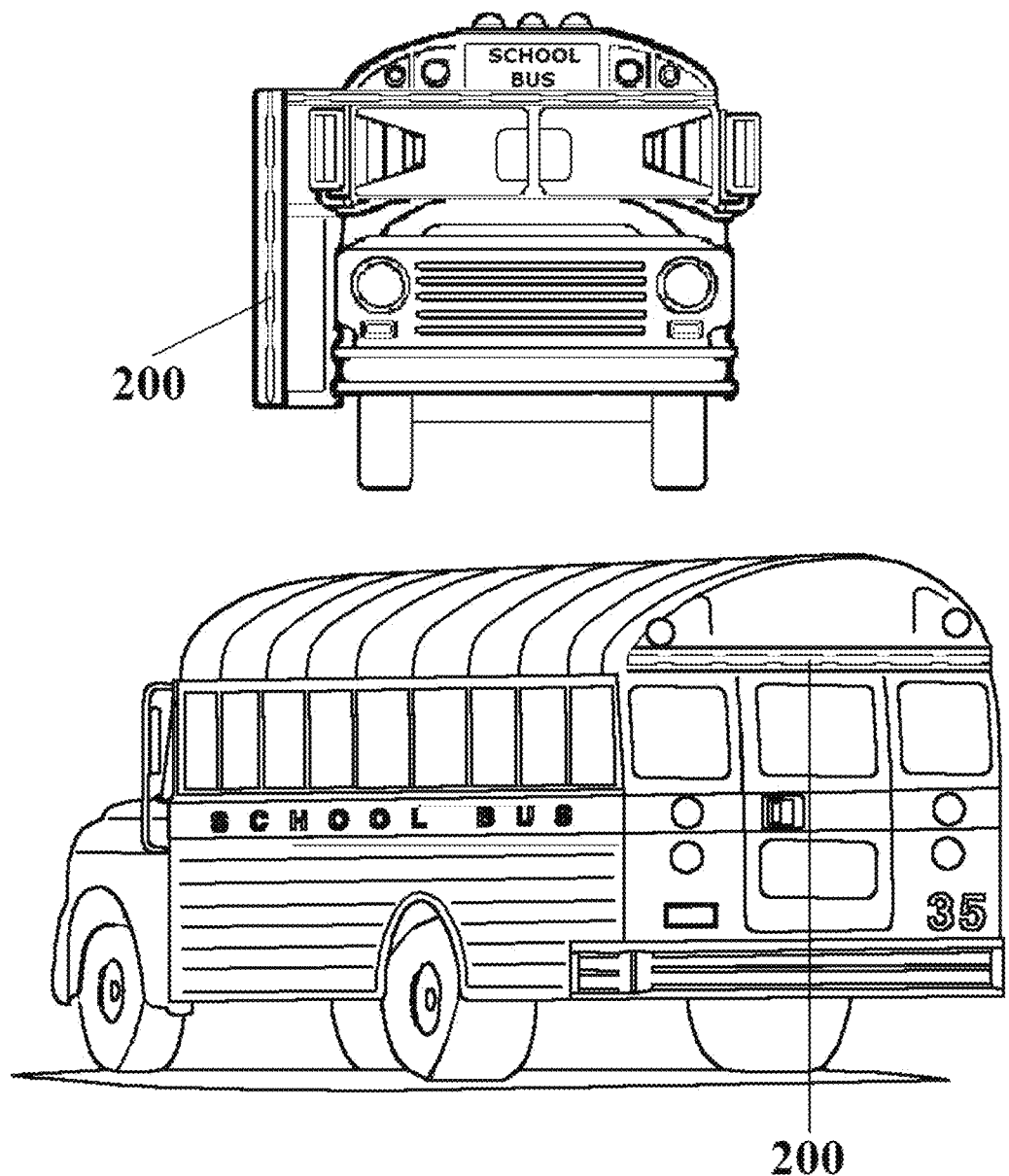
FIGS. 25-27 illustrate embodiments of the disclosure used in accordance with various vehicles.
Figure 26A:
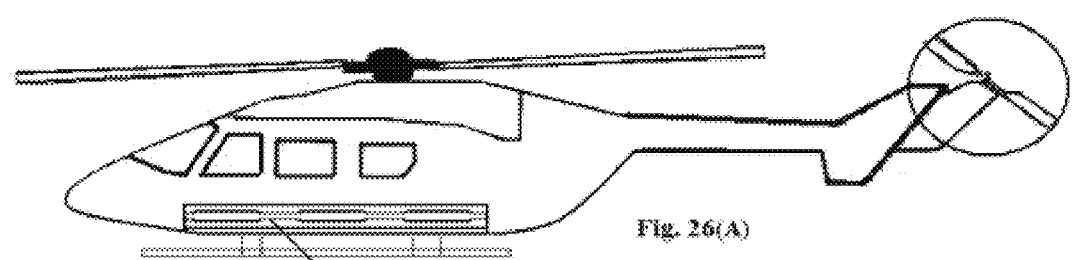
Figure 26B:
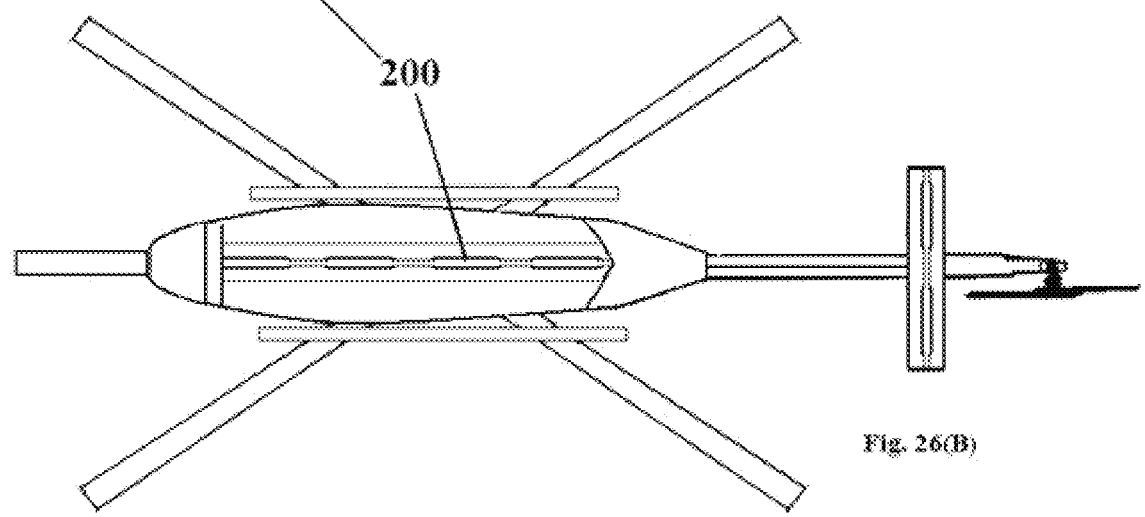
Figure 26C:
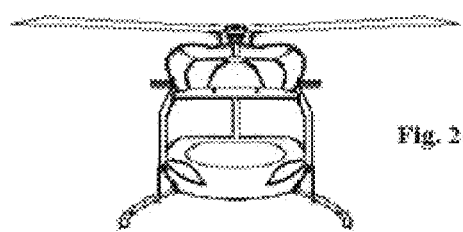
Figure 27:
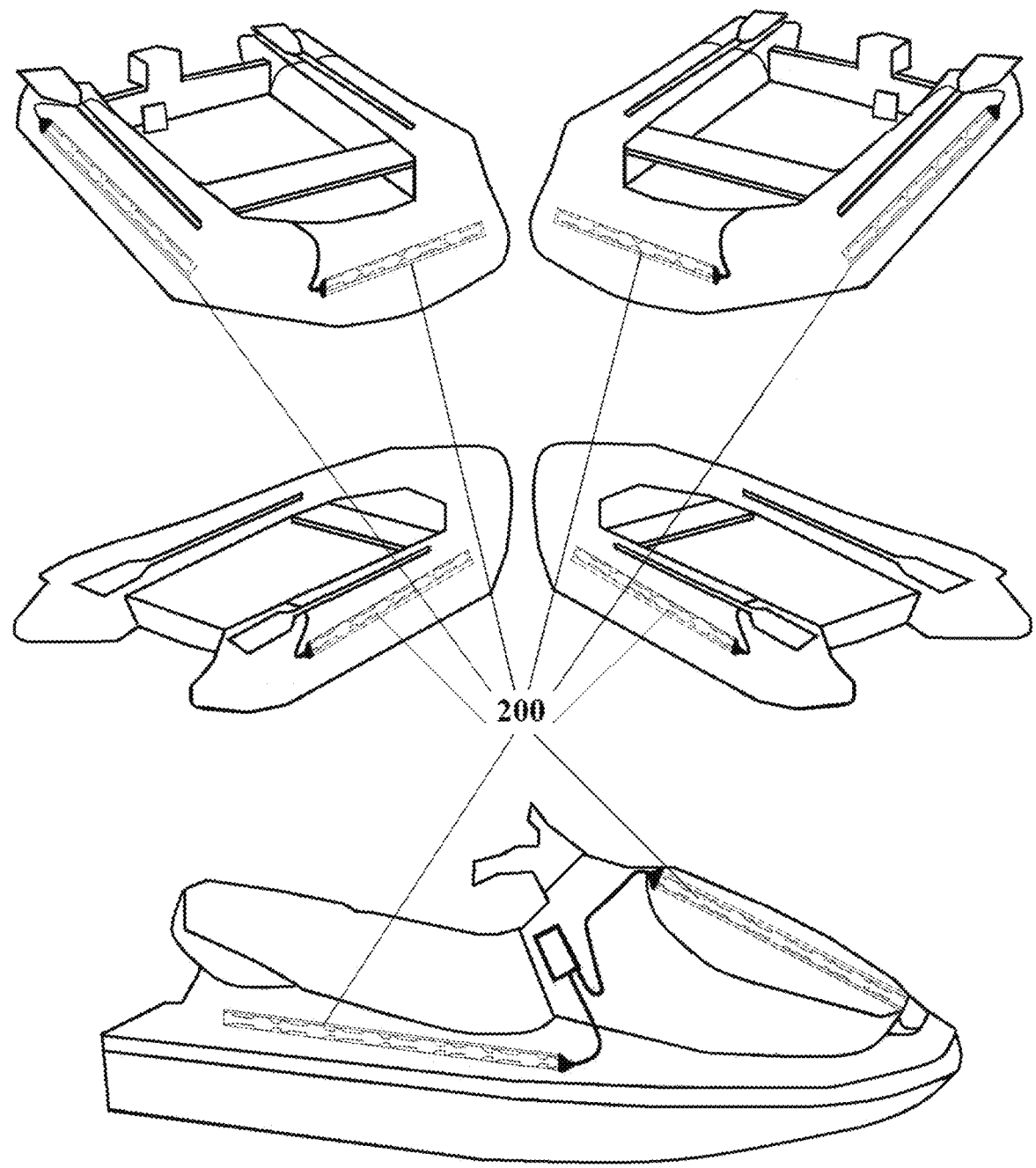
Figure 28A:
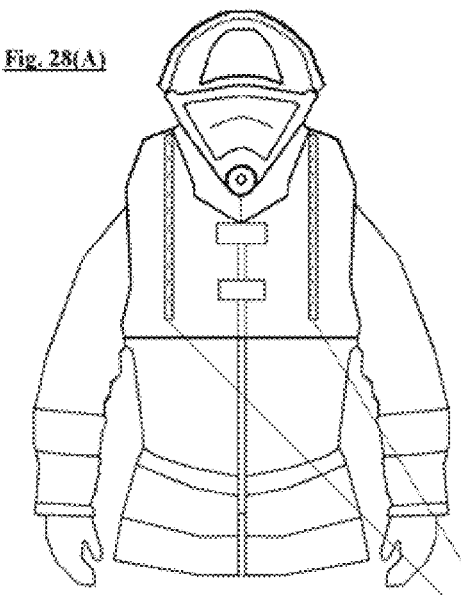
FIGS. 28(A)-32 illustrate embodiments of the disclosure used in accordance with varying personal safety equipment.
Figure 28B:
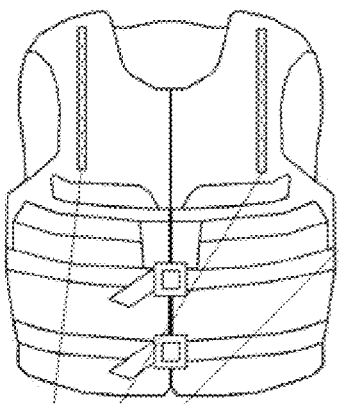
Figure 28C:
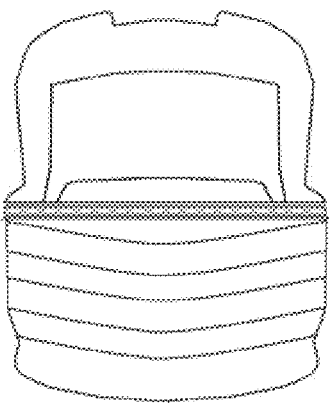
Figure 28D:
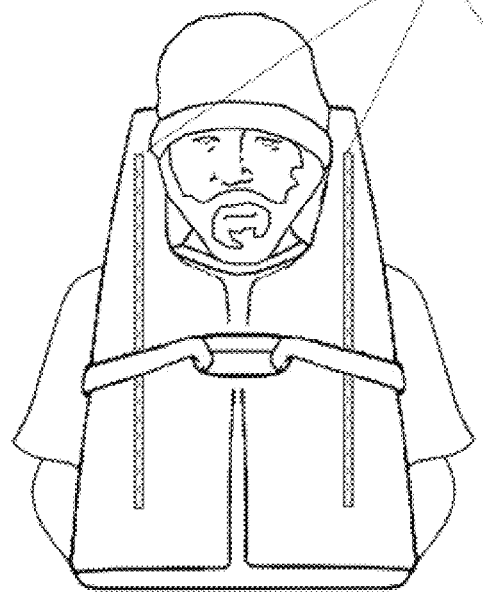
Figure 28E:
Figure 29A:
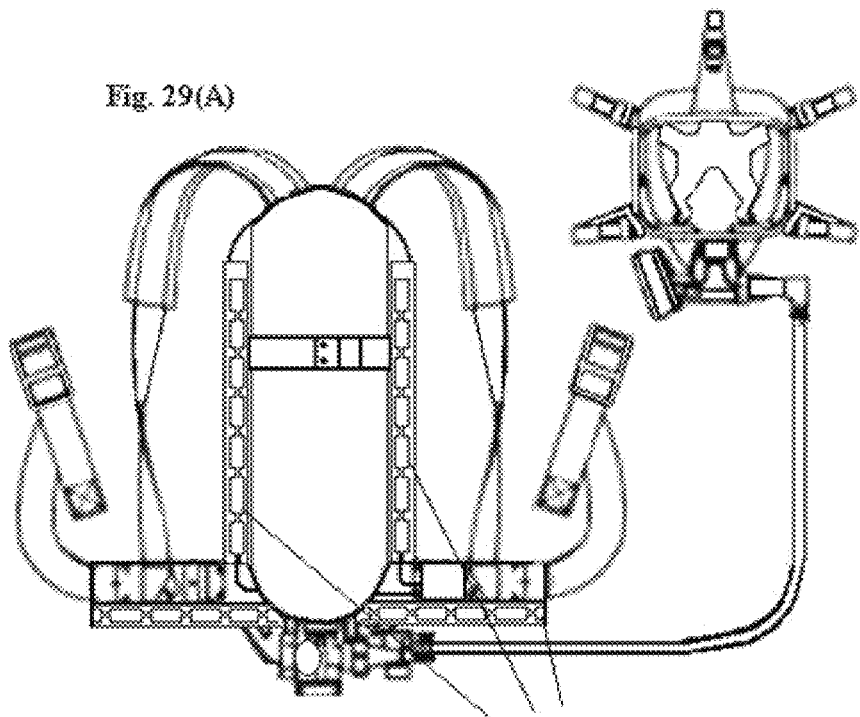
Figure 29B:
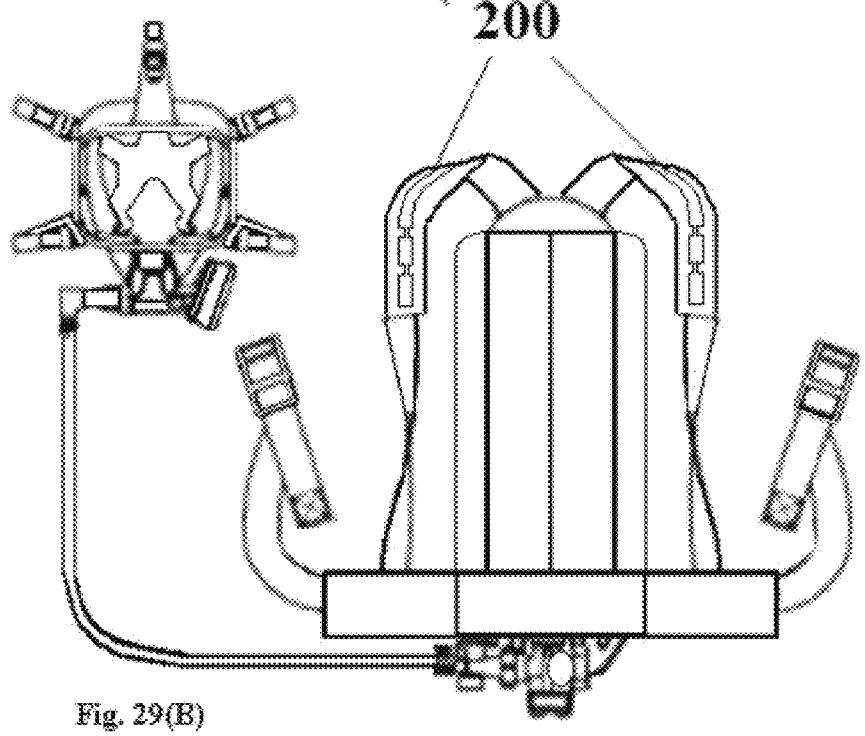

For purposes of illustration, and not limitation, as embodied herein, FIGS. 18-35(B) depict exemplary devices 200 as described herein in various applications. FIGS. 18-19 depict device 200 for use as a permanent helipad and a guide for use in a landing strip, such as on an aircraft carrier. FIG. 20 depicts use of device 200 in association with a transportable helipad that can be held in place temporarily by various means (e.g., stakes). FIG. 21 depicts use of device 200 as a backup guide to maintain alignment between a vehicle and a structure such as a firehouse or other structure, such as a garage or loading dock. FIG. 22 depicts use of device 200 in association with a pedestrian crosswalk. FIG. 23 depicts use of device 200 in association with a railroad crossing. FIG. 24 depicts use of device 200 in association with various traffic control devices, such as traffic lanes, pylons and various barriers to enhance their conspicuity. FIG. 25 depicts use of device 200 in association with a school bus or other vehicle where enhanced conspicuity is particularly advantageous. FIGS. 26(A)-26(C) depict use of device 200 in association with a helicopter. FIG. 27 depicts use of device 200 in association with various marine applications (e.g., personal watercraft, boats, surf boards and life boats) to enhance conspicuity, which is especially useful in darkness conditions in case rescue is needed. FIGS. 28(A)-28(F) depict use of device 200 in association with life jackets, such as those for firefighters and dock workers. FIGS. 29(A)-29(B) depict use of device 200 in association with a self contained breathing apparatus (SCBA).

For purposes of illustration, and not limitation, FIGS. 45(A)-45(H) present exemplary embodiments of air tanks 4510 (such as for SCBA, SCUBA underwater diving, and the like including electroluminescent and/or LED indicia 4500 thereon as embodied herein in varying patterns. Indicia can be shapes, arrows and/or names in order to identify the wearer of the tank, and/or to determine the tank's (and hence the wearer's) orientation. The indicia 4500 can be encased in materials as described herein and attached to the tank. In some embodiments, indicia 4500 is attached via a clear overwrap, sucha as an epoxy overwrap. In some embodiments, the tank can be a full wrapped composite cylinder that is manufactured with a lightweight aluminum liner and wrapped with layers of fiber (e.g., of aramid fibers such as KEVLAR® material, carbon fiber, fiberglass and combinations thereof) in an epoxy resin matrix. Where a EL element is used, the element can be wrapped around part or all of the circumference of the fiber wrapped cylinder, and then encased, for example, in a translucent or transparent epoxy wrap layer 4520. LED lighting elements can be similarly incorporated under the epoxy layer or other transparent or translucent layer. The pattern of LED's and/or the EL element can have a pattern with relatively bright and dim segments as described herein, and/or may be provided, for example, by arranging the illuminated portion in a decorative design on the tank. The design can include identifying information (e.g., name, number or other symbols, such as silhouette of an article or animal such as a fish, scorpion or the like, and the like).

Figure 30:
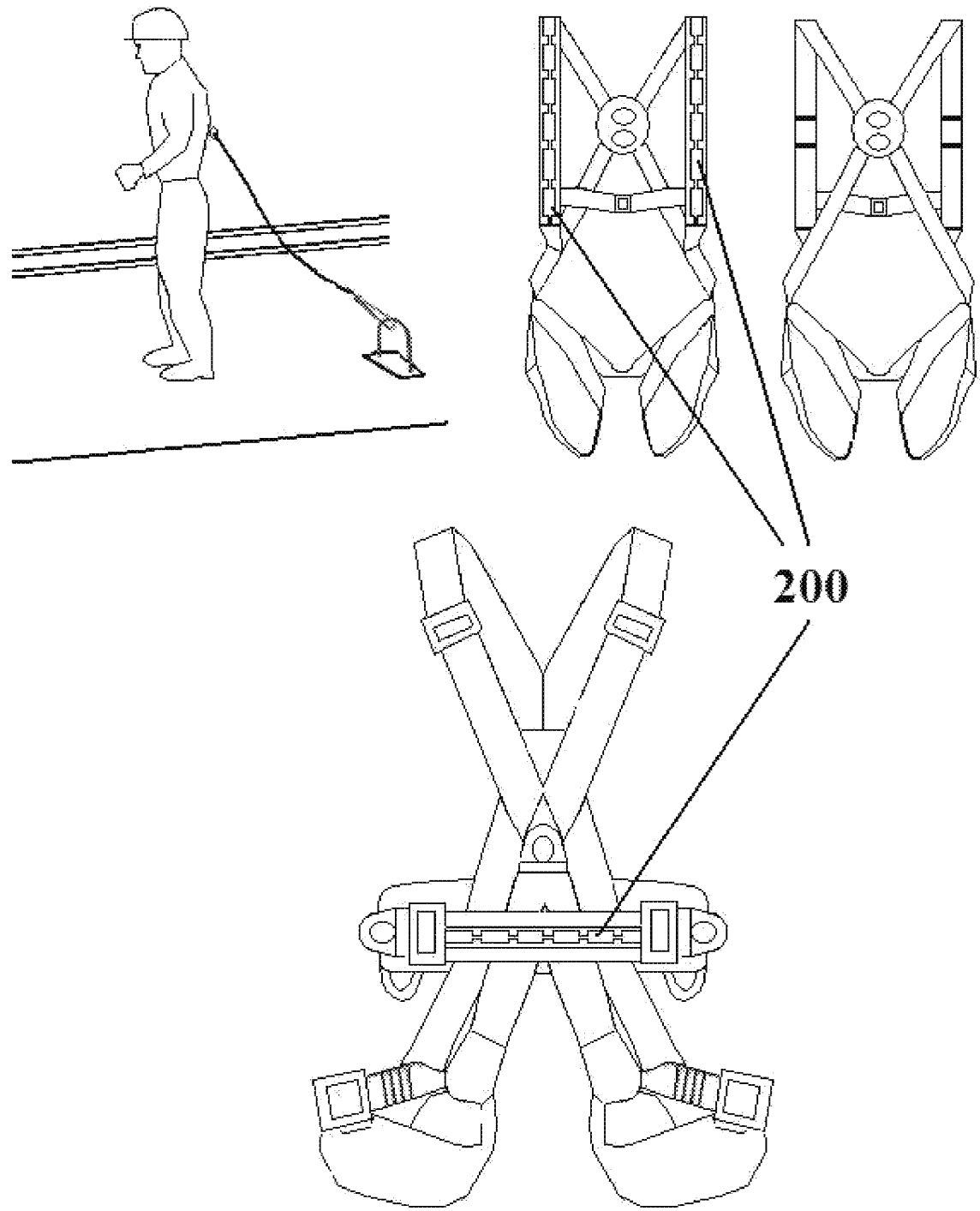
Figure 31:
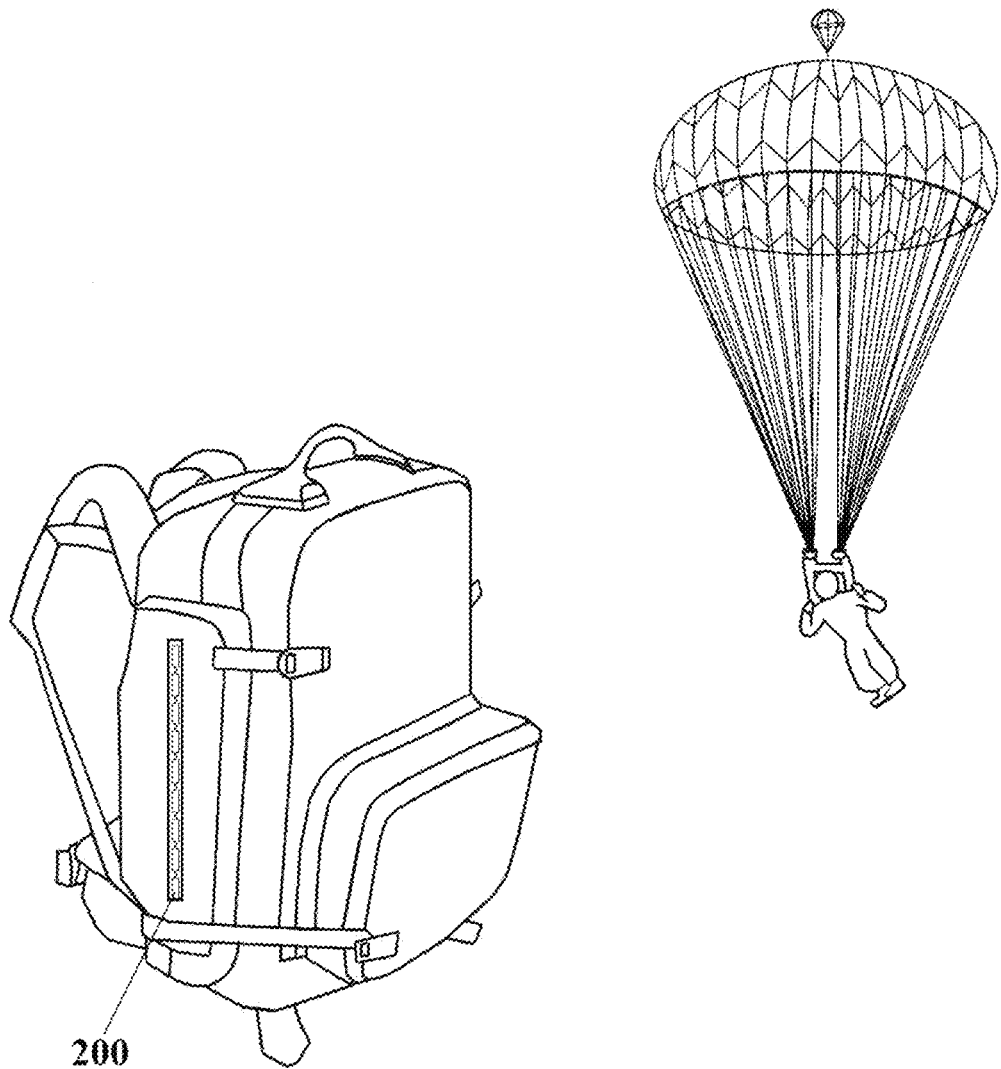
Figure 32:
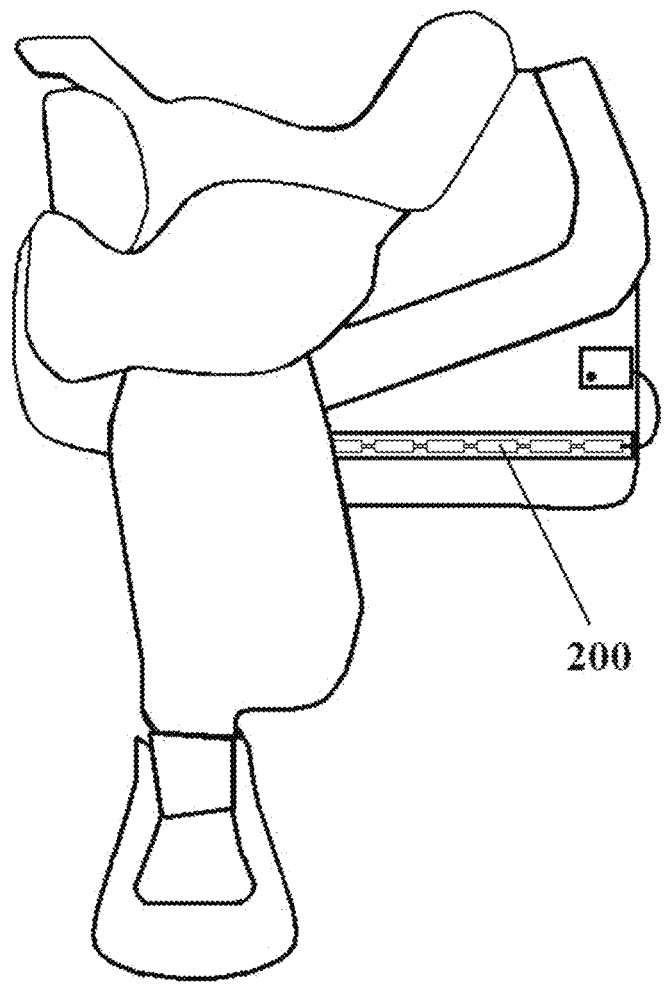
Figures 33A, 33B:
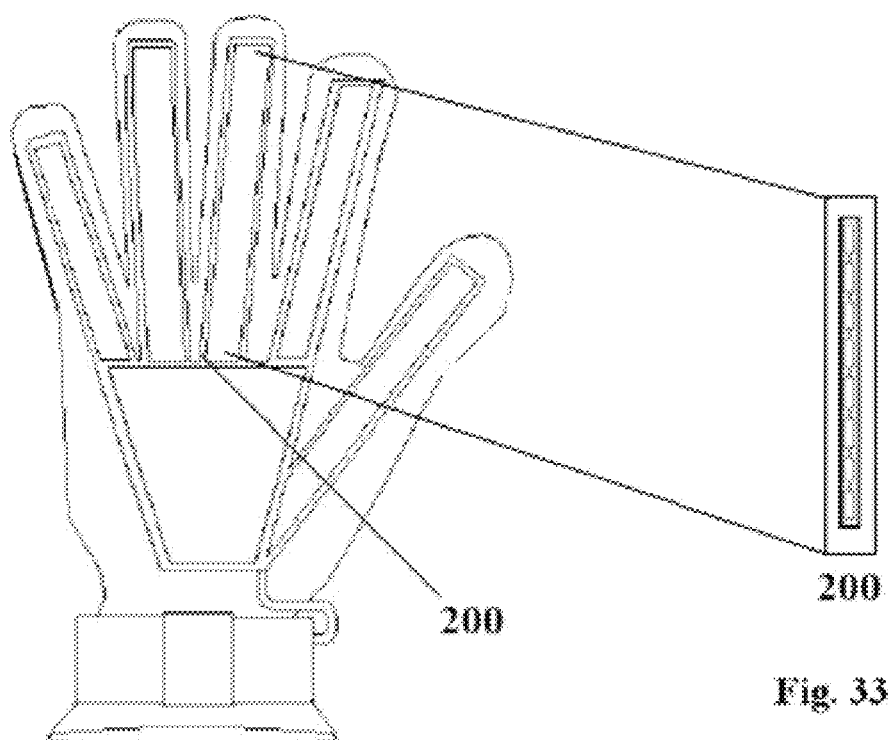
FIGS. 33(A)-33(B) illustrate an embodiment of the disclosure used for directing traffic.
Figure 34A:
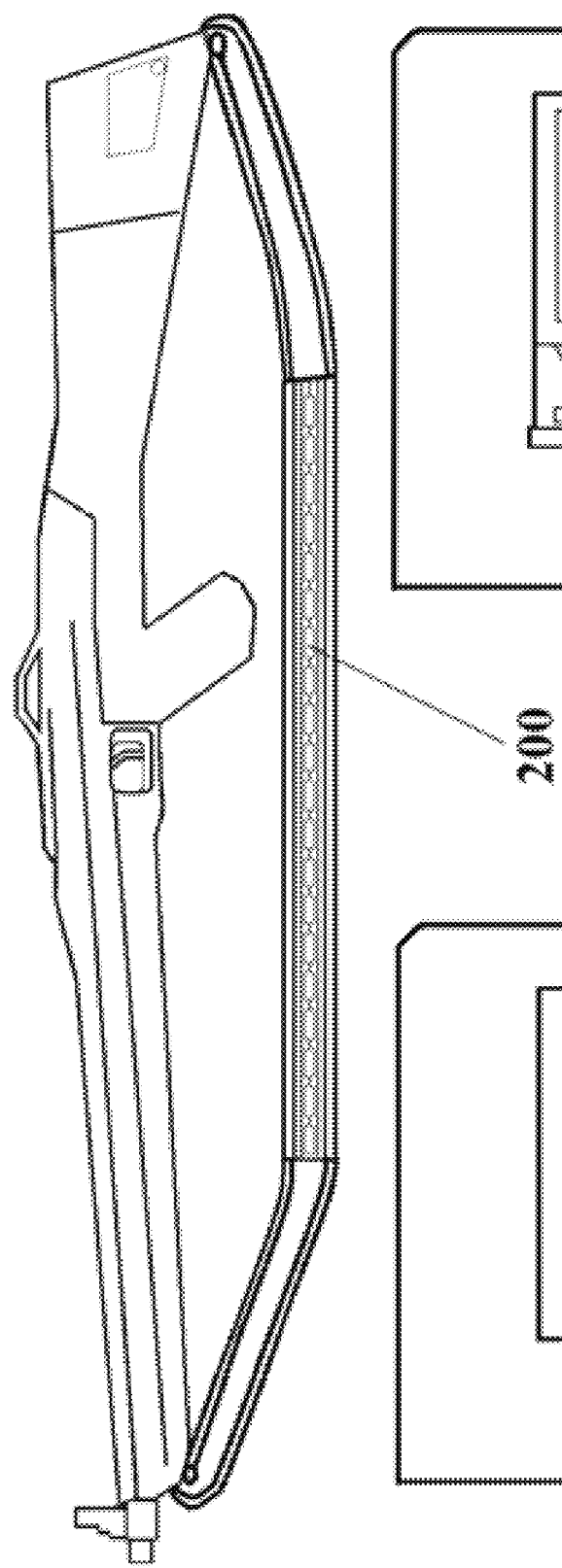
FIGS. 34(A)-34(C) illustrate an embodiment of the disclosure including a firearm.
Figure 34C:
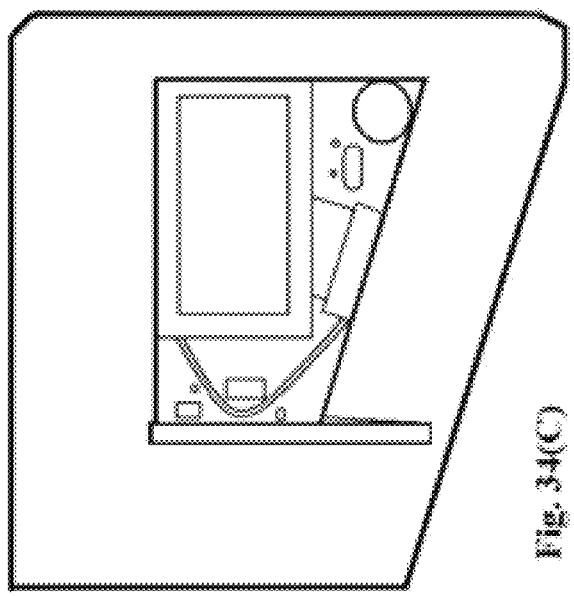
Figure 34D:
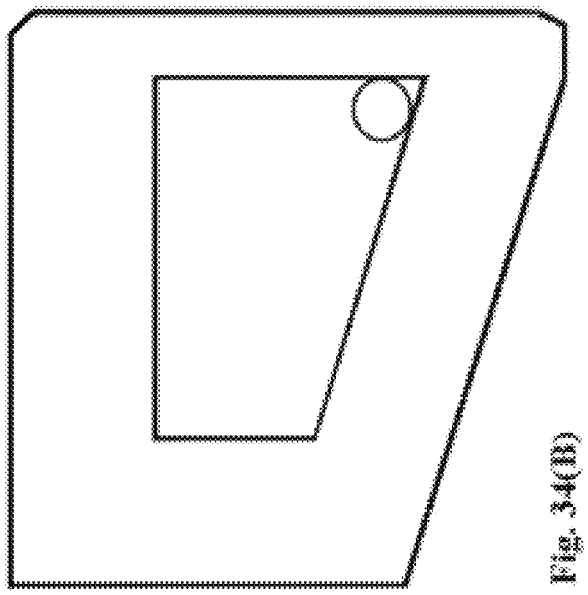

FIG. 30 depicts use of device 200 in association with an industrial harness, such as those worn by construction workers. FIG. 31 depicts use of device 200 in association with a parachute. FIG. 32 depicts use of device 200 in association with a police equestrian application. FIGS. 33(A)-33(B) depict use of device 200 in association with a glove, such as that used by a traffic officer or crossing guard. FIGS. 34(A)-34(C) depict use of device 200 in association with a rifle band to enhance conspicuity of hunters to other hunters. FIGS. 35(A)-35(B) depicts use of device 200 in association with a baby stroller. As will be appreciated, while device 200 is depicted on the front and back of the stroller, it may additionally or alternatively be located on the sides and/or top. The examples of use of device 200 presented herein are intended to merely be illustrative, and not exhaustive.

In accordance with a further embodiment, if desired, the elongate lighting device can include a plurality of spaced LED elements disposed inside of a polymeric tubular member.

For purposes of illustration, and not limitation, FIGS. 36(A)-44(B) depict additional embodiments having an elongate lighting device based on LED technology. FIGS. 36(A) and 36(C) illustrate a front view of a first embodiment, while FIG. 36(B) illustrates the back view. As with the embodiment of FIGS. 1(A)-1(B), the device is elongate and flexible and includes an elastic webbing portion 6000 and non-elastic webbing portion 6010. A loop portion 6020 of a hook and loop fastener is provided, in addition to a hook portion 6030. It will be appreciated that the hook and loop pile locations can be reversed. Suitable hook and loop fasteners are preferably flame retardant polyurethane obtained from YKK USA Inc., Rutherford, NJ 07070-2580, Tel: (201) 935-4200, FASCO FA FR-AR 1" Hook & Loop (9 MTh/0.23 MM Hook Size).

The length of the illustrated device can be extended by looping the end of the device having patch 6030 through a buckle of an extension strap (not shown), and back onto the back side of the device onto fastener 6020. The buckle is preferably attached to a rubber strap that can be affixed at a second end to a buckle at the end of the device opposite the end having patch 6030. The rubber strap connecting the two buckles can then be adjusted to a desired length. The rubber strap is preferably made with Ethylene Propylene Diene Monomer ("EPDM") obtainable from Alliance Rubber Co., Hot Springs, AR 71901, (501) 262-2700. The buckles are preferably high heat nylon buckles as described herein. Any webbing, elastic, or other reflective or retroreflective materials can be used in this embodiment as described elsewhere in this application with respect to other conspicuity devices. Military specification Cordura® binding can be used, such as MILPRF5038 Type-III Black 1" 62331 from Texcel, Inc., Rhode Island 02864 Tel: (401) 727-2113.

As further illustrated in FIGS. 36(A)-36(C), a battery pack housing 6040 is provided that, as illustrated, is attached to webbing 6010 via assembly screws 6050. Battery pack housing 6040 includes a push button actuator 6060 and a flip door hinge 6070, as well as a set screw 6080 that holds the flip door in a desired position. An LED strip 6090 including a string of connected LEDs is located within a luminary, or tubular encasement or member 6100. A layer of preferably fluorescent yellow, green or blue reflective photoluminescent material 6120 is also provided. The tubular member 6100 is preferably translucent or transparent, and conducts light along its length and through its side wall so as to define areas of brightness proximate the LEDs, and dimmer areas between the LEDs, as would be visible to an observer of the band in operation, thus resulting in an elongate lighting device having a plurality of spaced relatively bright emitting segments separated by relatively dimmer emitting segments. If desired, the polymeric tubular member 6100 can be tinted so that a preselected spectral distribution of light generated by the LEDs passes through the tubular member. The preselected spectral distribution preferably has a peak between 480 nm and 520 nm.

As illustrated in FIGS. 37(A)-37(E), the encasement for the LED strip, the tubular member 6100, is based on an extrusion 6200 that includes a tubular core portion 6230 with longitudinal wings 6220 along its length. This extrusion is designed to both house and protect a single sequence of LED's from heat, water, and impact. This extrusion can be molded with a hard or soft material, such as flexible PVC, hard PVC, high temperature polycarbonate plastic and high temperature silicone and silicone rubber. In one embodiment, a silicone material is used to make the extrusion from Harman Corporation, Part #5001 Silicone. If desired, a PVC material such as Part #A002 Plastisol Clear (PVC—Polyvinyl Chloride) from Harman Corporation.

In one embodiment, extrusion 6200 can be molded with embedded photoluminescent properties so that the whole extrusion when exposed to UV light will charge and then dissipate an after glow. In particular, LumiNova® pigment is a phosphorescent pigment that includes strontium oxide aluminate. This pigment can be added to silicone resin and PVC resin, among others, and included in the extrusion resulting in the particulate being captured in the resin. Such pigments are described, for example, in U.S. Pat. No. 5,424,006, which is incorporated by reference herein in its entirety and can be obtained from NEMOTO & CO., LTD., 1-15-1, Kamiogi, Suginami-ku, Tokyo 157-0043, Japan Tel: 03-3392-1781.

The characteristics of this extrusion are preferably that it be transparent or translucent so that illumination from an LED light source 6240 with emitting portions 6242 can be visible. Besides enabling illumination, the purpose of this Single LED Extrusion is to defuse light in a manner that allows a glowing effect throughout the material. Similar to a fiber optic cable, the optical properties of this extrusion permits it to act as a luminary. This effect allows the elongate lighting device to define a plurality of points that are relatively bright, emitting segments separated by relatively dimmer emitting segments. Center tube portion 6230 is preferably centered between the elongate wings 6220, but one wing may be wider than the other. Providing wing segments 6220 permits the extrusion 6200 to have cloth material attached (stitched) to it via stitches 6250 or to be used as a print area for information or images that need to be seen such as arrows or other indicia such as warnings. Preferably, T35 Black KEVLAR® thread is used, obtainable from Atlantic Thread & Supply Company, Inc., Baltimore, Maryland 21221-3140, Tel: (410) 687-9424. If desired, instead of LEDs, electroluminescent wire can be used, which can be obtained commercially from Elam El Industries, Ltd., of Jerusalem, Israel. It will be appreciated that use of EL wire will be accompanied by use of an inverter based power supply as described herein.

Figure 38A:
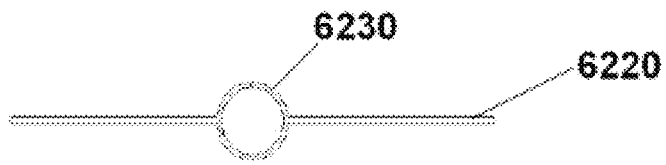
FIGS. 38(A)-38(D) illustrate further aspects of conspicuity devices made in accordance with the disclosure.
Figure 38B:
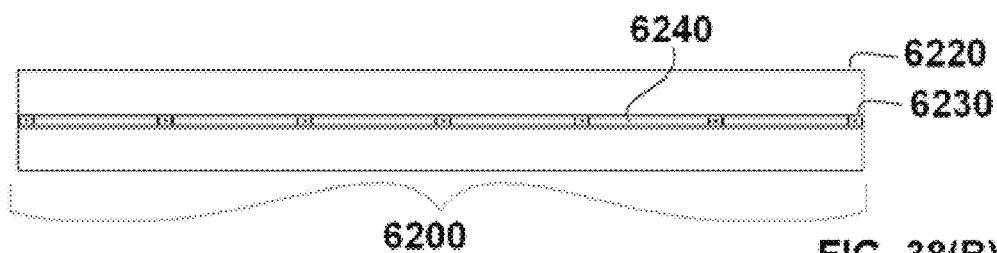
Figure 38C:
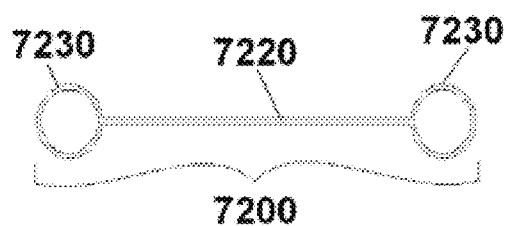
Figure 38D:
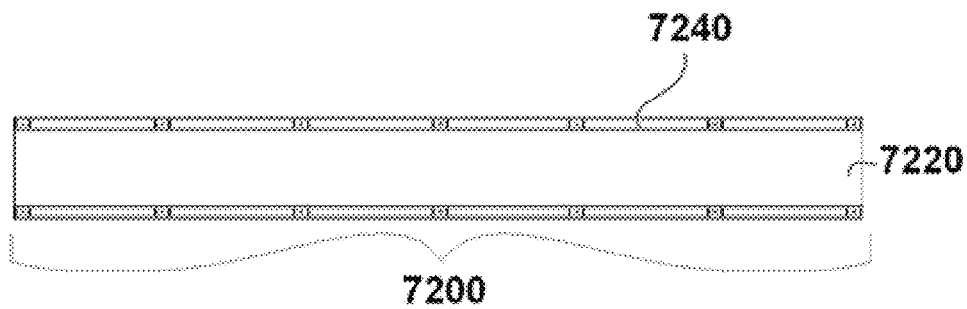

FIGS. 38(A)-(B) again illustrate the embodiment of FIG. 37, while FIGS. 38(C)-(D) illustrates an alternative embodiment of an extrusion 7200 that includes two parallel tubular LED enclosures 7230 separated by a planar connecting portion 7220. This embodiment is the same as the previous embodiment, but for the fact that the lighting strips are located along the edges of the device rather than down its center. It will be appreciated that any desired extrusion can be used, including ones with three or more parallel tubular portions connected by planar connecting portions. FIG. 39(A) illustrates the embodiment of FIG. 37 with arrow shaped indicia 6280 formed on the plastic extrusion, such as by screen printing, while FIG. 39(B) illustrates indicia such as arrows 7280 or textual indicia 7290 deposited on the extrusion 7200 of FIGS. 38(C)-(D).

Figure 40:
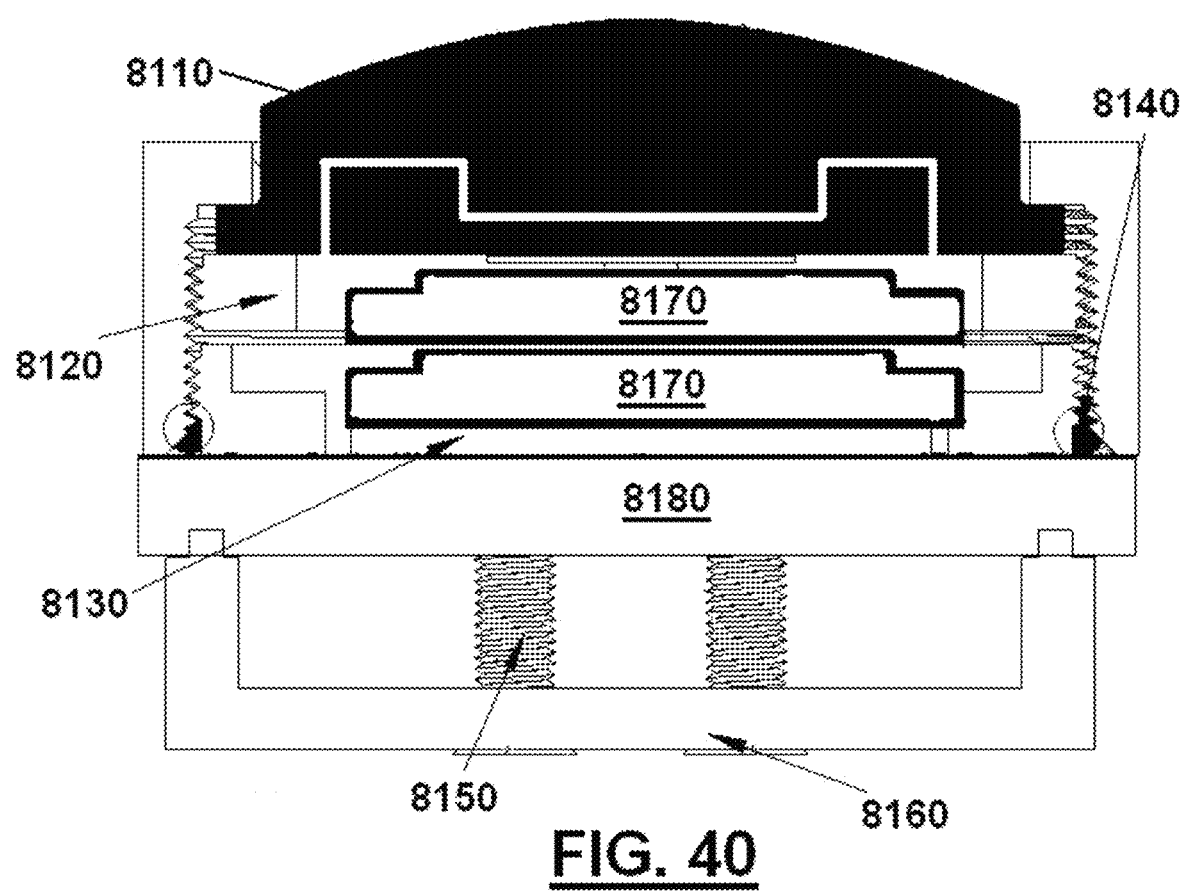
FIG. 40 illustrates further aspects of conspicuity devices made in accordance with the disclosure.

FIG. 40 illustrates a preferred battery encasement for the devices of FIGS. 36(A)-39 (B) that is waterproof to permit underwater operation of the device. Rather than including the hinged encasement of FIGS. 36(A)-36(C), the encasement of FIG. 40 includes a base portion 8180 attached to webbing via a bracket 8160 and screws 8150. Base portion 8180 includes a flat disc shaped portion with an upper cylindrical boss having outwardly facing screw threads. The base portion 8180 further includes batteries 8170 and a printed circuit board that is actuated by pressing down on a rubber cap 8110. Rubber cap 8110 is held in place by an externally threaded sleeve that compresses rubber cap against a pressure ring 8120. Preferably, a high heat resistance material is used, such as UL K014 Plastisol Black from Harman Corporation, 360 South Street, Rochester, Michigan 48307; Tel: (248) 651-4477. Injection molded hard plastic components of the battery encasement are preferably made from Makrolon® FR7067 polycarbonate plastic obtainable from Bayer Material Science LLC, 100 Bayer Road, Pittsburgh, PA 15205-9741, Tel: (412) 777-2000. Alternatively, VALOX® VX3608C thermoplastic polyester resin can be used, obtainable from Sabic Innovative Plastics (Formerly GE Plastics), Pittsfield, MA 01201, Tel: (413) 448-7110.

FIGS. 41(A)-41(J) illustrate still further embodiments of LED based devices. FIGS. 41(A)-(B) illustrates an embodiment similar to FIGS. 37 and 39(A), wherein indicia is printed directly on the wing portions 6220. Alternatively, FIGS. 41(C)-(E) illustrate an embodiment wherein the encasement 6800 includes hollow wing portions 6820 defining elongate cavities 6822 therein that are in communication with a central lumen. If desired, an LED strip 6840 can be disposed within a further tubular member 6842 inside of encasement 6800. The hollow elongate cavities 6822 can receive printed media therein rather than printing media on the plastic surface of the encasement 6800. Similarly, while FIGS. 41(F)-(G) illustrate an embodiment similar to that of FIG. 39(B), the embodiment of FIGS. 41(H)-(J) provides a dual lumen embodiment of an extrusion 7800 having a hollow center connecting portion 7820 that defines an elongate cavity 7822 that can receive printed indicia therein that connects parallel tubular cavities 7832 defined by tubular portions 7830. By providing cavities (e.g., 7822) a user is offered the option of modifying information and or images, adding or removing such indicia as needed. LED elements 7840 are provided in interconnected form along the length of the extrusion, inside of individual tubes as illustrated received within the extrusion 6800, if desired. Indicia 7890 can similarly be provided. The LED strips preferably use 3 millimeter standard LEDs (1.5-3.0V) spaced about every two inches in a plurality or strip of LED's. It will be appreciated however that LED size and spacing between LED's can vary.

FIGS. 42(A)-42(D) illustrate an exemplary manner for attaching webbing material (such as KEVLAR® material and/or hook and loop fastener strip material to the extrusion (e.g., 6200) by folding one or two strips around the enclosure, and then adhering them and/or stitching them in place. FIG. 42(A) illustrates the extrusion, while FIG. 42(B) illustrates fabric partially folded over the extrusion. FIG. 42(C) illustrates a technique wherein one discrete strip is folded over each side and stitched in place, while FIG. 42(D) illustrates a wider (e.g., 2.125 inch wide) strip disposed along the back of the extrusion and then folded over onto the front of the extrusion on each side. In either case, hook and loop fastener strips can be attached beneath the webbing, or in lieu of the webbing if desired.

FIGS. 43-44(B) illustrate aspects of a safety system utilizing a number of conspicuity units as described above (10001-10004) that are in selective communication with a remote 10000 by way of RFID technology. Such a system can be very useful for a supervising emergency worker (e.g., firefighter) by helping keep track of people in their team. In particular, by way of use of the remote 10000, the supervisor can activate or deactivate the illuminating strips 10001-10004 on different emergency workers. Each worker can be selected to have a differing blink pattern such that the LEDs blink relatively faster or slower, or stay on constantly. The supervisor can then monitor the location of each worker visually. Preferably, one hand held base unit can control up to four of the LED locator devices and the remote 1000 can preferably detect and communicate with the remote units up to distances as far as 500 meters. Preferably, the remote 10000 has at least three independent audible alarm modes indicating proximal distances to each LED Locator. The three audible alarms correspond to given ranges, such as "close" (1 to 10 ft), "mid-range" (10 to 50 ft), or long-range (50 ft to 1600 ft). The remote 10000 can be programmed so that once the remote emergency worker is outside of a preset distance, the remote 10000 will trigger a fourth audible alarm and/or vibrator alert using a piezoelectric element, for example. Two way communication can be provided via a panic button on the remote LED unit that sends a signal to the hand held unit and communicating that a problem exists. The remote 10000 preferably can also send a signal, alerting either individuals or all members of a team that a problem exists and that there is a need to evacuate. Preferably, 2.4 GHz Digital RF Technology is used, but other frequencies can be used. Suitable RFID components can be obtained from Alien Technology, Miamisburg, OH 45342, 408-782-3900. FIGS. 44(A)-44(B) illustrate a variation of the conspicuity device 12000 for use with the aforementioned RFID system, wherein a "double housing" 12010 is provided, wherein one housing in the double housing includes components for manual activation as with the non-RFID embodiment, as well as a second housing for containing the RFID circuitry.

The methods and devices provided by the present disclosure, as described above and shown in the drawings, provide for conspicuity and safety devices with superior properties as described herein. It will be apparent to those skilled in the art that various modifications and variations can be made in the embodiments of the present disclosure described herein without departing from the spirit or scope of the disclosure. Thus, it is intended that the present disclosure include modifications and variations that are within the scope of the appended claims and their equivalents.

What is claimed is:

1. A conspicuity device having a first end and a second end, comprising:
   a) a headband configured to surround a head of a user or a helmet of a user, the headband including a first elastic webbing portion;
   b) a second non-elastic webbing portion attached to the first elastic webbing portion;
   c) one of a (i) hook portion or (ii) a loop portion of a hook and loop fastener attached to a first face of the first elastic webbing portion, and the other portion of the hook and loop fastener being attached to a face of or comprising the second non-elastic webbing portion;
   d) an elongate lighting device attached to the conspicuity device having a first end and a second end, the elongate lighting device defining a longitudinal axis bound by the first end and second end and a transverse axis, wherein the elongate lighting device defines a plurality of spaced relatively bright emitting segments separated by relatively dimmer emitting segments, the elongate lighting device being defined at least in part by a layer of polymeric material attached to the second non-elastic webbing portion, the layer of polymeric material being configured to permit a preselected distribution of light generated by the elongate lighting device to pass through the layer of polymeric material; and
   e) a battery pack housing mounted to at least one of the first elastic webbing portion and the second non-elastic webbing portion via at least one fastener, the battery pack housing including a push button actuator to actuate the elongate lighting device.

2. The conspicuity device of claim 1, further comprising an adjustment to permit adjustment of the elastic webbing portion.

3. The conspicuity device of claim 1, wherein the at least one fastener of the battery pack includes two pairs of facing teeth fixedly coupled to the battery pack housing to permit the position of the battery pack to be adjusted along the length of the webbing portion to which the battery pack is attached.

4. A conspicuity device having a first end and a second end, comprising:
   a) an elastic webbing portion;
   b) an elongate lighting device attached to the elastic webbing portion having a first end and a second end, the elongate lighting device defining a longitudinal axis bound by the first end and second end and a transverse axis, wherein the elongate lighting device defines a plurality of spaced relatively bright emitting segments separated by relatively dimmer emitting segments, the elongate lighting device being defined at least in part by a first, outer layer of polymeric material, the first, outer layer of polymeric material being configured to permit a preselected distribution of light generated by the elongate lighting device LEDs to pass through the layer of polymeric material; and
   e) a battery pack operably coupled to the elongate lighting device, the battery pack being operably coupled to a push button actuator for actuating the elongate lighting device.

* * * * *